(12) United States Patent
Jones et al.

(10) Patent No.: US 7,974,385 B2
(45) Date of Patent: *Jul. 5, 2011

(54) USER INTERFACE AND SYSTEM TO FACILITATE TELEPHONE CIRCUIT MAINTENANCE AND TESTING

(75) Inventors: William R. Jones, St. Louis, MO (US); Michael D. Cheaney, St. Louis, MO (US); Rod A. Opel, St. Louis, MO (US)

(73) Assignee: International Business Machines Corporation, Armonk, NY (US)

( * ) Notice: Subject to any disclaimer, the term of this patent is extended or adjusted under 35 U.S.C. 154(b) by 496 days.

This patent is subject to a terminal disclaimer.

(21) Appl. No.: 10/689,077

(22) Filed: Oct. 21, 2003

(65) Prior Publication Data
US 2004/0062359 A1    Apr. 1, 2004

Related U.S. Application Data

(63) Continuation of application No. 09/050,871, filed on Mar. 31, 1998, now Pat. No. 6,687,335.

(60) Provisional application No. 60/042,448, filed on Mar. 31, 1997.

(51) Int. Cl.
*H04M 1/24* (2006.01)
*H04M 3/08* (2006.01)
*H04M 3/22* (2006.01)

(52) U.S. Cl. ......... 379/1.01; 379/9; 379/9.01; 379/9.02; 379/14; 379/15.01

(58) Field of Classification Search ................ 379/1.01, 379/9, 9.02, 9.03, 9.04, 10.01, 15.01, 14, 379/27.01, 29.01; 370/241, 247, 250; 700/17, 19, 65
See application file for complete search history.

(56) References Cited

U.S. PATENT DOCUMENTS

| | | | |
|---|---|---|---|
| 4,464,543 A | | 8/1984 | Kline et al. |
| 5,027,343 A | * | 6/1991 | Chan et al. .................... 370/250 |
| 5,208,846 A | * | 5/1993 | Hammond et al. .......... 379/9.06 |
| 5,416,833 A | * | 5/1995 | Harper et al. ............ 379/201.05 |
| 5,528,660 A | | 6/1996 | Heins et al. |
| 5,633,909 A | | 5/1997 | Fitch |
| 5,687,212 A | | 11/1997 | Kinser, Jr. et al. |
| 5,712,896 A | | 1/1998 | Lee et al. |
| 5,721,753 A | | 2/1998 | Ehler et al. |
| 5,734,696 A | | 3/1998 | Day |
| 5,737,517 A | * | 4/1998 | Kite et al. ...................... 714/38 |
| 5,740,233 A | | 4/1998 | Cave et al. |
| 5,761,272 A | | 6/1998 | Williams et al. |
| 5,764,726 A | | 6/1998 | Selig et al. |
| 5,787,147 A | | 7/1998 | Gundersen |
| 5,796,953 A | * | 8/1998 | Zey ............................. 709/227 |
| 5,835,566 A | | 11/1998 | Cowgill |
| 5,850,426 A | * | 12/1998 | Watkins et al. ............ 379/29.01 |
| 5,875,242 A | * | 2/1999 | Glaser et al. ............. 379/201.05 |
| 5,915,012 A | * | 6/1999 | Miloslavsky ............ 379/265.02 |
| 5,920,608 A | | 7/1999 | Minegishi |
| 5,920,846 A | | 7/1999 | Storch et al. |
| 5,923,729 A | * | 7/1999 | Dezonno .................... 379/15.01 |

(Continued)

*Primary Examiner* — Quoc D Tran
(74) *Attorney, Agent, or Firm* — Seth H. Ostrow; Ostrow Kaufman LLP

(57) ABSTRACT

An apparatus integrates disparate systems. The apparatus includes a platform that supports a control interface. The platform also supports a different user interface for each of the disparate systems. The platform enables the formatting and transfer of data from the apparatus to each of the disparate systems.

19 Claims, 66 Drawing Sheets

U.S. PATENT DOCUMENTS

| | | |
|---|---|---|
| 5,956,385 A | 9/1999 | Soto et al. |
| 6,061,729 A | 5/2000 | Nightingale |
| 6,145,001 A * | 11/2000 | Scholl et al. ............ 709/223 |
| 6,279,124 B1 * | 8/2001 | Brouwer et al. ............ 714/38 |
| 6,687,335 B1 * | 2/2004 | Jones et al. ............ 379/1.01 |

* cited by examiner

Greta

Greta Size

Auto Sign on

Window Cascade

Greta About

Greta Help/Tutorial

\* Mosaic runs independent of Greta

Maintenance Ticket - Print Ticket

Maintenance Ticket - Refresh

Maintenance Ticket - Exit

Maintenance Ticket - Double Click on Ticket

Specify Ticket

WFA Backup

Pickup Ticket

OSSTR Screen

Test

Load to React

Dispatch

Status

OSSOI Screen

Hilda

US 7,974,385 B2

USER INTERFACE AND SYSTEM TO FACILITATE TELEPHONE CIRCUIT MAINTENANCE AND TESTING

This is a continuation application of U.S. patent application Ser. No. 09/050,871, filed on Mar. 31, 1998, now U.S. Pat. No. 6,687,335, issued Feb. 3, 2004, which claims the benefit of U.S. Provisional Application No. 60/042,448, filed Mar. 31, 1997, the contents of which are expressly incorporated herein by reference in their entireties.

BACKGROUND OF THE INVENTION

1. Field of the Invention

The present invention is directed to a user interface to facilitate telephone circuit maintenance and testing. In particular, the present invention is directed to a user interface that integrates disparate maintenance and testing applications and systems into a single common control interface.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, acronyms will be defined as follows:

Advanced Interactive executive (AIX)
Basic Rate Interface (BRI)
Bellcore Client Company (BCC)
Circuit Access Code (CAC)
Circuit ID (CKT)
Circuit Layout Order Number (CLO)
Digital Data System (DDS)
Digital Speed Interpolation (DSI)
Electronic Bonding (EB)
High Level Language Application Programming Interface (HLLAPI)
Inter-Exchange Carrier (IEC)
ISDN Basic Rate Interface (BRI)
Line Record Display (OSSLR)
Local Area Network (LAN)
Maintenance and Analysis Plan for Special Services (MAPSS)
Manager Scratch Pad (MSP)
Network Monitoring and Analysis (NMA)
Network and Services Database (NSDB)
Online Query System (OQS)
Operational Support System (OSS)
Order Number (ORD)
Private Branch Exchange (PBX)
Tracking Key/Circuit Layout Order Number (TRK/CLO)
Transmission Control Protocol/Internet Protocol (TCP/IP)
Trouble Report (TR)
Work and Force Administration (WFA)
Work and Force Administration-Control (WFA/C)

3. Background Information

Conventionally, in order for service personnel to perform trouble-shooting, billing updates and testing of circuits, the service personnel must perform these tasks on separate systems, each of which have a different interface. The various user interfaces require the service personnel to access multiple terminals and to memorize multiple passwords for each system. Further, service personnel need to familiarize themselves with the differing interfaces and functional flows of the different systems. In addition to the above, the conventional systems are not universally provided with an interface to communicate and transfer information to other systems.

SUMMARY AND OBJECTS OF THE INVENTION

Accordingly, an object of the present invention is to provide a user interface and system that integrates disparate maintenance and testing systems and applications into a single common control interface.

Another object of the present invention is to provide a single user interface and system that interacts with Work Force and Administration (WFA) systems, Operations Support Systems (OSS), Network Monitoring and Analysis (NMA) systems, and REACT 2001 systems.

Yet another object of the present invention is to provide an interface and system to perform a remote testing of analog services, digital data system (DDS) and digital speed interpolation (DSI) services, and ISDN Basic Rate service.

Yet a further object of the present invention is to provide an interface and system to access ISDN switches to perform standard trouble isolation testing.

A further object of the present invention is to provide an interface and system to perform testing of ISDN switches in accordance with vendor-specific switch criteria.

Still another object of the present invention is to provide an interface and system which substantially reduces the learning curve for service personnel performing remote testing.

Yet another object of the present invention is to provide a user interface and system having point-and-click/cut-and-paste capabilities, such that users may quickly and easily process trouble reports from creation of the trouble report at a point of origin to the close-out stage, and such that users may quickly and easily process rebate information and billing information.

In accordance with the above-listed objects, there is provided a user interface and system which provides a single, user-friendly, common interface to login and perform testing, trouble-shooting and billing updates. The user interface and system are adapted to dynamically monitor work lists on a user-controlled basis with individual, terminal-specific customization.

In addition to providing an interface to Work Force and Administration (WFA), Operations Support Systems (OSS) and REACT 2001 systems, the system may selectively store customer trouble report data for retrieval during system outages to provide continuous access to customer data. The system may initiate a remote test session into the appropriate REACT 2001 host processor in an environment where multiple REACT 2001 host processors are connected to a wide area network. The system may also perform inward and outward dispatches for resolving network problems, control billing and rebate functions, and to perform trouble report restoration. The system may also be adapted to provide audio alerts in accordance with selected events, for example, receipt of a trouble report indicating problems in critical special services circuits. Such an audio alert may comprise, for example, a signal sent to an administrative personnel's pager. The system may also be provided with online help and tutorial references to quickly provide users with information. Further, the system may be adapted to interface with other conventional systems, such as, for example, OPSINE and TIRKS.

In accordance with another aspect of the present invention, the user interface and system is adapted to interact with Network Monitoring and Analysis (NMA) systems and Operations Support Systems (OSSs) to test ISDN Basic Rate Interface (BRI) lines via the serving digital (ISDN) switch. The system may access the serving ISDN switch via the NMA interface and perform standard trouble isolation testing oh the BRI lines. The ISDN switches may comprise, for example, Lucent 5ESS and Siemens EWSD switching platforms.

The user interface and system of the present invention may utilize point-and-click functionality to speed the testing process and provide an easy, straightforward interface. The user interface and system also provides channel switch access to NMA, which provides for a secure connection to NMA, thus eliminating remote login security concerns. The user interface and system may be provided with a queuing function to queue requests to the ISDN switches, thus providing for efficient utilization of the limited numbers of switch access ports. In addition to the above, the system may automatically determine the type (i.e., vendor) of the ISDN switch undergoing testing once the BRI directory number is submitted. Once the type is determined, the system may automatically initiate the appropriate testing commands based on input provided by the user. Further, the system and interface includes ISDN BRI tests, which may be accessed by pull-down menus. In addition, other ISDN BRI tests may be added as necessary. The user may use the system and user interface to transfer data (e.g., test results) from the ISDN switch to WFA for auditing and tracking.

The above-listed and other objects, features and advantages of the present invention will be more fully set forth hereinafter.

According to an object of the present invention, an apparatus is provided for integrating a plurality of disparate systems. The apparatus has a common control interface, an inputting device for entering data required by the plurality of disparate systems into the common interface, and means for transferring the data from the common control interface to at least one system of the plurality of disparate systems. The apparatus further comprises a user login system that logs a user onto the common control interface and permits usage of the plurality of disparate systems.

According to a feature of the present invention, the plurality of disparate systems comprise maintenance and testing systems. The testing systems perform remote testing of analog services and/or ISDN switches.

According to an advantage of the instant invention, the common control interface comprises a user interface having point-and-click/cut-and-paste capabilities.

According to another object of the present invention, an apparatus is disclosed for telephone circuit maintenance and testing, comprising a control interface in which a user enters data, a telephone circuit maintenance and testing interface that receives data from the control interface, and a tester, that is controlled by the telephone circuit maintenance and testing interface, that tests predetermined telephone parameters. The tester performs a remote testing of analog services and/or ISDN switches. In this regard, the testing of ISDN switches is performed in accordance with vendor-specific switch criteria. The control interface comprises a first window for logging on and logging off the control interface, and a second window for bringing up screens necessary for performing proper maintenance analysis.

According to an advantage of the instant invention, a GUI interface is provided that facilitates the entry of the data.

According to another feature of the invention, the GUI interface provides point-and-click and cut-and-paste capabilities to the user.

Another advantage of the present invention is that the control interface automates the sending and receiving of data between the control interface and the telephone circuit maintenance and testing interface.

Still another object of the present invention is to provide a user interface for use with a telephone circuit maintenance and testing system, that comprises a menu bar, which contains a plurality of menus required by a user to log on the system, log off the system, and handle routine setup parameters, and a toolbar from which a plurality of screens can be called to input data required for a trouble ticket. The data is used for proper maintenance analysis by an automated test tool that performs an automated test on at least one parameter of a telephone system. Further, a data transporter is provided that transfers the data input via the toolbar to a WFA/C interface, in which the WFA/C interface controls the automated test tool. The automated test tool performs digital testing and/or analog testing.

a still further advantage of the present invention is that a converter is provided that converts the data input via the toolbar to a form usable by a WFA/C interface that facilitates telephone circuit maintenance. The converted data is exchanged between the user interface and the WFA/C interface.

The present disclosure relates to subject matter contained in provisional application No. 60/042,448, filed on Mar. 31, 1997, which is expressly incorporated herein by reference in its entirety.

BRIEF DESCRIPTION OF THE DRAWINGS

The foregoing and other objects, features, and advantages of the invention will be apparent from the following more particular description of a preferred embodiment, as illustrated in the accompanying drawings which are presented as non-limiting examples, in which reference characters refer to the same parts throughout the various views, and wherein.

DETAILED DESCRIPTION OF THE PREFERRED EMBODIMENTS

The present invention will now be described below. For the convenience of the reader, additional components and information will be hereinafter described with reference to the terminology and references utilized in the above-noted documents.

1. Hardware Detail and Components

Figure 1A:
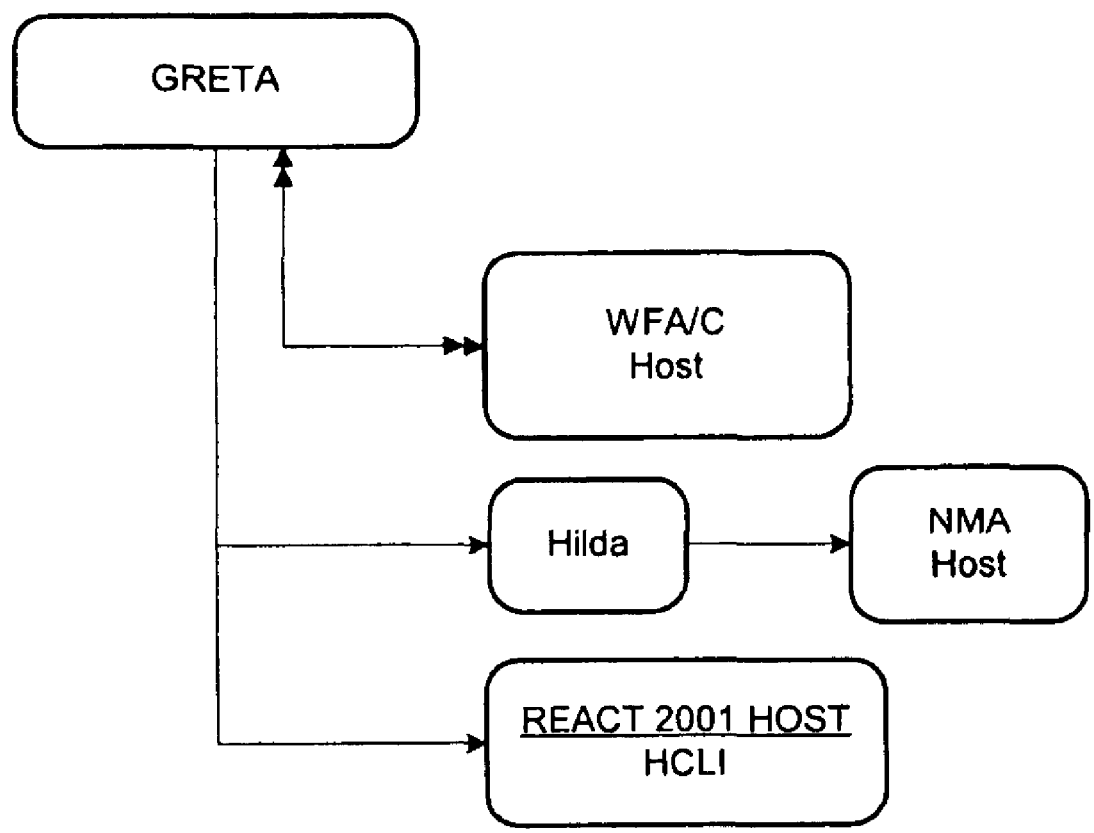
FIG. 1A is a block diagram illustrating various components and connections of a system of the present invention.
Figure 1B:
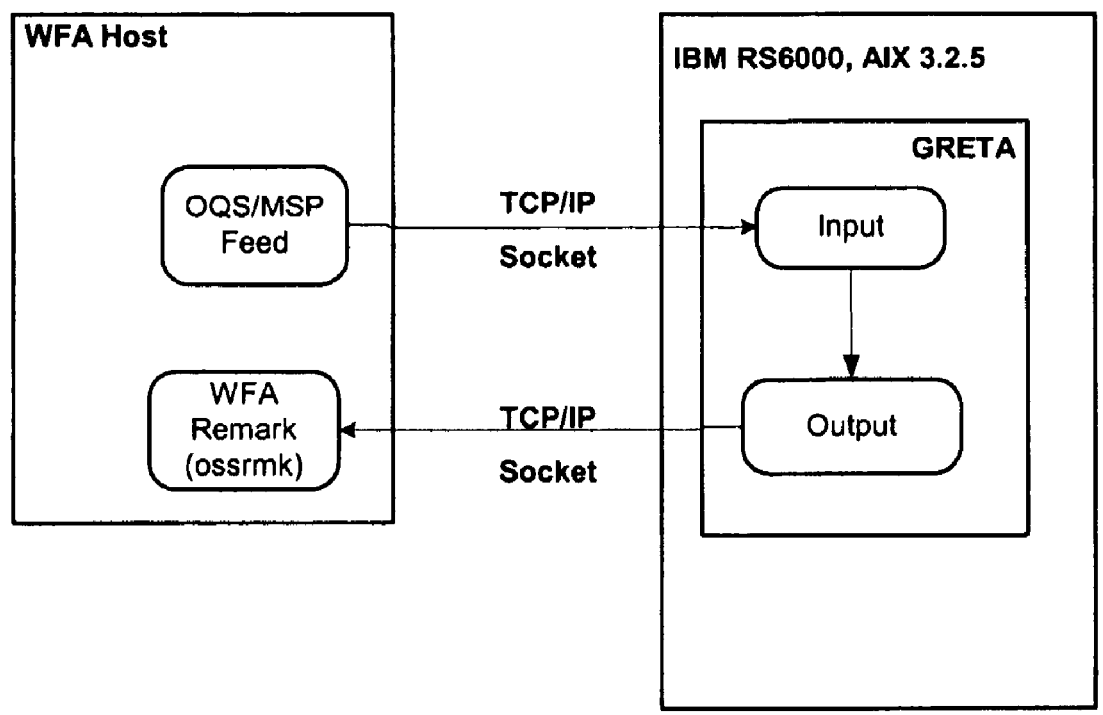
FIG. 1B is a block diagram illustrating the connection between the system of the present invention and WFA.

As shown in FIGS. 1A and 1B, GRETA interfaces with WFA, HILDA and a REACT 2001 Host. The REACT 2001 Host System is a product of Hekimian, Inc., located in Rockville, Md. The WFA Host is a product of Bellcore, located in Murray Hill, N.J.

a connection between GRETA and the WFA Host may be provided via a TCP/IP socket (see FIG. 1B) and, for example, an IBM 3270 interface of an IBM RS6000 computer, where GRETA emulates a printer port to the WFA host. Such hardware is known to those skilled in the art, and thus, is not described in detail herein. The connection between GRETA, the REACT 2001 Host and the HILDA Host, and the connection between HILDA and the NMA Host may also be provided by TCP/IP protocols. In particular, GRETA may connect to the REACT 2001 Host and HILDA via TCP/IP or Telnet, and HILDA may connect to the NMA Host via TCP/IP or Telnet. It is noted that Telnet-will provide the user with an interface to execute procedures that are run on the remote device.

Although shown in FIG. 1A as separate systems, GRETA and HILDA may be provided on the same client/server platform, wherein information and data are transferred via a file access or memory access. In addition, GRETA provides a system wherein a user may login and utilize a single password to access other systems, with no need to login and enter a password for each of the other systems.

As denoted by the double arrows in FIG. 1A, GRETA may support simultaneous sessions with multiple WFA Hosts.

2. Software Detail and Functional Flow

As noted above, the user interface provides a mechanism to transfer data among the various applications and platforms connected to GRETA, such that data may be quickly and easily accessed to speed the process by which customer trouble reports are resolved.

GRETA, which was written using a High Level Language Application Programming Interface (HLLAPI) and TCP/IP, automates the sending and receiving of data from the WFA/C interface. GRETA connects to a plurality of servers and uses its GUI interface to communicate with WFA/C. GRETA's scheme allows users to eliminate the need to perform redundant and tedious actions within WFA/C by clicking a button, clicking a menu option, or hitting the "ENTER" ("RETURN") key on a keyboard. Information is laid out in a list and scrolling window form.

Two main windows are displayed when GRETA is executed. The first window is the menu bar, which contains a series of menus that the user will need to handle routine setup, logging on and off the system, choosing colors, displaying already selected windows, and bring up on-line documentation. The second window is the toolbar. The toolbar is a row of buttons that can bring up the screens necessary for proper maintenance analysis on a given trouble ticket, bring up windows to specify circuits and ticket numbers, and call a pick-up command. From the toolbar, the user can also start up Hilda, which is an automated ISDN test tool, REACT 2001 GUI and a semi-automatic testing window. Both the menu and the taskbar are always open and can only be closed when GRETA is terminated.

The ticket window in GRETA is opened from the toolbar and gives the user the ability to view multiple trouble tickets within different centers, function level codes, and color. Unlike WFA/C, GRETA automatically updates the ticket display window, so the user does not have to worry if the most current ticket list is being viewed. The ticket window also allows the user to sort the ticket according to the ticket status, bring up a trouble report screen, and print the ticket list, all with the click of a mouse button.

Another significant screen is the trouble report screen. The user can point-and-click to the screens that will allow quick and accurate handling of the trouble ticket, including the adding of remarks, checking the status, etc.

Figure 2:
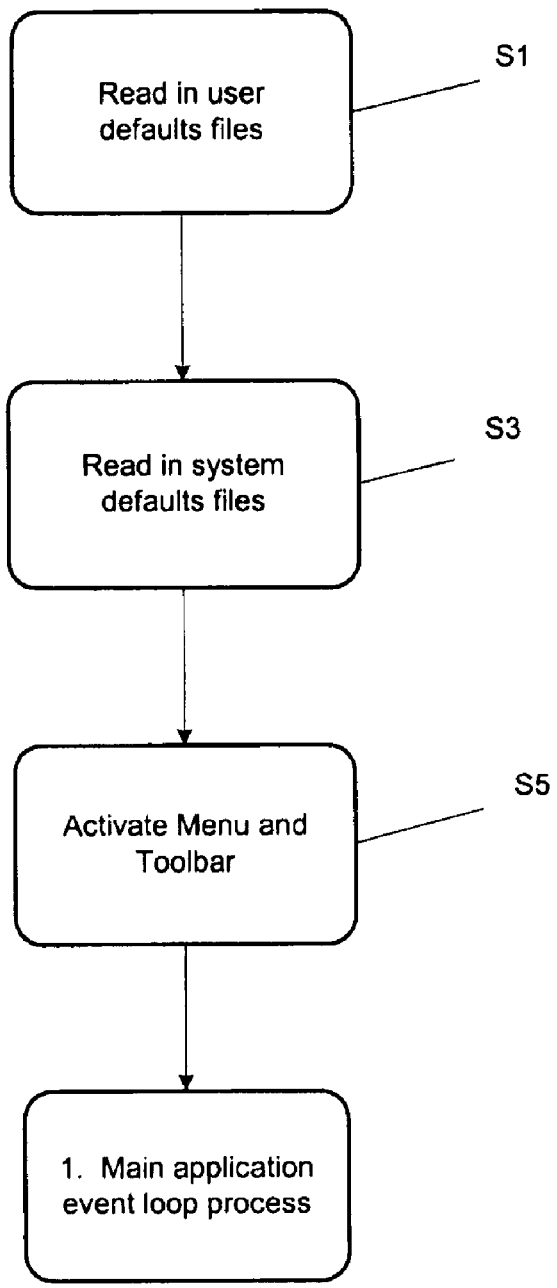
FIG. 2 is a flow chart of an initialization routine of the GRETA application of the present invention.

FIG. 2 illustrates the flow chart of GRETA. According to the present invention, user default files are read in (inputted) at step S1 when the system is first initialized. Thereafter, a series of default files, such as, for example, a file related to authorized users, are inputted (step S3), and a menu and taskbar are displayed on, for example, a display associated with the computer system (step S5). At this point, GRETA begins a Main Application Event Loop Process (step S7), which is illustrated in greater detail in FIG. 3.

Figure 3:
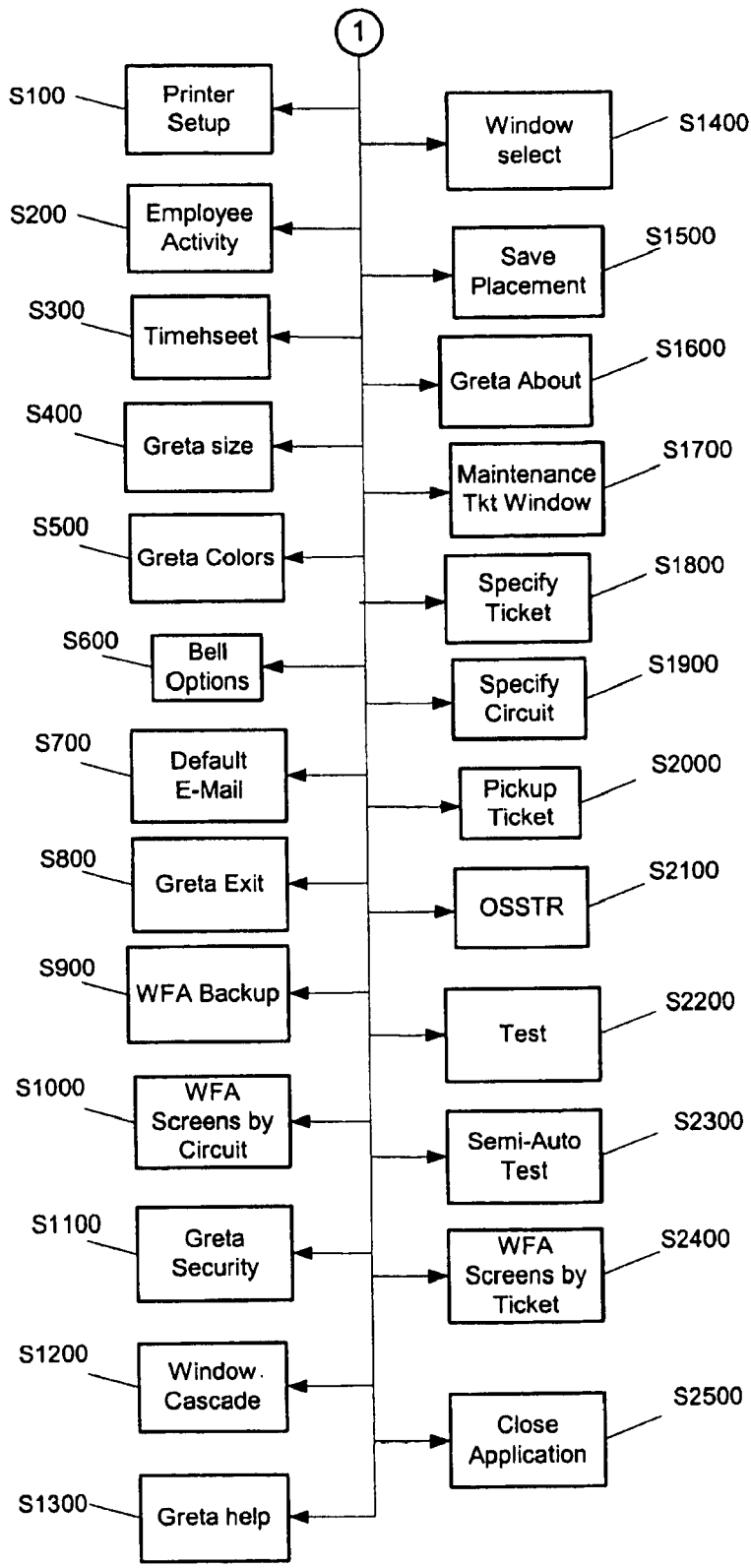
FIG. 3 is a flow chart of the main looping process of the GRETA application of the present invention in which a user selects an activity to be performed.

As shown in FIG. 3, the Main Application Event Loop Process enables the user to select from a plurality of activities. These activities (routines/options) include, but are not limited to: a routine to select and setup a desired printer (step S100); an employee activity routine (step S200); a time sheet routine (step S300); a GRETA size routine (step S400); a GRETA color routine (step S500); a GRETA bell sounding routine (step S600); an e-mail routine (step S700); a GRETA color setting routine (step S800); a Work Force and Administration (WFA) backup routine (step S900); a WFA screens routine (step S1000); a GRETA security routine (step S100); a window cascade routine (step S1200); a GRETA help routine (step S1300); a window select routine (step S1400); a save placement routine (step S1500); an about routine (step S1600); a maintenance ticket window routine (step S1700); a ticket specify routine (step S1800); a specify circuit window routine (step S1900); a pickup ticket routine (step S2000); an OSSTR screen routine (step S2100); a test routine (step S2200); a semi-automatic test routine (step S2300); a WFA screens by ticket routine (step S2400); and a close application routine (step S2500).

Each activity routine will now be described in detail below.

Printer Setup

Figure 5:
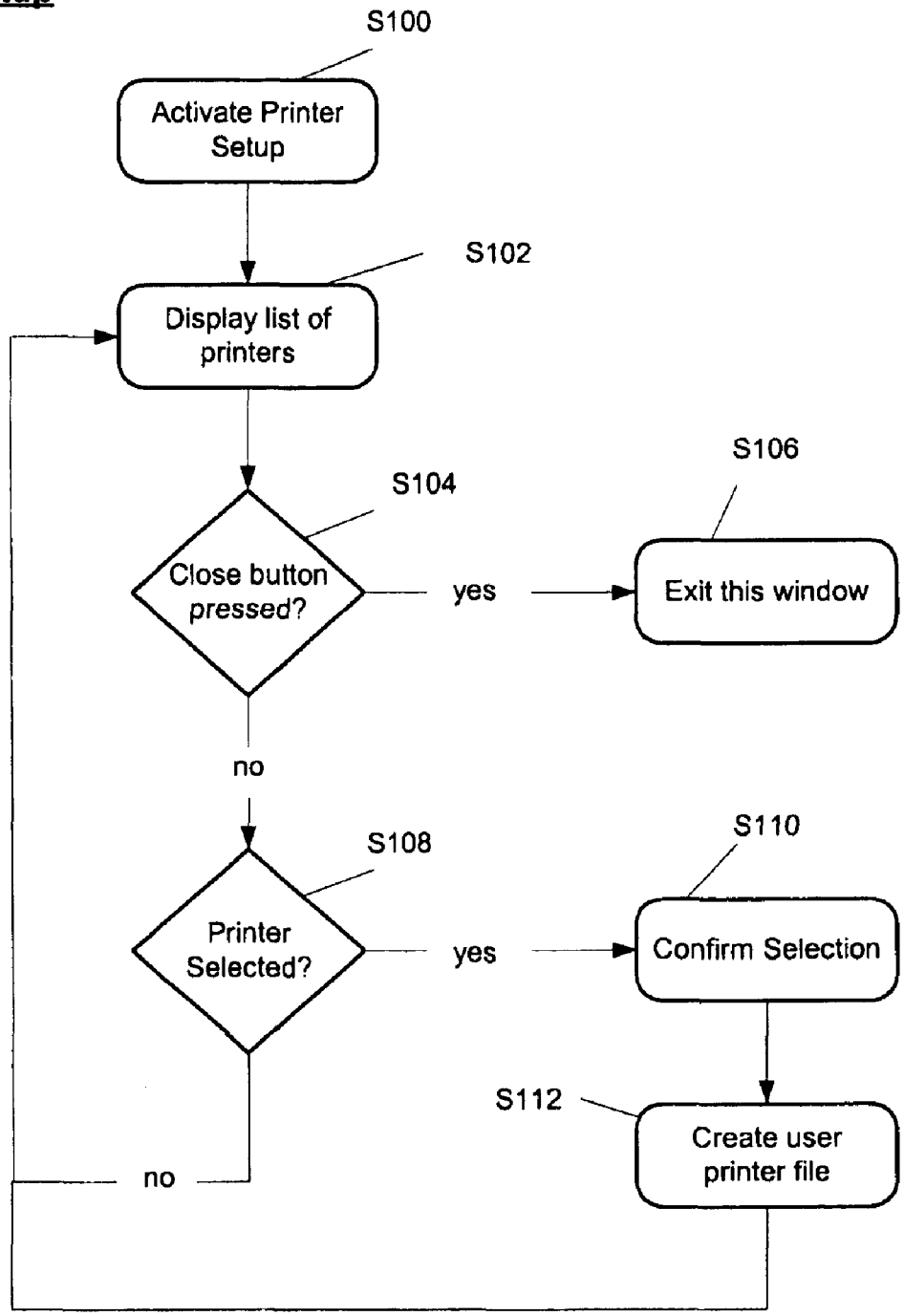

The printer setup activity routine of the present invention is illustrated in FIG. 5.

When the printer setup routine is executed, step S102 is performed to display a list of printers on an associated monitor. Meanwhile, a determination is made as to whether the user selected a close (exit) button on the display (step S104). If the close button was selected, processing proceeds to exit the printer setup routine (step S106).

On the other hand, if the close button was not selected, processing proceeds to step S108 to determine whether a printer has been selected. As long as a printer has not been selected, the list of available printers to select from is displayed on the monitor (steps S102 to S108 is continuously repeated). However, once a printer is selected from the displayed list, step S110 is executed to confirm the selected printer, and a user printer file of the selected printer is created at step S112.

Thereafter, processing returns to step S102 to display the list of available printers and determine whether the close (exit) button has selected.

Employee Activity

Figure 4:
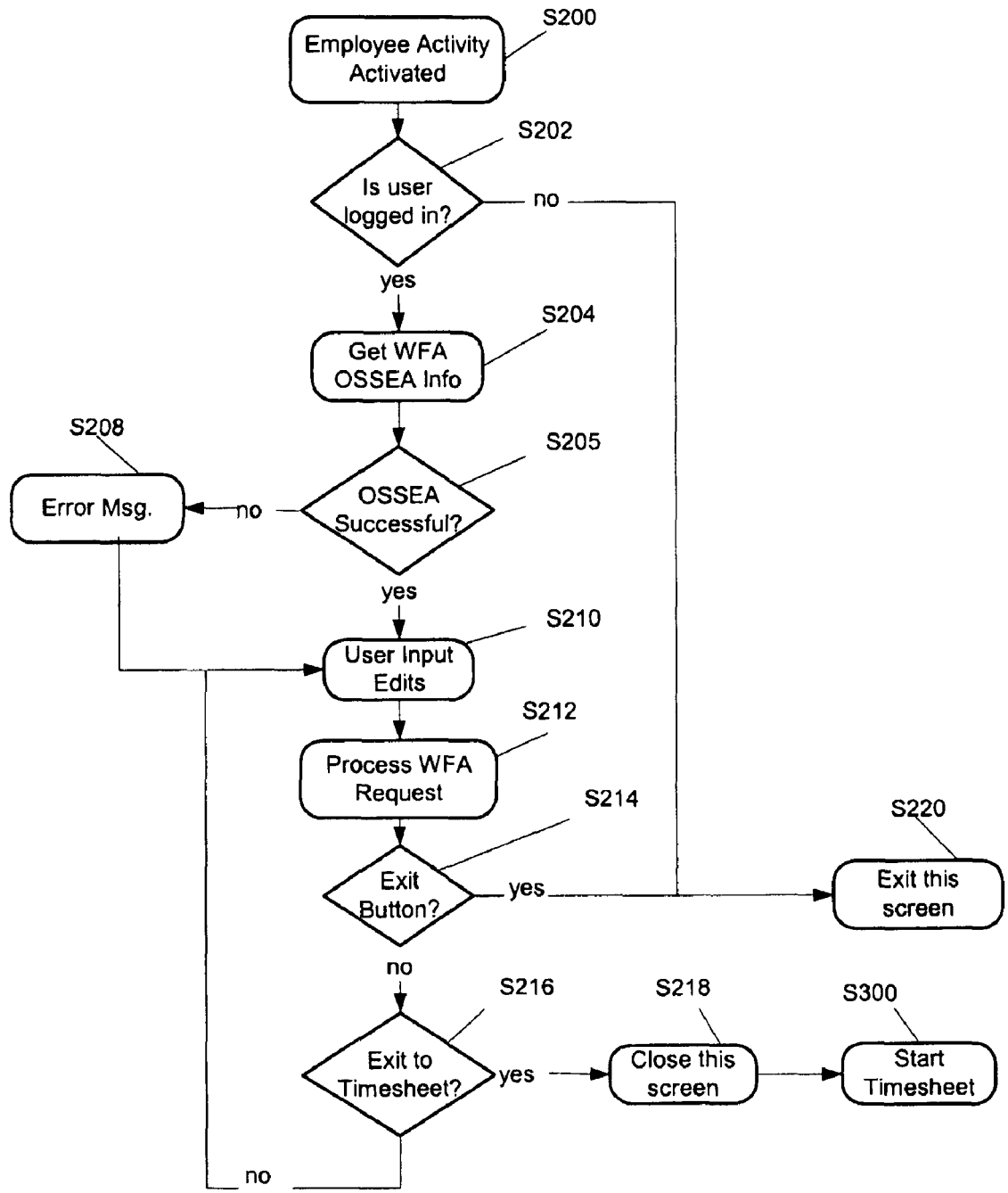
FIGS. 4-63 are flow charts of the user selectable activities which may be called from the main looping process of FIG. 3.

The employee activity routine is illustrated in FIG. 4.

When the employee activity routine is selected (step S200), a determination is made as to whether a user is logged into the system (step S202). If the user is logged in, processing proceeds to obtain WFA Employee Activity (OSSEA) information and determine whether, the OSSEA is successfully obtained (steps S204 and S206).

If the OSSEA is not successful, an error message is produced and the user is permitted to edit the user input (steps S208 and S210). However, if the OSSEA was successful, step S208 is skipped, and thus, the error message is not produced.

The WFA request is then processed step S212) and a determination is made as to whether the "EXIT" button has been selected (step S214). When the "EXIT" button is not selected, a determination is made to determine if the time sheet activity should be executed. If the determination is affirmative, the employee activity routine is terminated and the time sheet activity is executed (steps S214, S216, S218 and S300). On the other hand, if the determination at step S216 (e.g., whether to execute the time sheet routine) is negative, processing loops back to step S210 to permit editing of the user input.

However, if it is determined that the "EXIT" button has been selected, processing terminates (step S220) without executing the time sheet routine. Similarly, if it was determined at step S202 that a user is not logged in, processing exits.

Time Sheet

Figure 11:
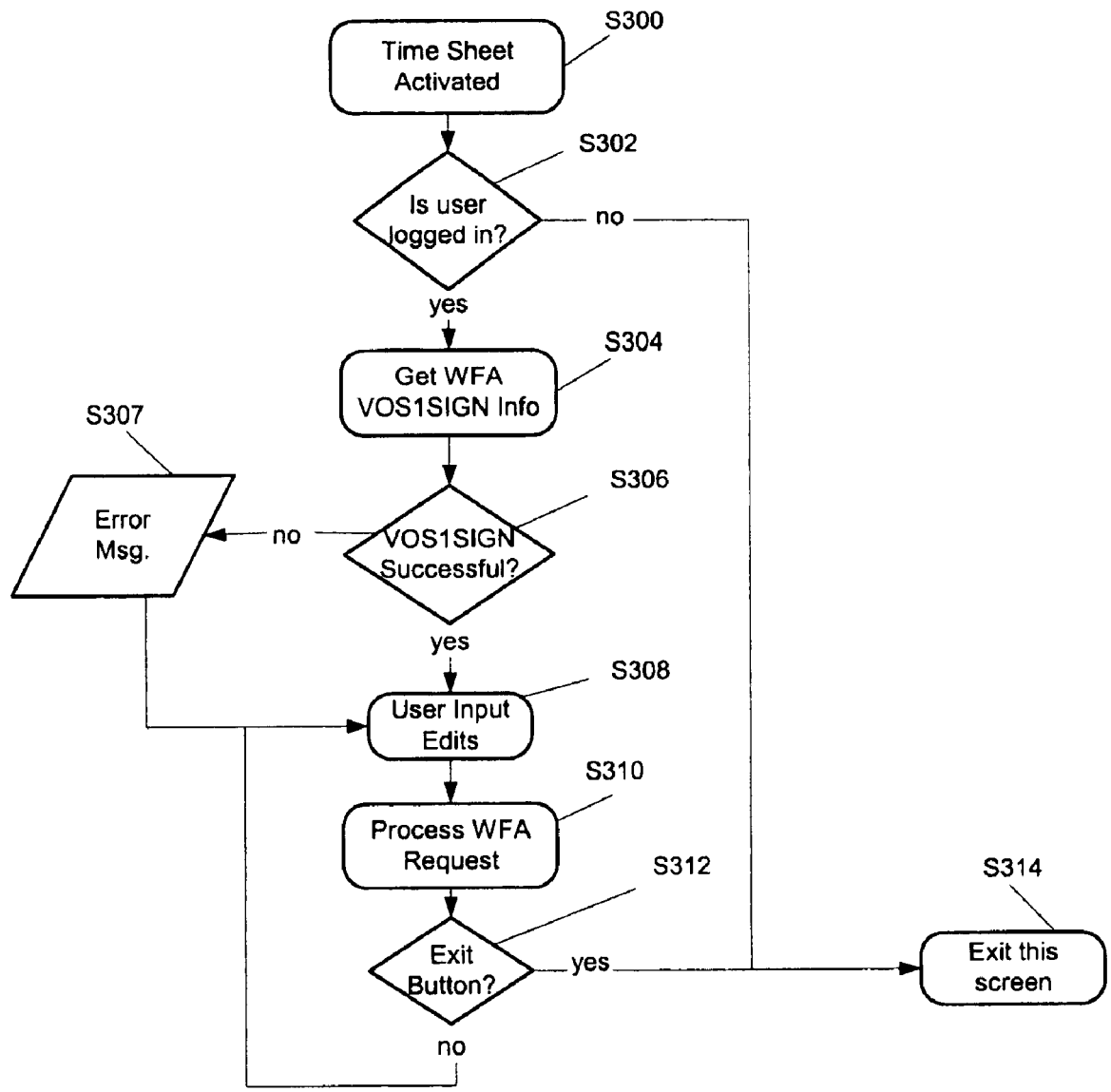

FIG. 11 illustrates the time sheet activity routine performed by the present invention. According to this routine, an initial determination is made as to whether the user is logged in. When it is determined that the user is logged in (step S302), WFA VOS1SIGN information (e.g., sign on, sign off information) is obtained. If the information is valid, the user is able to edit the input data, which is then processed by the WFA (steps S300 to S2310)

If it was determined that the WFA VOS1SIGN information is invalid, an error message (step S307) is produced prior to allowing the user to edit the input.

After the information is processed, it is determined, at step S312, whether the "EXIT" button has been selected. When the "EXIT" button is selected, processing proceeds to step S314 to exit the time sheet routine. Otherwise, processing loops back to S308 to allow the user to edit the input data.

GRETA Size

Figure 6:
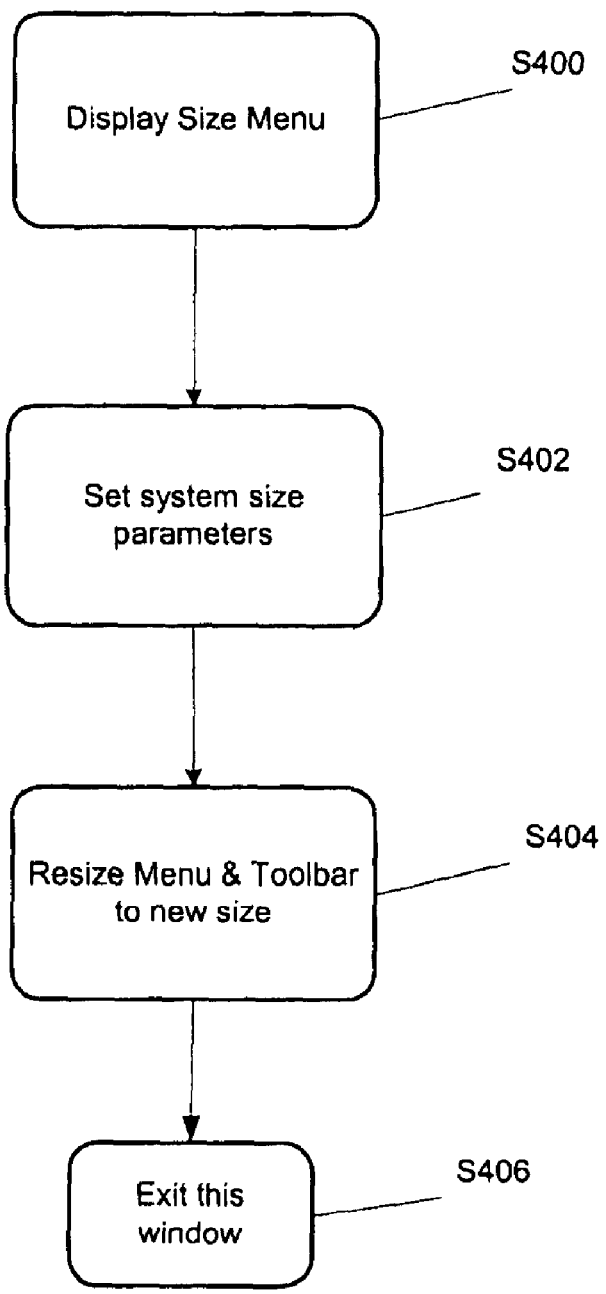

FIG. 6 illustrates the GRETA size activity routine that can be selected from the program illustrated in FIG. 2. According to this routine, the user is able to select desired system size parameters, such as, for example, the desired size of the menus and toolbar (steps S402 and S404). Thereafter, step S406 is executed to exit the GRETA size routine.

GRETA Colors

Figure 8:
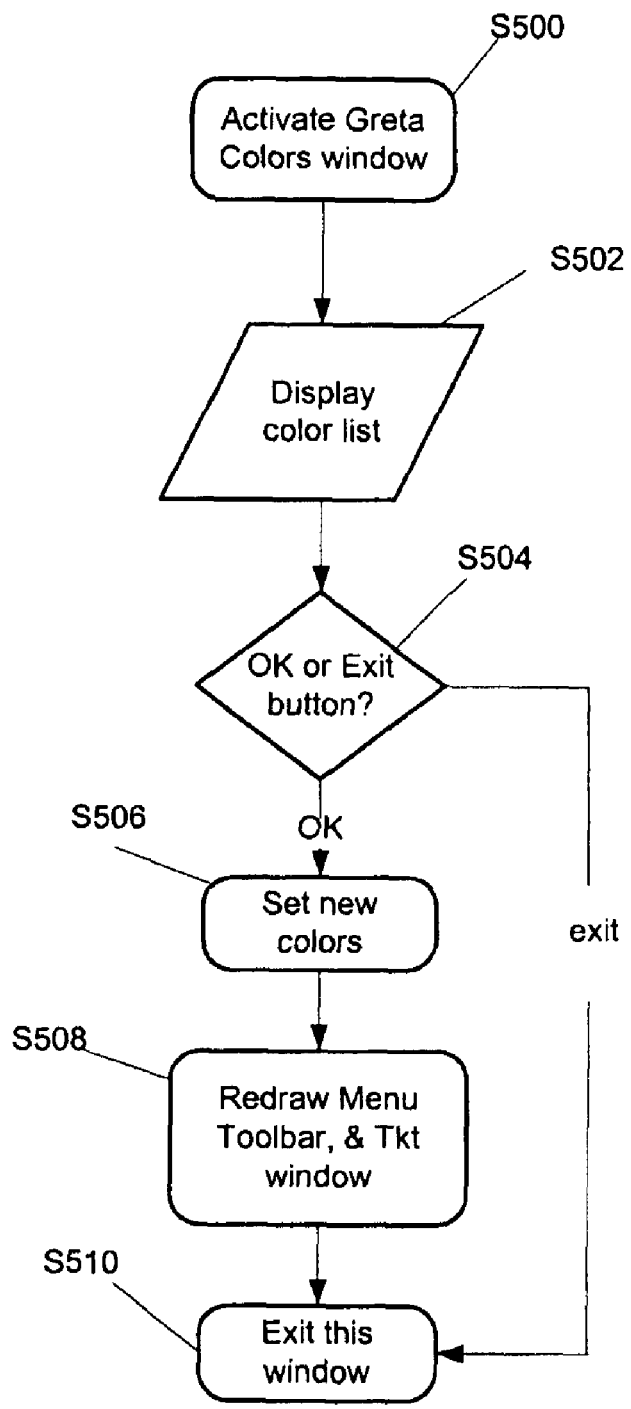

The GRETA color setting activity routine, which enables the user to select desired screen display colors, is illustrated in FIG. 8. As shown in FIG. 8, a plurality of colors available to the user is displayed on the monitor. The user selects the desired color(s), and then a determination is made as to whether the user accepts the selected colors, or wishes to exit without making a color selection (steps S502 and S504).

If the user indicates that the colors have been selected (e.g., step S504 is "OK"), processing proceeds to step S506 to set the selected colors. Thereafter, the displayed menus, toolbar, ticket window, etc. are redrawn using the desired colors selected by the user, and this routine exits (steps S508 and S510).

On the other hand, if it is determined at step S504 that the user does not wish to change (select) display colors, processing skips steps S506 and S508, and exits without changing the display colors.

GRETA Bell

Figure 9:
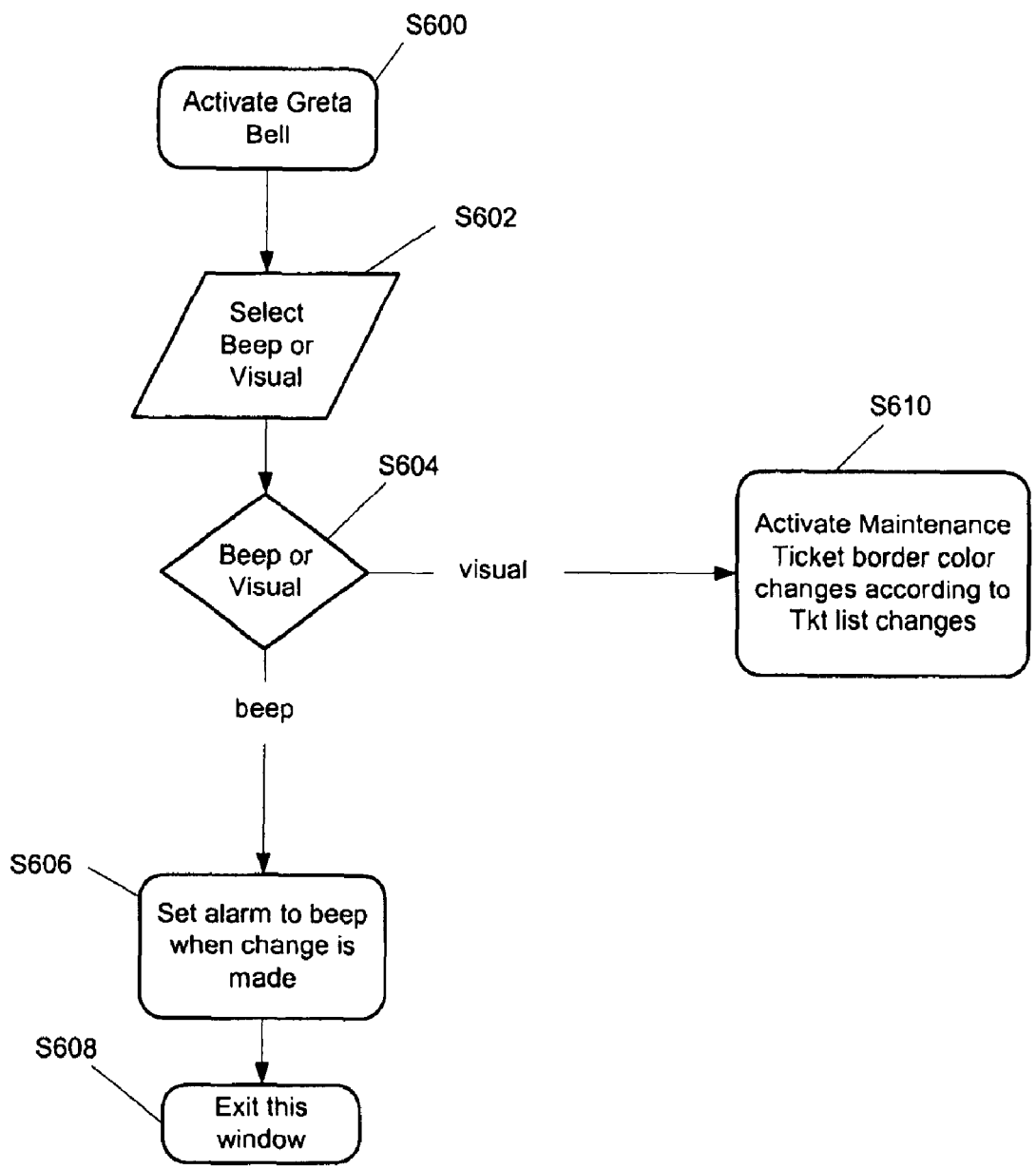

FIG. 9 illustrates the activity routine that is executed to provide either a visual or audible indication (alarm) to the user when, for example, an error occurs. In this routine, the user selects whether an audible (e.g., beep through a speaker) or a visual (e.g., monitor screen color change) alarm is to be provided at step S602. If the audible option is selected, the system is set to initiate an audible beep through an associated speaker when any changes are made (steps S604, S606 and S608). However, if the visual option is selected at step S604, processing proceeds to step S610 to activate the maintenance ticket border color changes in accordance with the ticket list changes.

GRETA Default E-Mail

Figure 10:
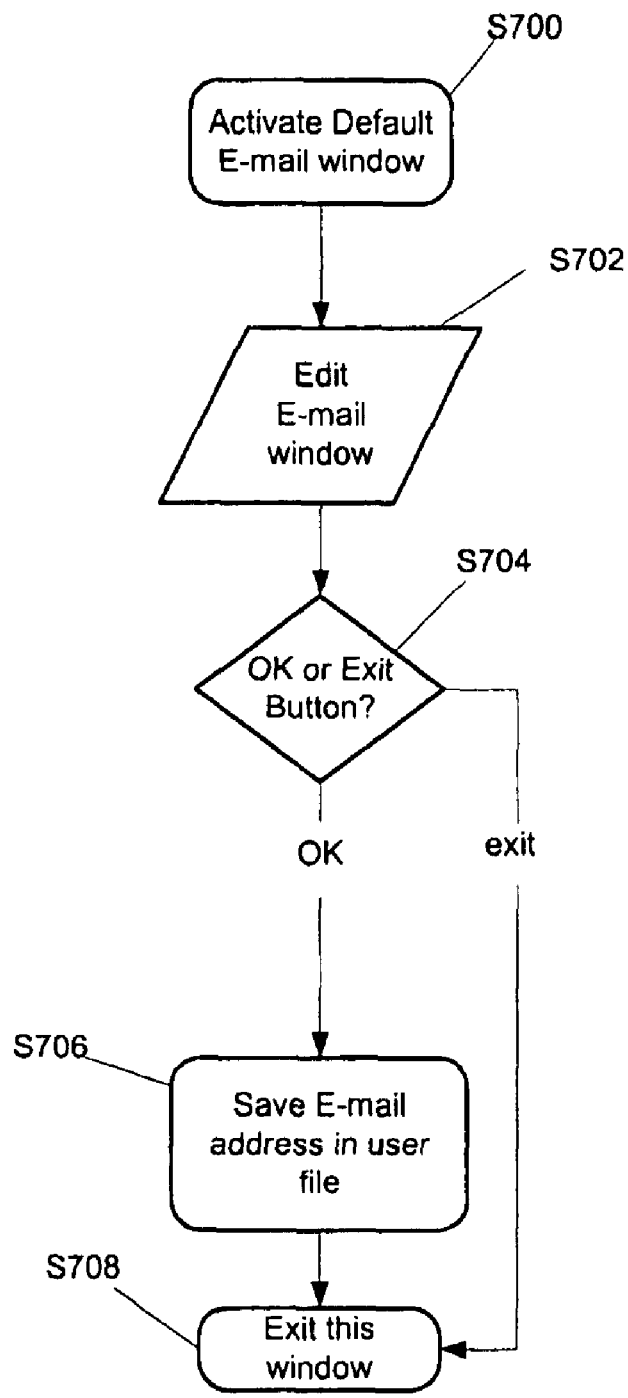

FIG. 10 illustrates the activity routine for the user to set his/her default e-mail address. If the user selects this activity, the user is shown an e-mail window, with the cursor located at a position where the user enters his/her e-mail address. After entering the user's e-mail address, the user selects an "OK" button on the e-mail window. This results in the user's e-mail address being saved to a user file associated with the user for future use, and the exiting of routine (steps S702 to S708). However, if the user selects an "EXIT" button instead of the "OK" button, the routine exits without saving the e-mail address to the user file.

GRETA Exit

Figure 7:
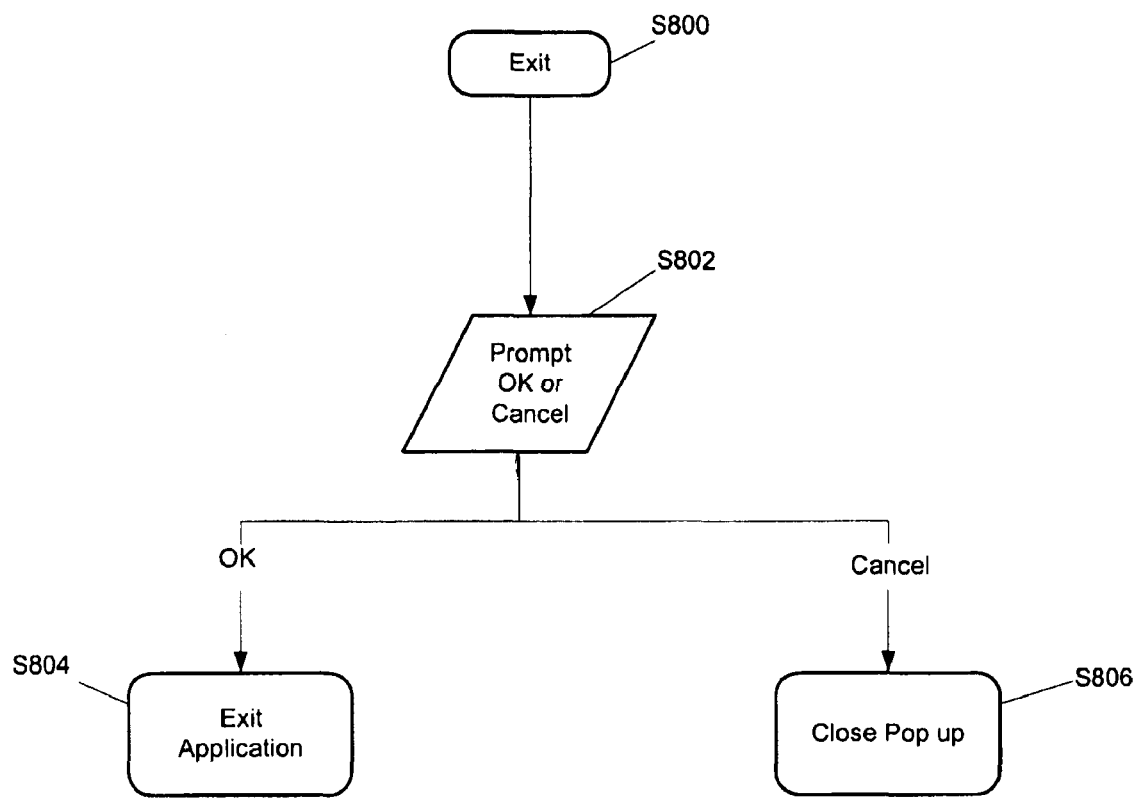

This activity routine, illustrated in FIG. 7, is one of the activities available in the GRETA application shown in FIG. 2 and enables the user to either exit the GRETA application, or to close the pop up window to, for example, make another selection in the GRETA program. According to this activity, a pop up window is displayed on the monitor, asking whether the user wishes to exit the program (step S802). If the user selects an "OK" button, step S804 is performed to exit the application. On the other hand, if the user selects a "CANCEL" button, step S806 is executed to close the pop up window without exiting the application.

WFA Backup

Figure 33:
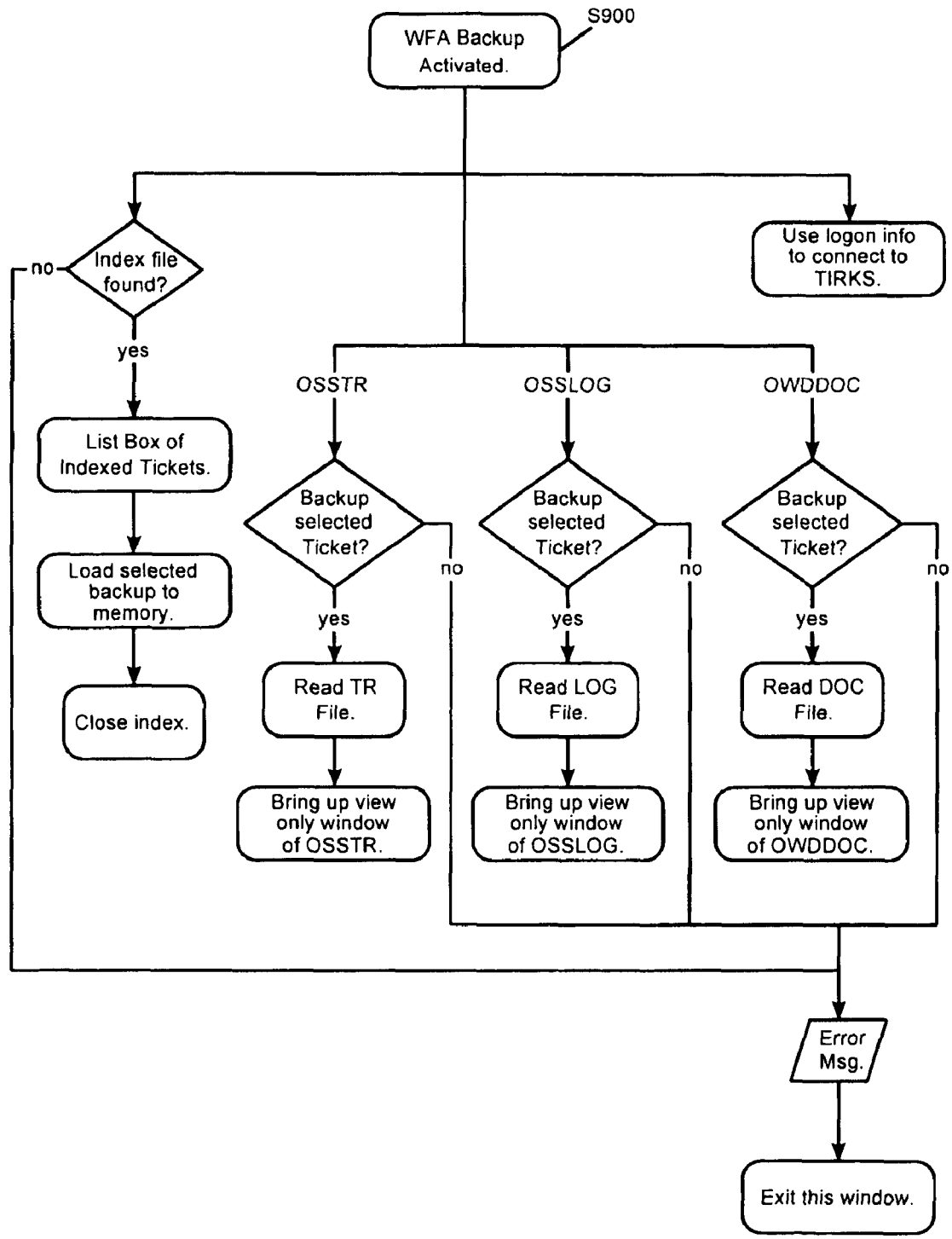

FIG. 33 illustrates the WFA backup routine that is performed by the present invention. When this option is selected by the user, a test is made to determine whether the index file has been found. If the index file is found, the indexed tickets are listed. Then, the selected backup is loaded to memory, and the index file is closed.

When the OSSTR, OSSLOG, or OWDDOC activity is backed up, the selected ticket is backed up, and then the respective TR file, LOG file, or DOC file is read, and the respective OSSTR window, OSSLOG window, or OWDDOC window is brought up in a view only mode.

The backup activity routine writes all trouble report screens, OSSLOG screens, or OWDDOC screens that are viewed during the WFA/C up time to a file on a server before the mainframe is shut down. The trouble report, log and word document screens can then be viewed using a view-only window to review certain circuit or trouble ticket activities.

WFA Screens By Circuit

When the user selects the Bellcore Work Force and Administration—Control, the user is present with a series of activities to chose from. These options include, for example, OWDDOC; OSSCN; OSSCHI; OSSMG; OSSIMG; OSSHMD; OSSFF; OSSLR; OSSOSSTRE; and OSSOI. These activities are described in detail in "Work and Force Administration/Control (WFA/C) User Manual", published by *Bellcore Practice*, BR 190-513-323, Issue 8, May 1996, WFA/C 1.7, the subject matter of which is expressly incorporated by reference in its entirety herein, and thus, is not described in detail herein.

a. OWDDOC

Figure 35:
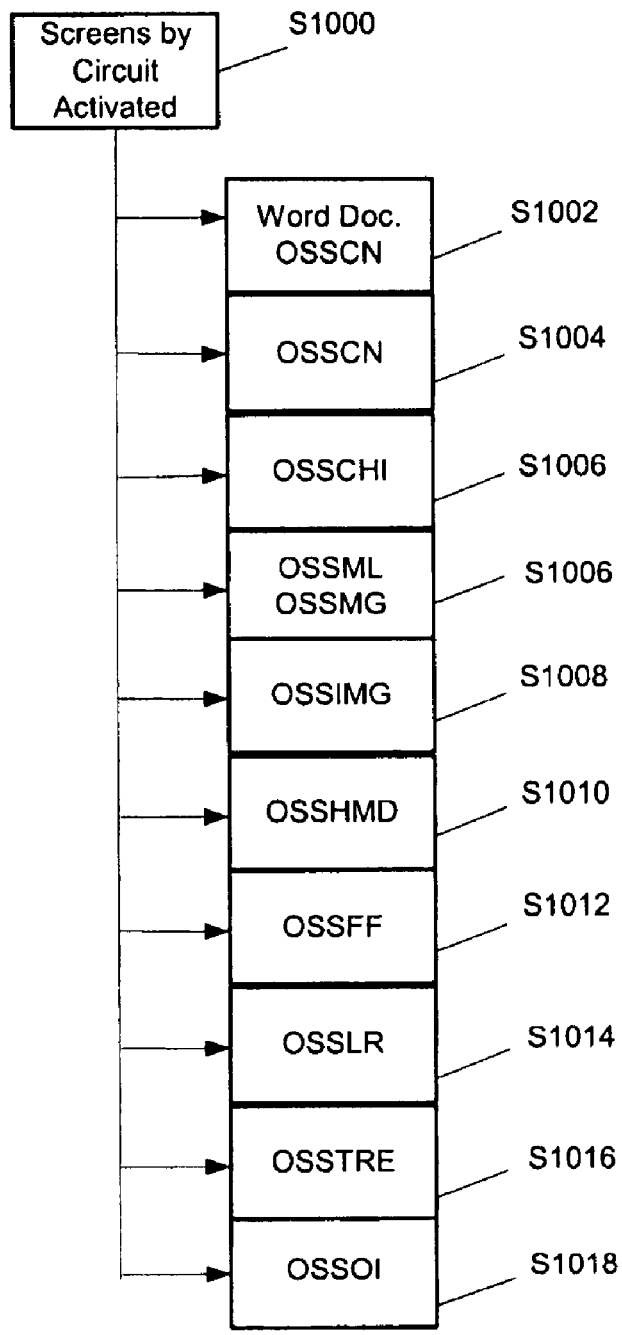
Figure 47:
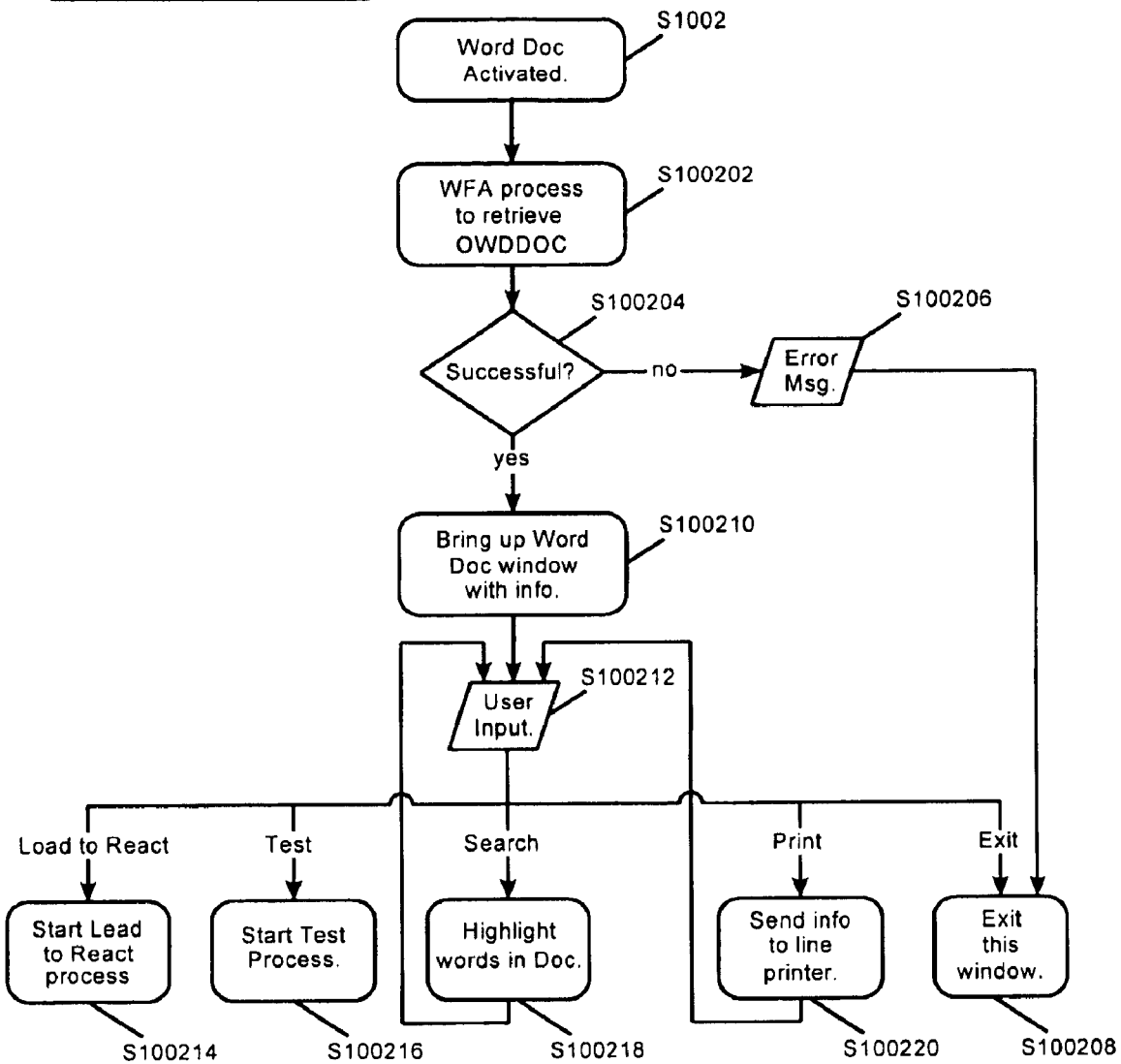

The OWDDOC activity window is a word document window with text search capabilities. When this activity window is selected from the WFA/C Screens By Circuit, shown in FIG. 35, processing proceeds to the flowchart illustrated in FIG. 47, which permits a user to display a WORD document and circuit/WORD notes. The WORD document shows the end-to-end layout of a designed circuit (message, special service, and carrier). The screen produced when this window is opened is illustrated at, for example, page 4-3 of the aforementioned "Work and Force Administration/Control (WFA/C) User Manual".

In this activity, a WORD document is retrieved (step S100202), and a test is performed (step S100204) to determine whether the retrieval was successful. If an error occurred during the retrieval of the WORD document, an error message is produced (step S100206), and the OWDDOC window is closed (step S100208).

If the document was successfully retrieved at step S100204, a document similar to that shown at page 4-3 of the aforementioned "Work and Force Administration/Control (WFA/C) User Manual" is brought up (step S100210). At this point, the user can enter data into the document. Thereafter, the user can select a Load To React activity routine (step S100214, to be discussed below with respect to FIG. 41), a Test activity routine (step S100216, to be discussed below with respect to FIG. 40), a word search activity routine (step S100218), or a print activity routine (step S100220). Alternatively, if the user is finished with the document, he/she can exit the OWDDOC window (step S100208).

Figure 41:
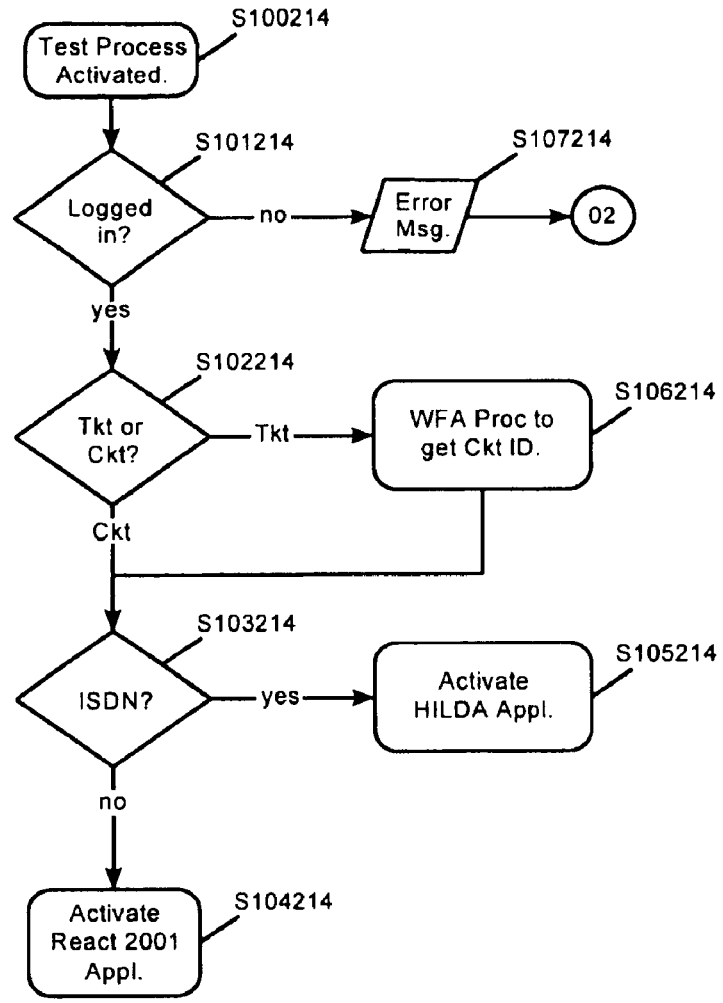

The Load To React activity routine, illustrated in FIG. 41, determined whether an ISDN line or analog line is to be tested. In this routine, a test is initially performed determine whether the user is logged onto the system. If the test results are affirmative, another test is performed to determine whether a ticket or circuit has been called up. If a circuit is called, a determination is made as to whether the circuit is an ISDN line. When the circuit is not an ISDN line, REACT 2001 is activated (steps S101214, S102214, S103214 and S104214). When it is determined that the circuit is an ISDN line, HILDA is activated to test the line (steps S101214, S102214, S103214 and S105214).

On the other hand, if it was detected, at step S102214, that the document is a ticket, the WFA Process is called at step S106214, to get a circuit ID, prior to testing whether the circuit is an ISDN line. Similarly, if it was determined at step S101214 that the user is not logged in, an error message is produced (step S107214) and processing opens a WFA/C Trouble Report/Activity (OSSTR) window (illustrated in FIG. 37), to be described below.

Figure 40:
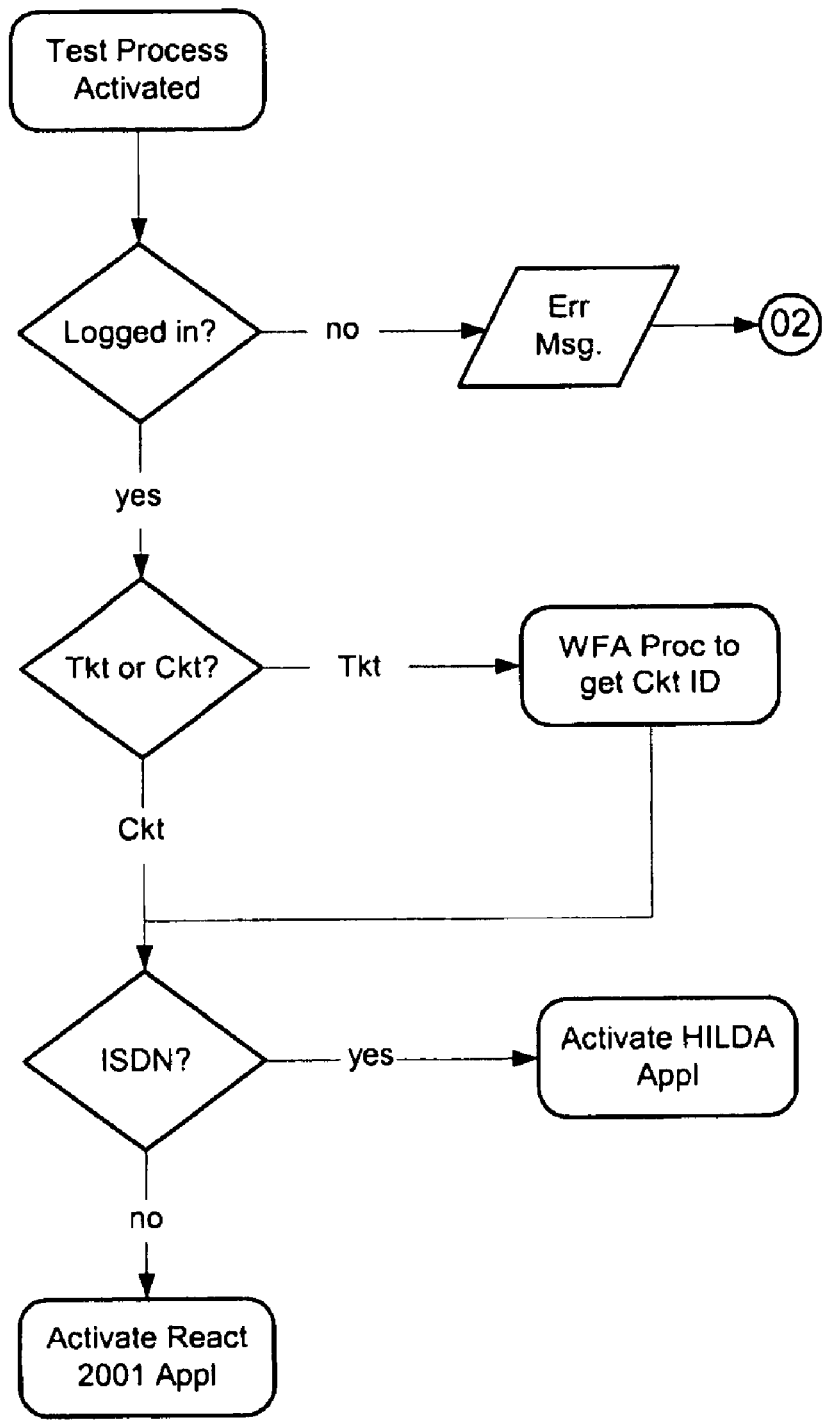

The Test activity routine (S100216) is shown in FIG. 40, and is similar to the Load To REACT activity routine. For an explanation of the operation of this routine, reference should be made to the Load to React activity routine.

b. OSSCN

Figure 53:
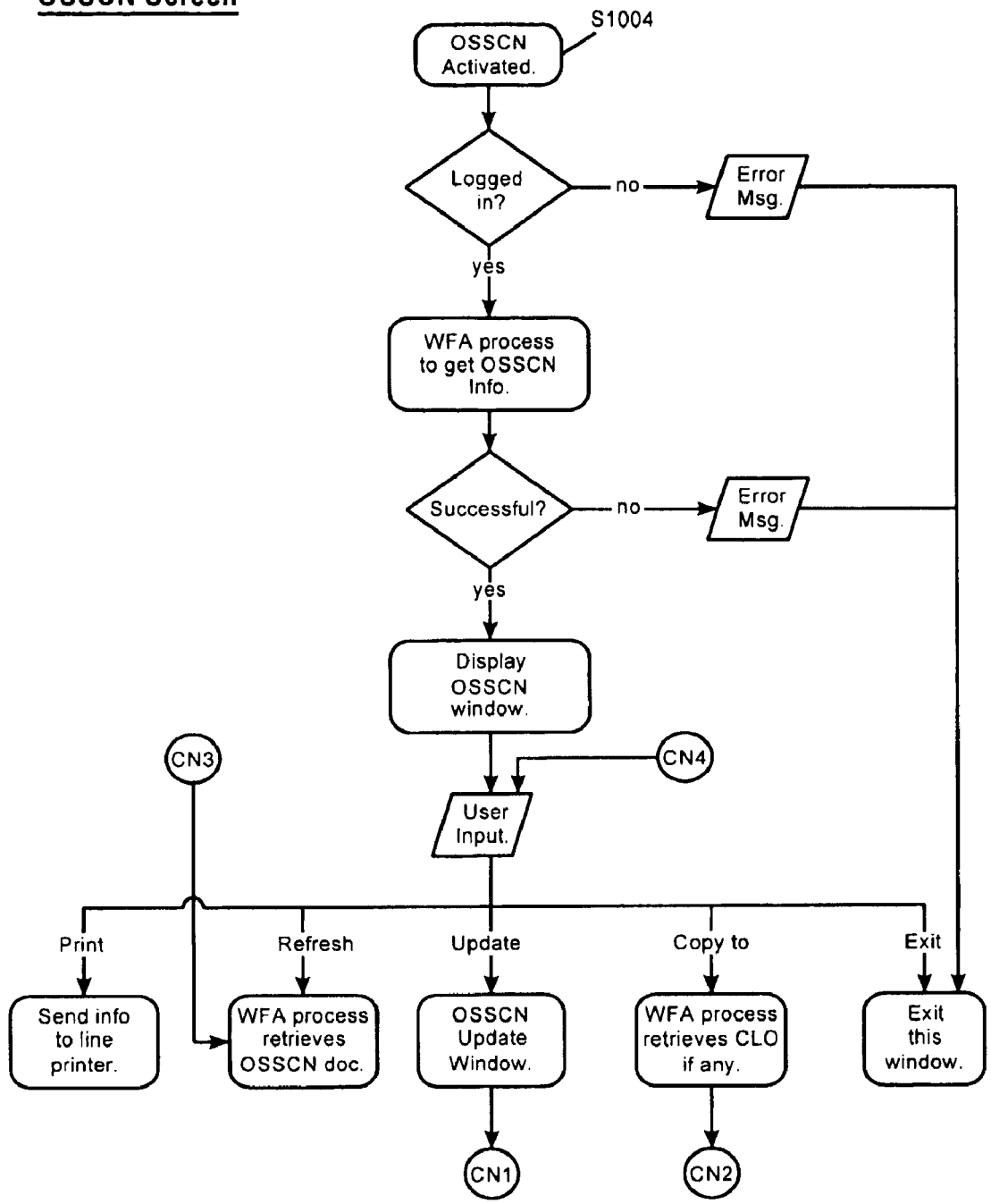
Figure 54:
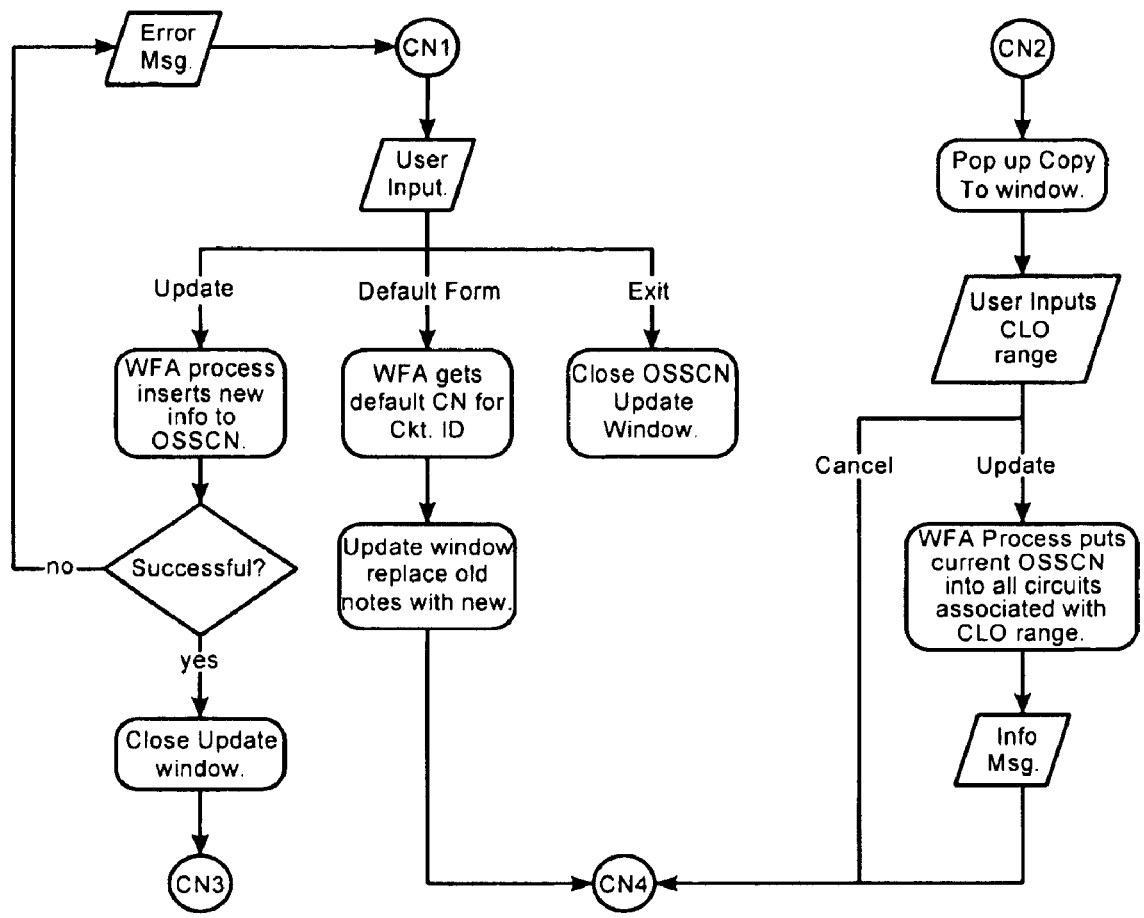

When the Circuit Notes (OSCCCN) activity window (option) is selected, a window, similar to the window illustrated on page 8-7 of the aforementioned "Work and Force Administration/Control (WFA/C) User Manual" is pulled up to allow the user to enter and update necessary circuit information in a free-text format. The flowchart for this activity is shown in FIGS. 53 and 54. This screen allows the user to update, for example, circuit notes and customer name, address and telephone number for special services.

In addition, the user is given the option of printing the data to a local printer, refreshing the display screen, updating the data displayed on the OSSCN screen (window), copying the data to another location, or exiting the OSSCN window.

c. OSSCHI

Figure 55:
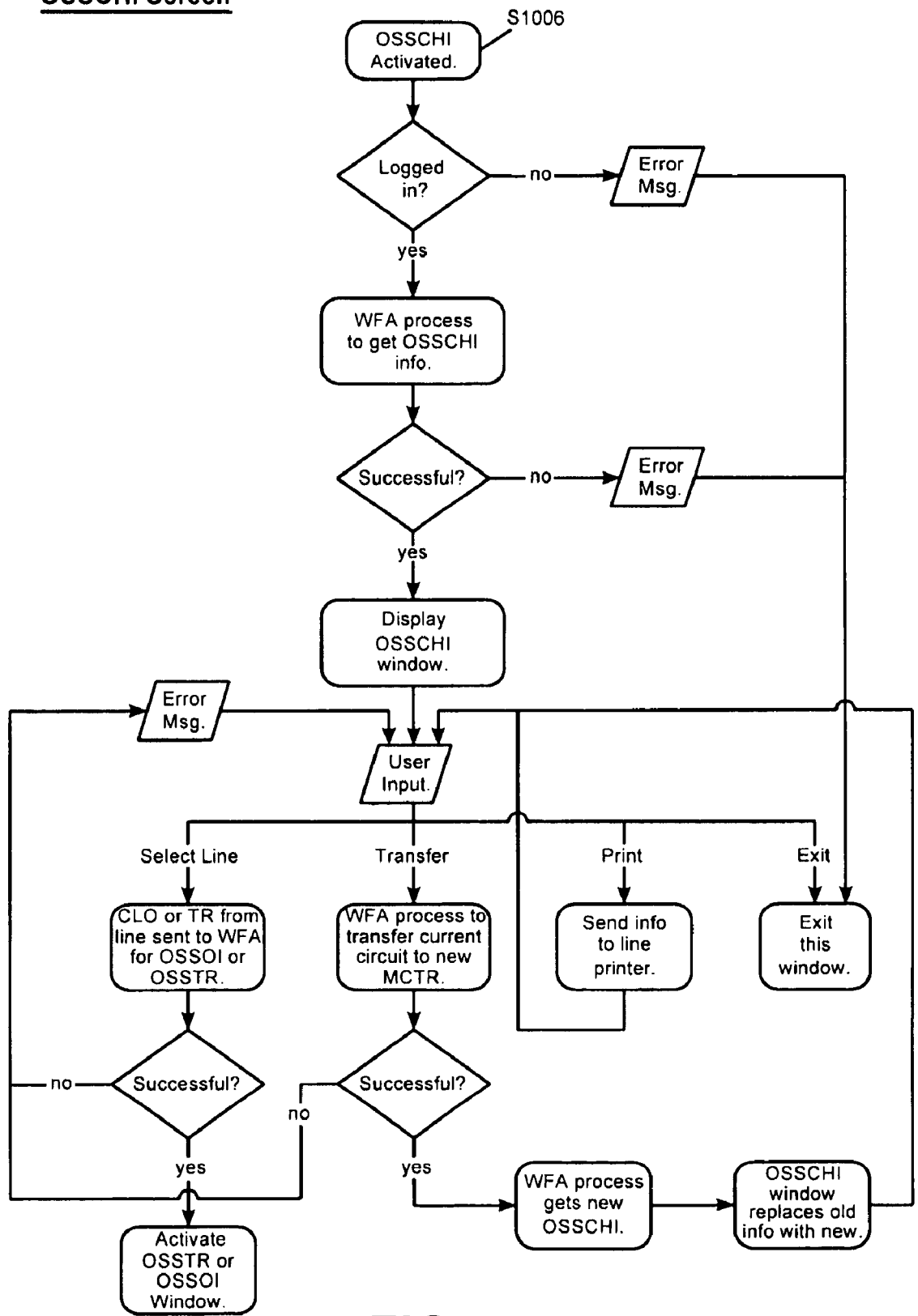

When the Circuit History (OSSCHI) activity window (see FIG. 55) is selected, the user is presented with a circuit history report. This report allows the user to view (and/or print) order and trouble report activities for a particular circuit a sample OSSCHI window is shown at page 8-4 of the aforementioned "Work and Force Administration/Control (WFA/C) User Manual". Thereafter, processing returns to the WFA/C Screens By Circuit.

d. OSSML

Figure 56:
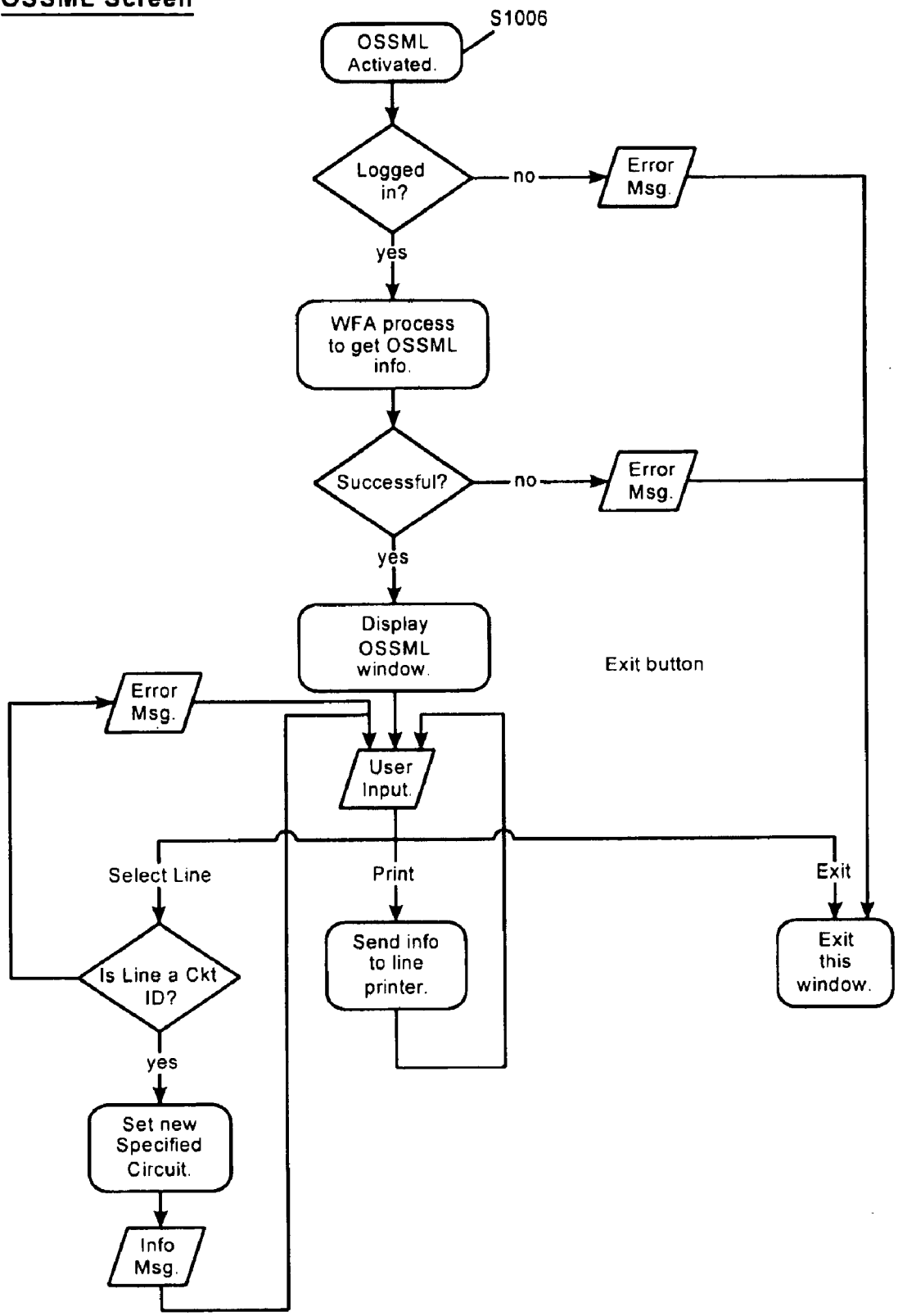

The WFA/C Multipoint Circuit List (OSSML) activity window (used to select circuit identifications), the flowchart of which is shown in FIG. 56, displays all segments of a multipoint circuit to a user of the system. This window (a sample of which is illustrated at page 6-16 of the aforementioned "Work and Force Administration/Control (WFA/C) User Manual") lists all segments with partial circuit identifications that match a "backbone" circuit ID that was entered in a CKT field.

e. OSSIMG/OSSHMD

Figure 57:
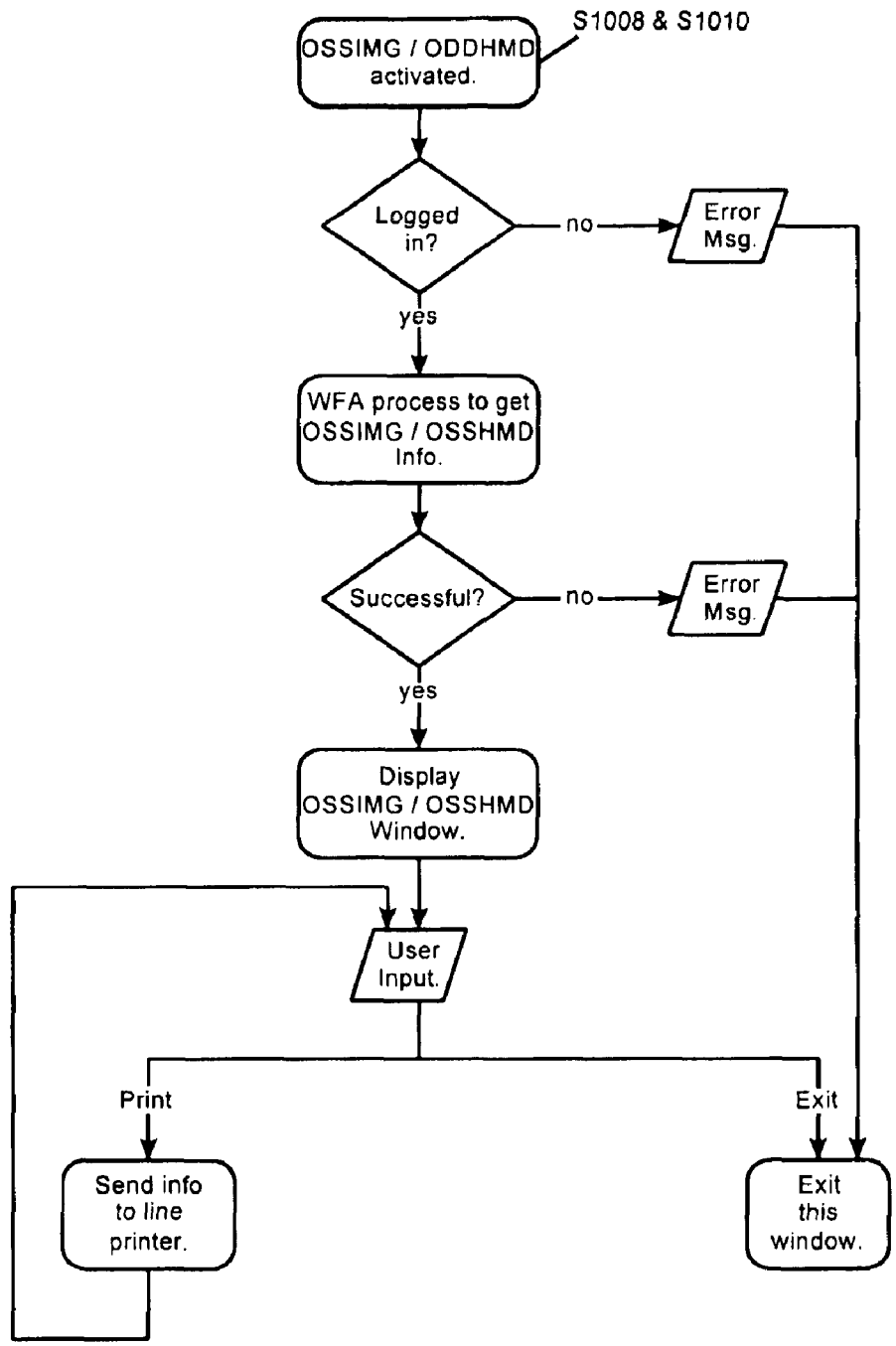

The flowchart for the OSSIMG and OSSHMD activities is shown in FIG. 57. The OSSIMG window (step S1008) is used in an order screening process. This window, which is illustrated at page 5-2 of the aforementioned "Work and Force Administration/Control (WFA/C) User Manual" allows a user to display service order image data stored in the Network and Services Database (NSDB).

The History Measurement Data (OSSHMD) activity (step S1010) is used to display and update (input) Circuit History information, Maintenance and Analysis Plan for Special Services (MAPSS) inventory data, and work unit data after orders are completed in the Circuit History database. a sample of this window is shown at page 8-2 of the aforementioned "Work and Force Administration/Control (WFA/C) User Manual".

In both windows, after the user has input the appropriate data, the user is presented with the option of outputting the data to a printer, or exiting the window and returning to the WFA/C Screens by Circuit activity window.

f. OSSFF

Figure 58:
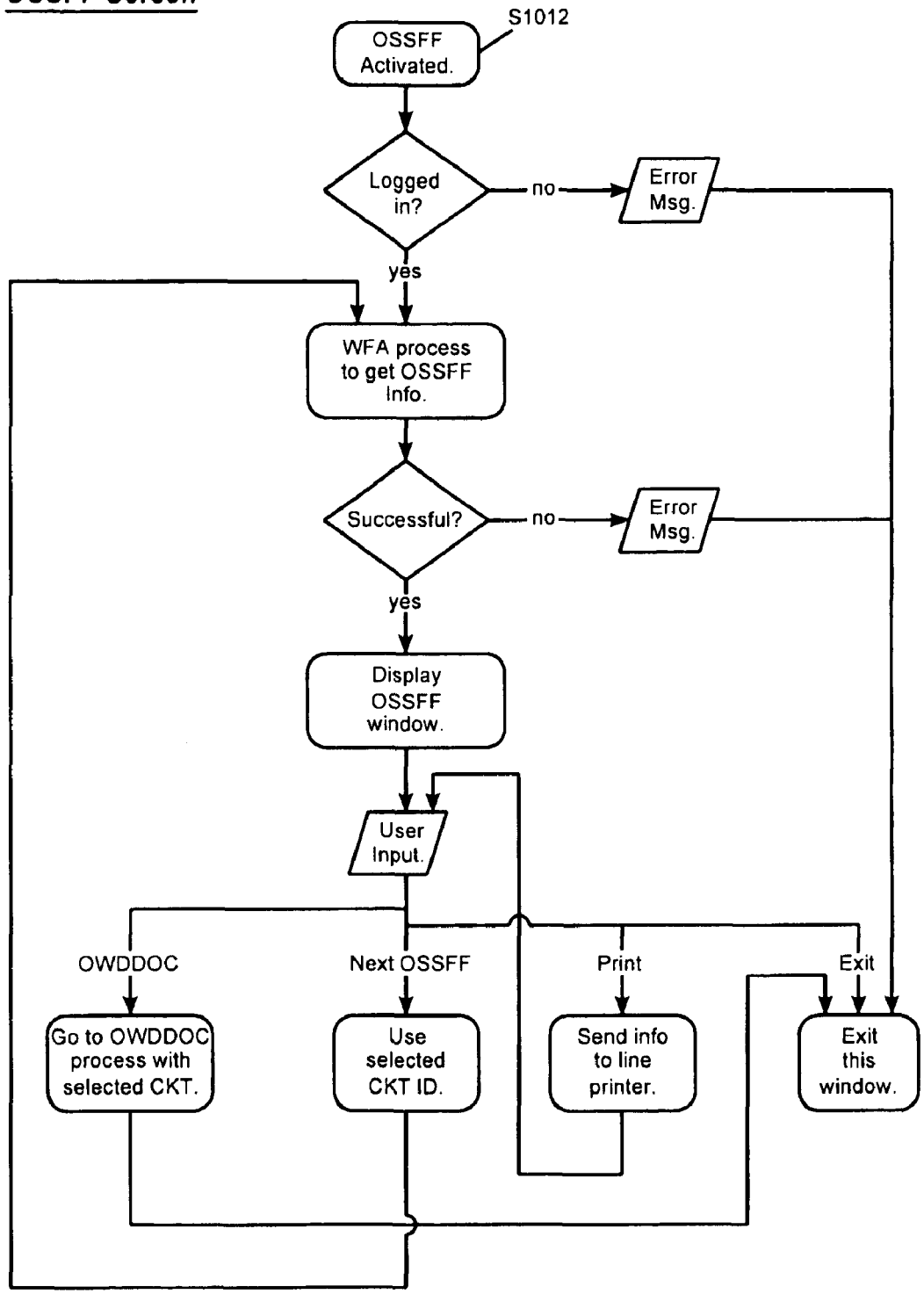

The OSSFF activity window, the flowchart of which is illustrated in FIG. 58, is provided to enable the user to view the NSDB Facility-to-Circuit Database relationships. That is, the user can display the circuits riding directly on a given facility or display the facility that the given circuit is riding on. a sample OSSFF window is shown, for example, at page 4-67 of the aforementioned "Work and Force Administration/Control (WFA/C) User Manual".

g. OSSLR

Figure 59:
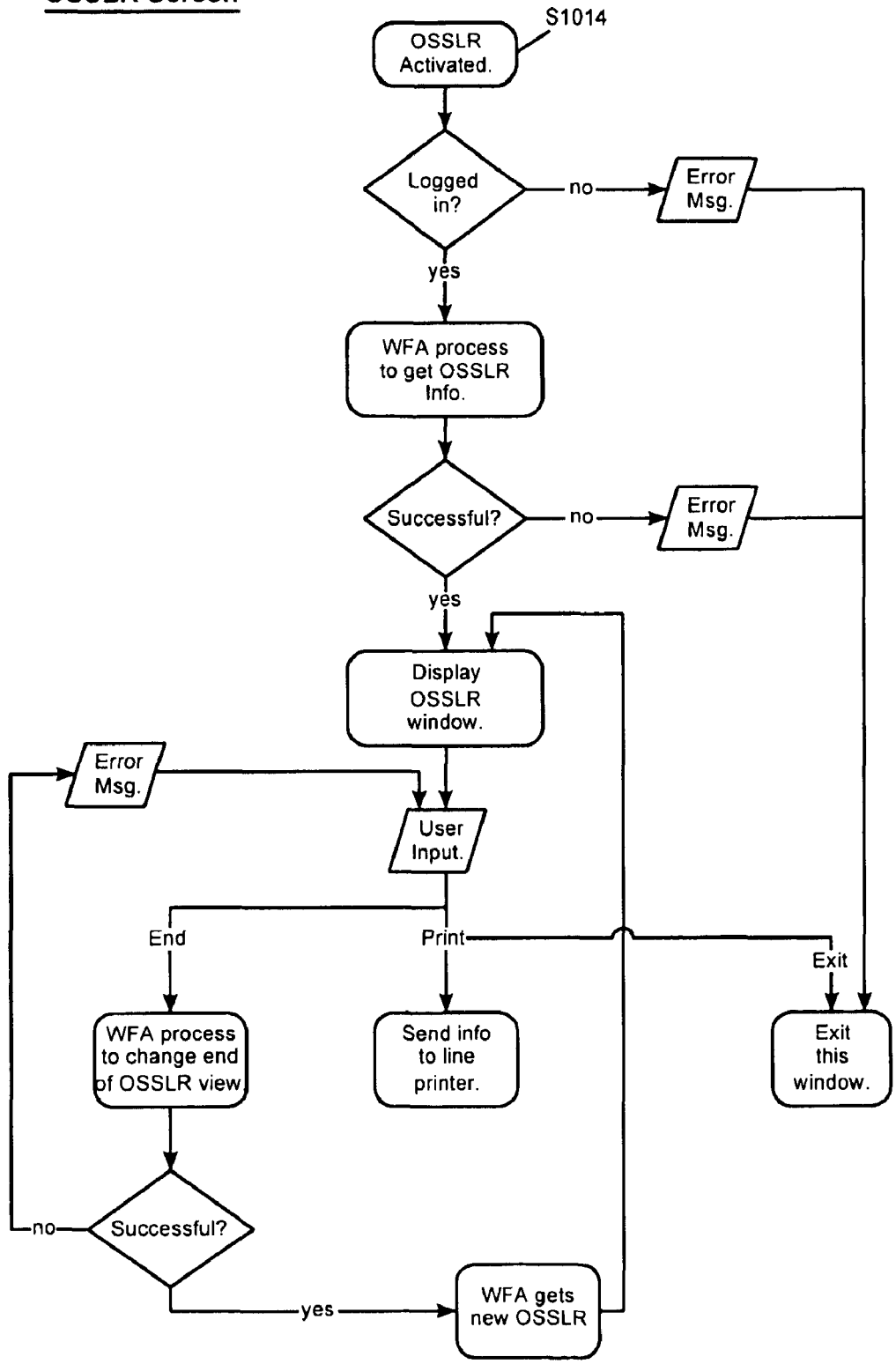

The Line Record Display (OSSLR) activity window is a "find only" screen that shows the entire line record for a given Circuit ID (CKT), Circuit Access Code (CAC), Order Number (ORD), or Tracking Key/Circuit Layout Order Number (TRK/CLO). Since this window is a "find only" screen, retrieved information may not be over typed and updated by the user. The flowchart for-this activity window is illustrated in FIG. 59 and is shown, for example, at page 4-22 of the aforementioned "Work and Force Administration/Control (WFA/C) User Manual".

h. WFA/C Trouble Report Entry (OSSTRE)

Figure 61:
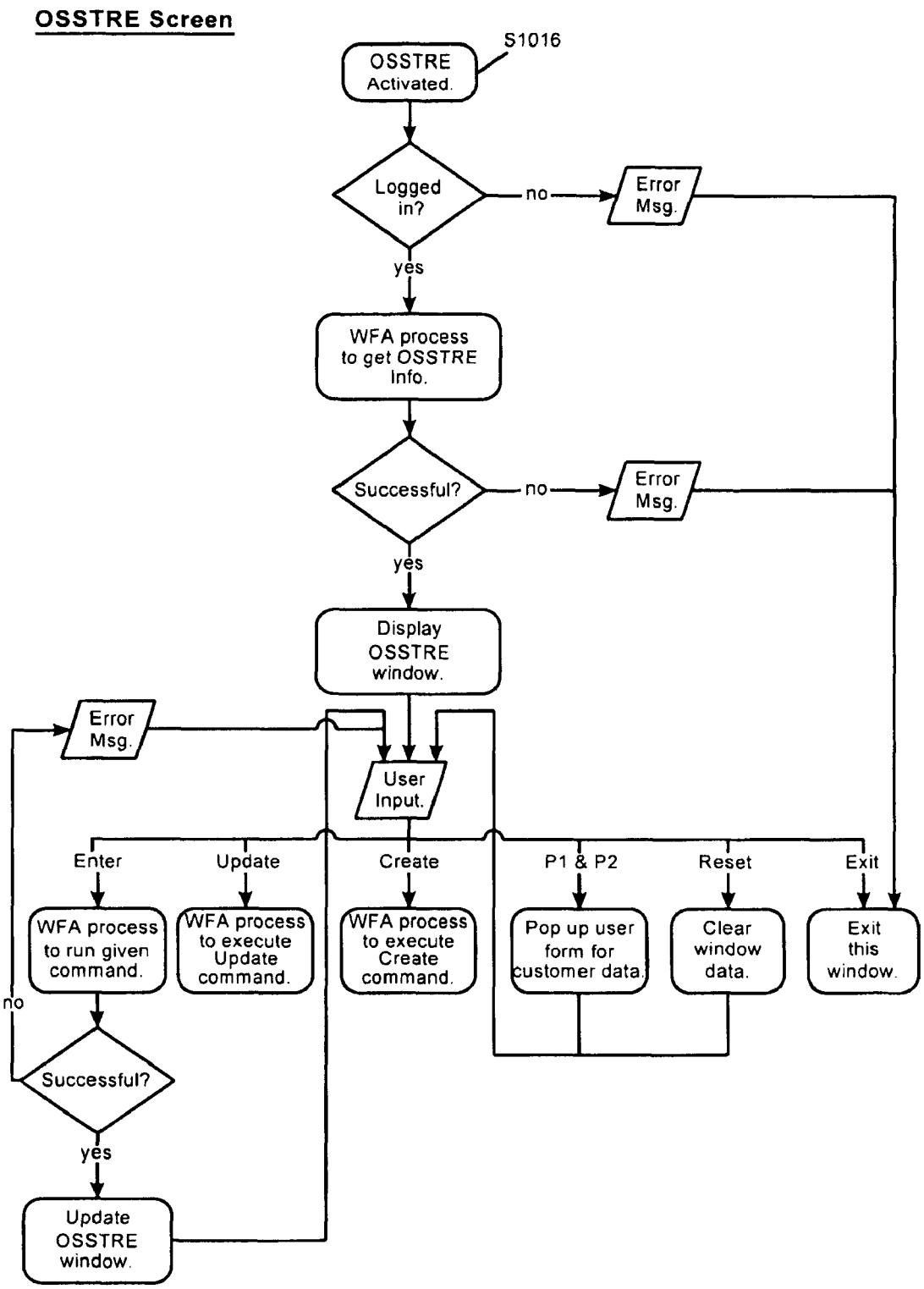

The flowchart for the OSSTRE activity window (step S1016), shown in FIG. 61, is provided to allow a user to enter a trouble report on a special device, a message, a carrier, and a non-designed service. The user can add a "miscellaneous" trouble report in this window. In addition, the user can add, update, cancel and transfer trouble reports. a sample window is shown at page 6-21 of the aforementioned "Work and Force Administration/Control (WFA/C) User Manual".

i. OSSOI

Figure 60:
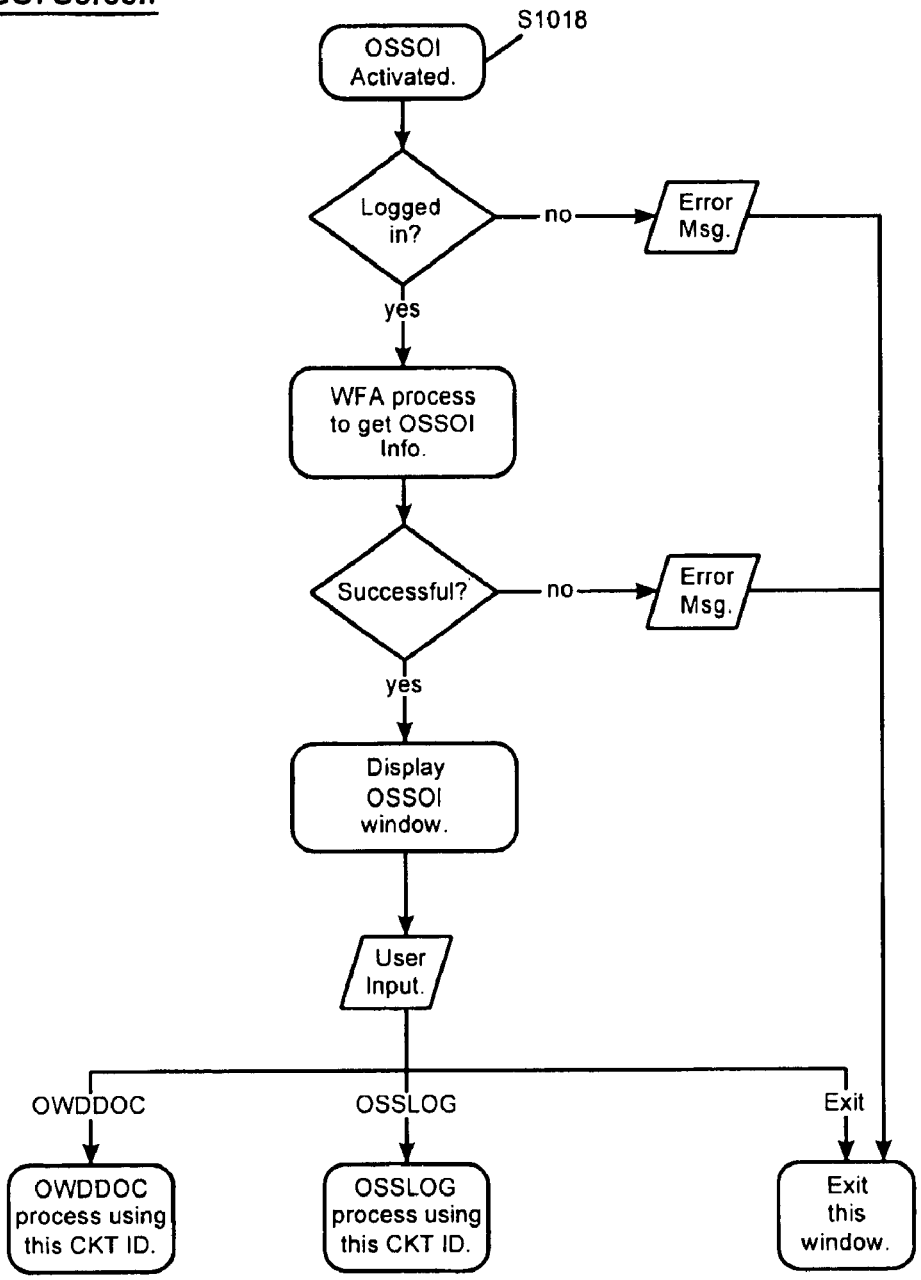

The WFA/C Order Information (OSSOI) activity window is a two page screen that shows administrative, tracking and customer/premise order information. In addition, the user can also issue an auto-test request from this screen. The flowchart for this activity is illustrated in FIG. 60. Sample windows are illustrated at pages 5-26 to 5-28 of the aforementioned "Work and Force Administration/Control (WFA/C) User Manual".

When the OSSOI window is opened, the user can select to go to the WFA/C Work Log (OSSLOG) window to display a detailed account of activities on an order or trouble report. This screen, which is a display-only screen, shows activities in date/time sequence with the most recent activity at the top.

Alternatively, the user can select to go to the WORD Access (OWDDOC) activity screen, discussed above, or exit the OSSOI window.

GRETA Security

Figure 12:
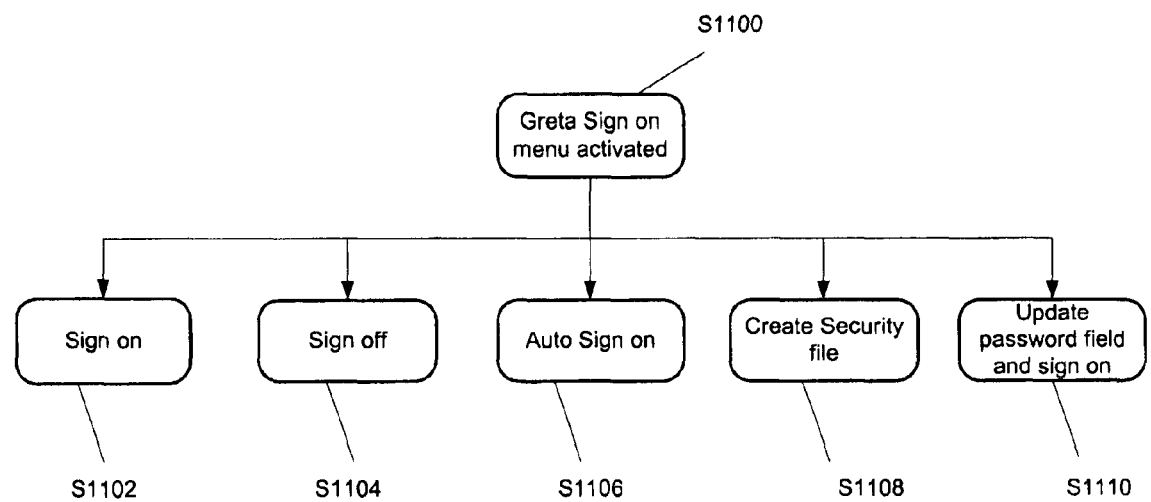

The Greta Security flowchart is illustrated in FIG. 12. When this activity window is selected by the user, a new menu is presented to the user. In the disclosed embodiment, the new menu provides five options from which to choose:

a sign on option,
a sign off option,
an automatic sign on option,
a security file creation option, and
a password field update and sign on option.

Figure 13:
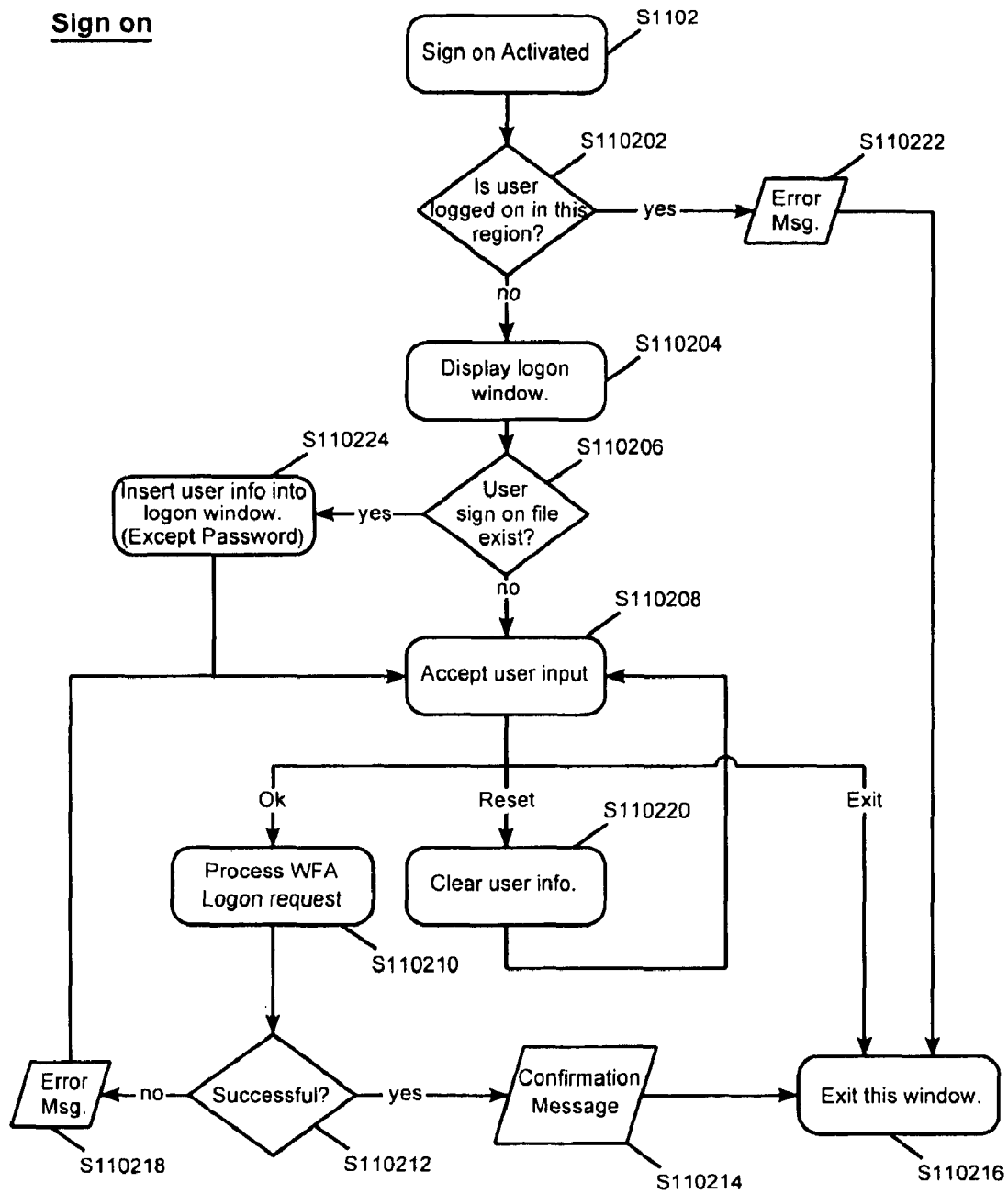

The Sign On option executes the flowchart illustrated in FIG. 13. In this routine, the user attempts to log onto the system and a determination is made as to whether the logon and password are valid. If the inputted data is valid, the user is given access to the system, a confirmation message is produced, and the program exits the Sign On window (steps S110202 to S110216). Otherwise, an error message is produced and the program exits.

Figure 14:
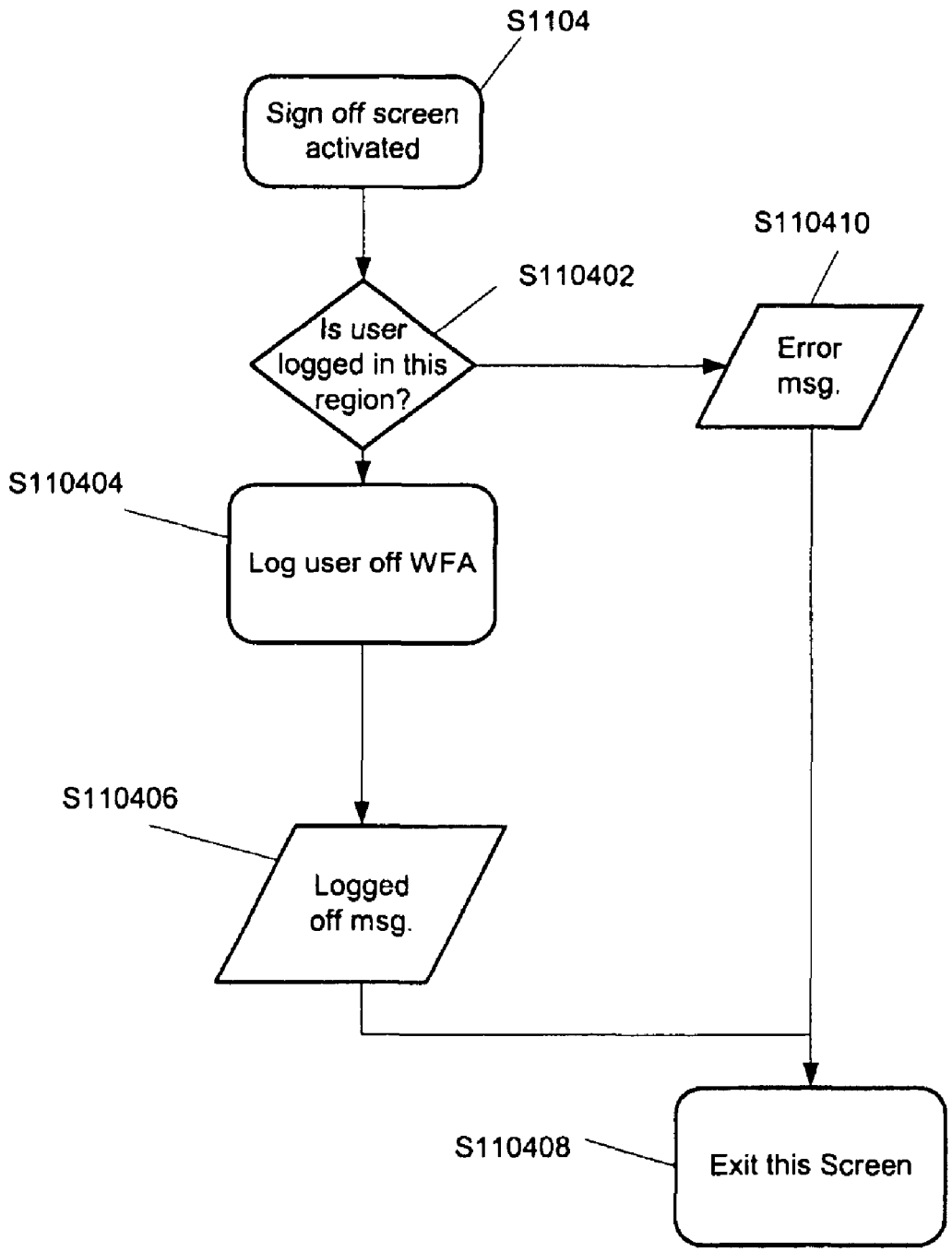

The Sign Off option executes the flowchart illustrated in FIG. 14. In this routine, when the user logs off the system, a log off message is displayed, and then the system exists the Sign Off window (steps S110402 to S110408). On the other hand, if it is determined that the user is already logged off in this region (e.g., the user is not currently signed on the system), an error message is produced at step S10410 and the Sign Off window closes.

Figure 15:
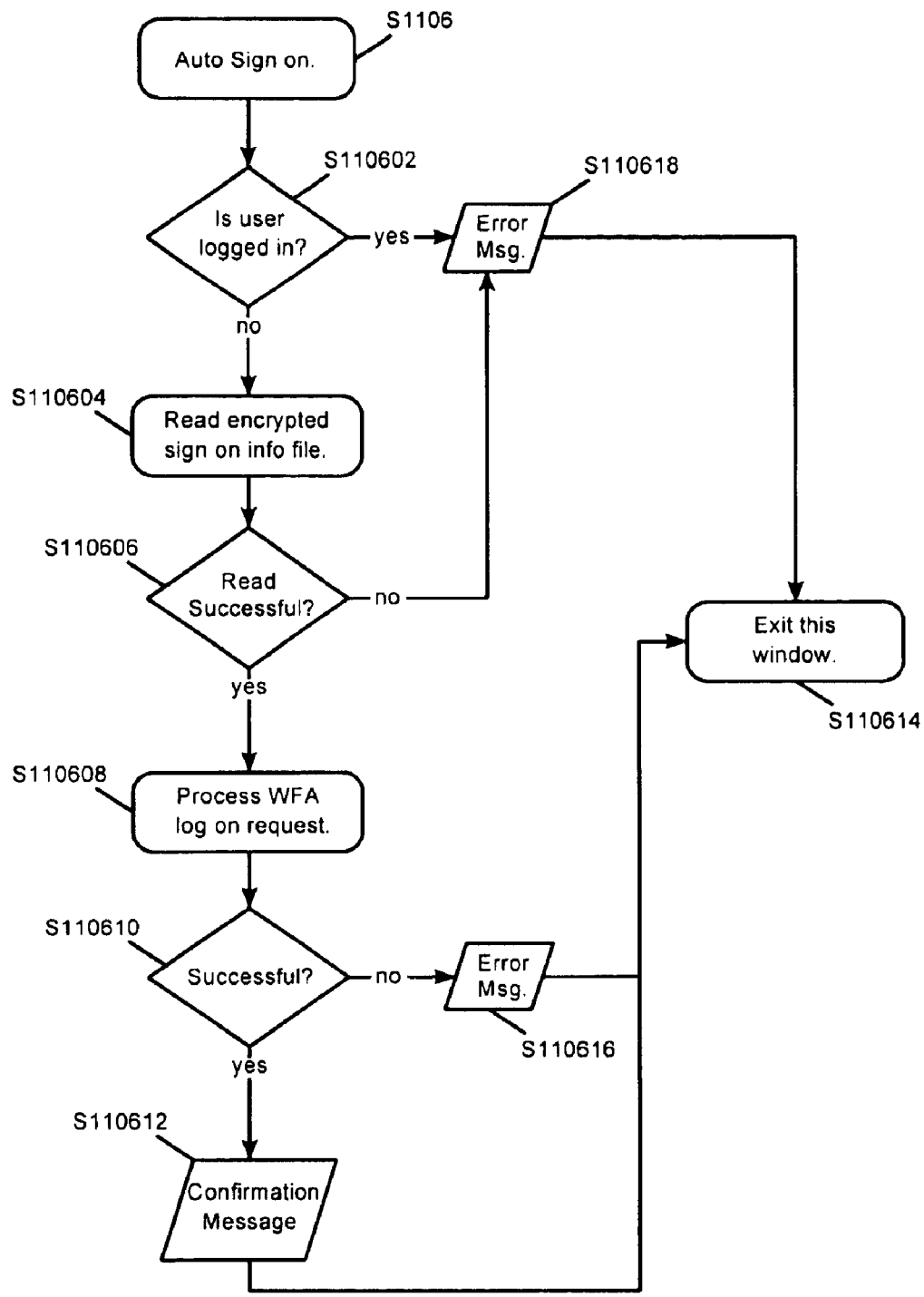

The Automatic Sign On option executes the flowchart illustrated in FIG. 15. In this routine, an encrypted sign on file is read and processed to log onto the system. If the encrypted file was successfully processed, a confirmation message is produced, and the Automatic Sign On window closes (steps S110602 to S110614). Otherwise, an error message is produced (step S10616) and the Automatic Sign On window closes without the user gaining access to the system.

Figure 16:
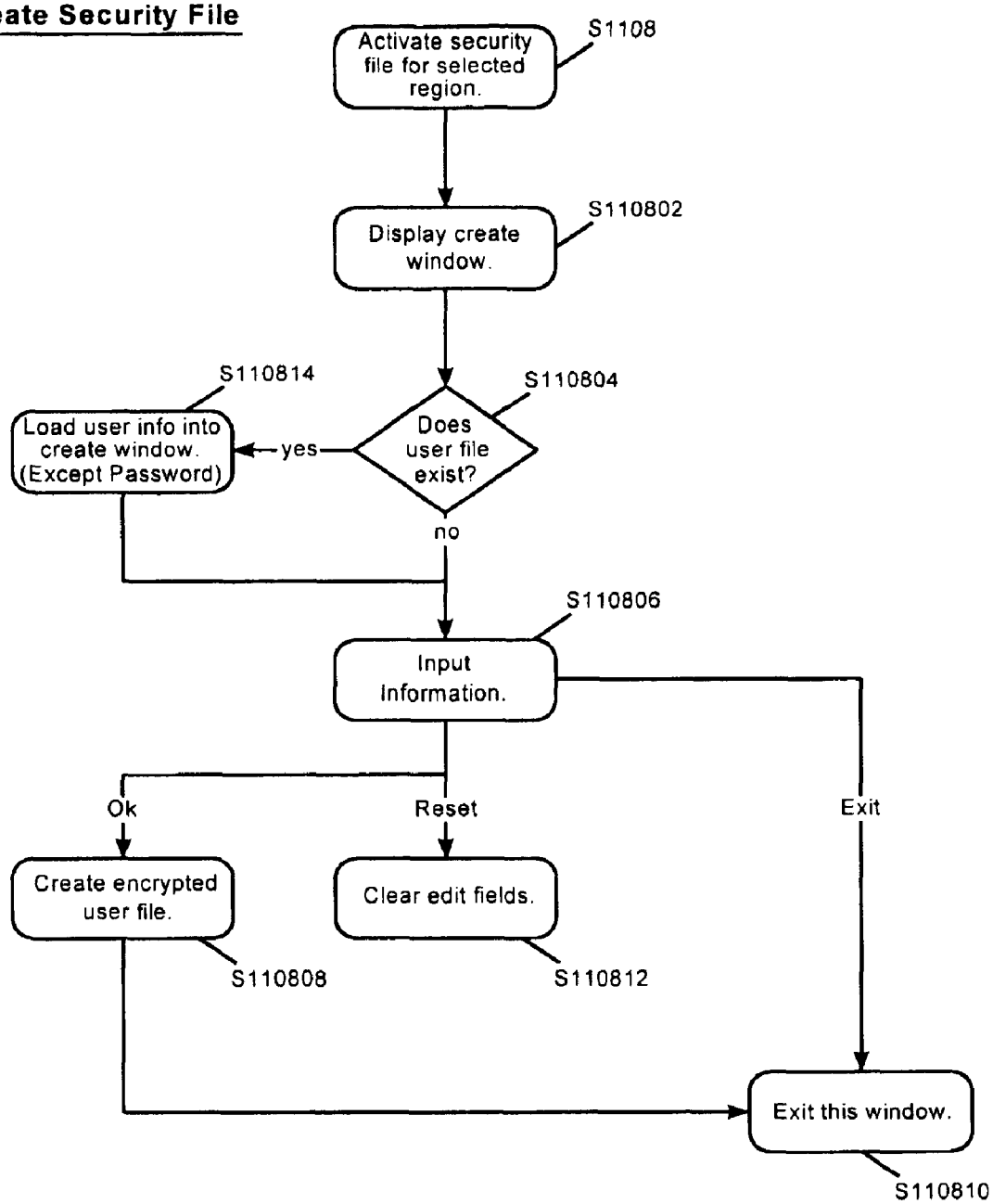

The Create Security File option executes the flowchart illustrated in FIG. 16. a determination is made as to whether an information file already exists for the user attempting to create a security file. If an information file does not exist, required information is entered by the user, which is then encrypted before this window closes (steps S110802 to S110810). Should the user make a mistake while inputting the required information, the user is given the option (step S110812) of reentering the information by clearing all the edit fields. If it was determined at step S110804 that an information file already exists on the user, the information file is loaded (except for the password) (step S110814), thus reducing the amount of data that needs to be inputted by the user.

Figure 17:
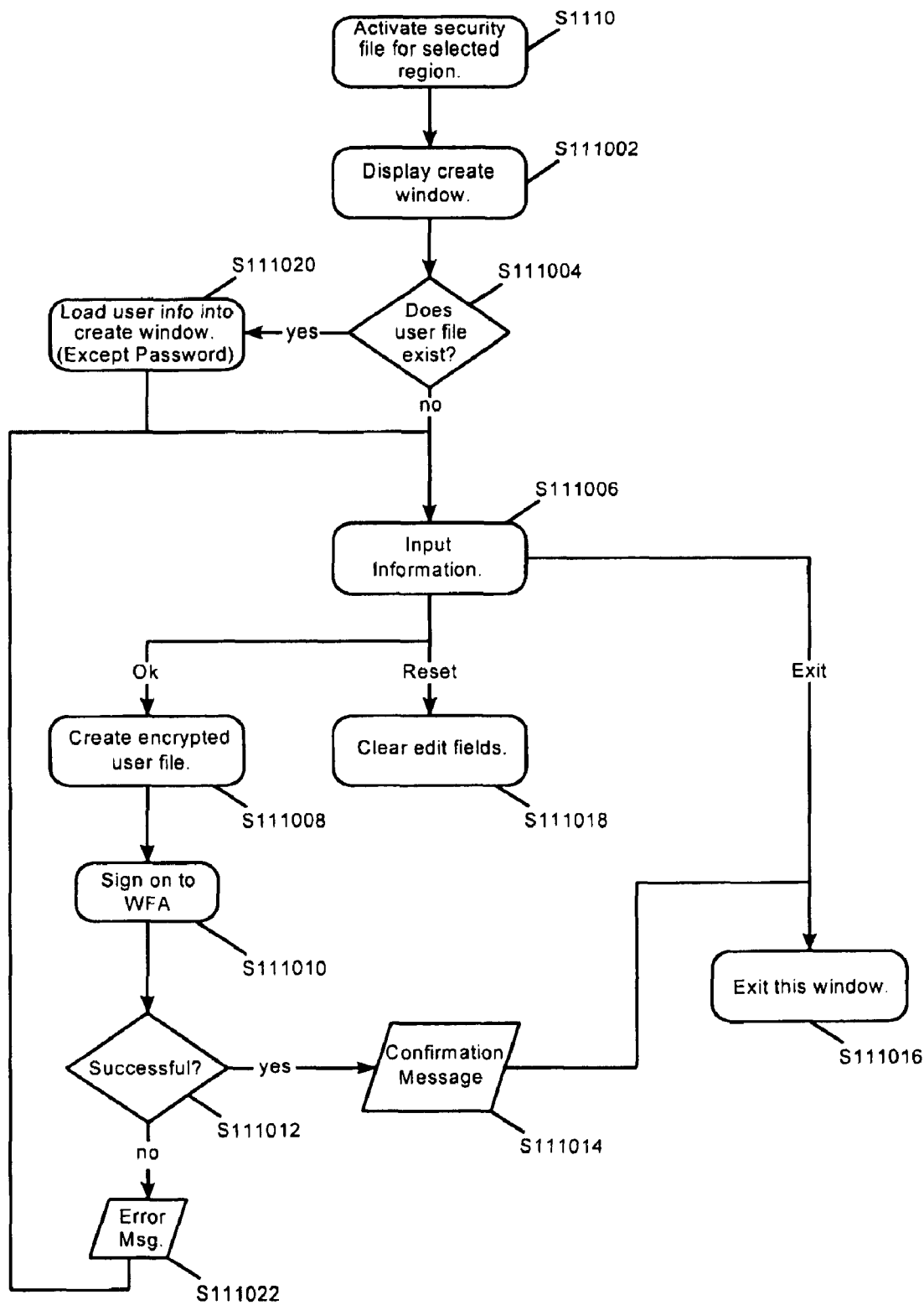

The Update Password File And Sign On option executes the flowchart shown in FIG. 17. This option is provided to allow the user to update his/her user profile for signing onto the system (steps S111002 to S111016). If the user makes a mistake while updating the user profile, the edit fields can be cleared (step S111018).

Window Cascade

Figure 18:
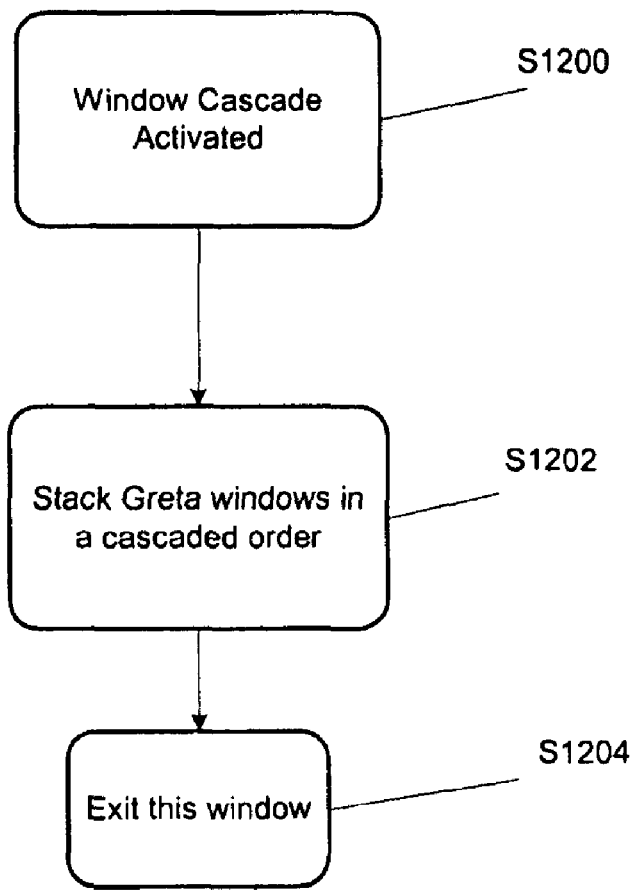

The Window Cascade activity option is illustrated in FIG. 18. This routine is executed when the user prefers to have the various windows stacked in a cascaded order. When this routine is run, step S1202 instructs the system to cascade the various windows, as opposed to tiling the various windows.

GRETA Help/Tutorial

Figure 22:
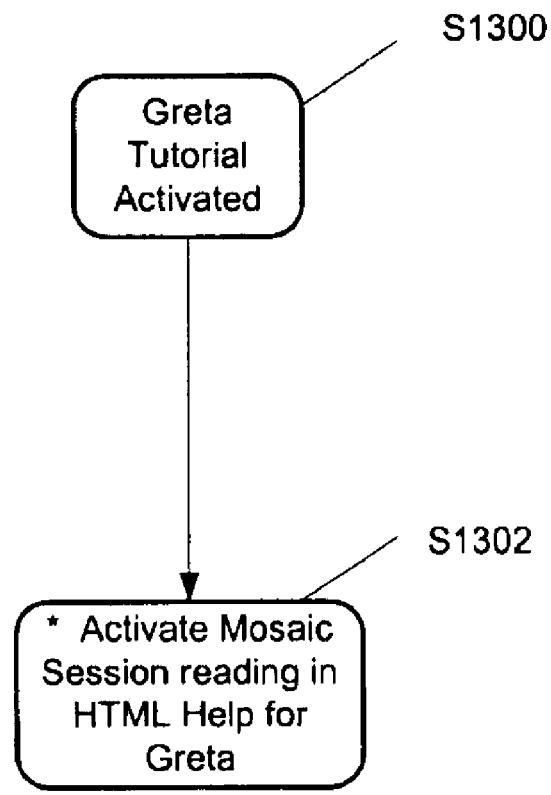

The Greta Help/Tutorial option is illustrated in FIG. 22. This routine is executed when the user wishes to obtain assistance (help) with the operation of Greta. When this option is executed, step S1302 is executed to activate a Mosaic Session that reads a HTML help file for display. It is noted that Mosaic runs independently of Greta.

Window Select

Figure 19:
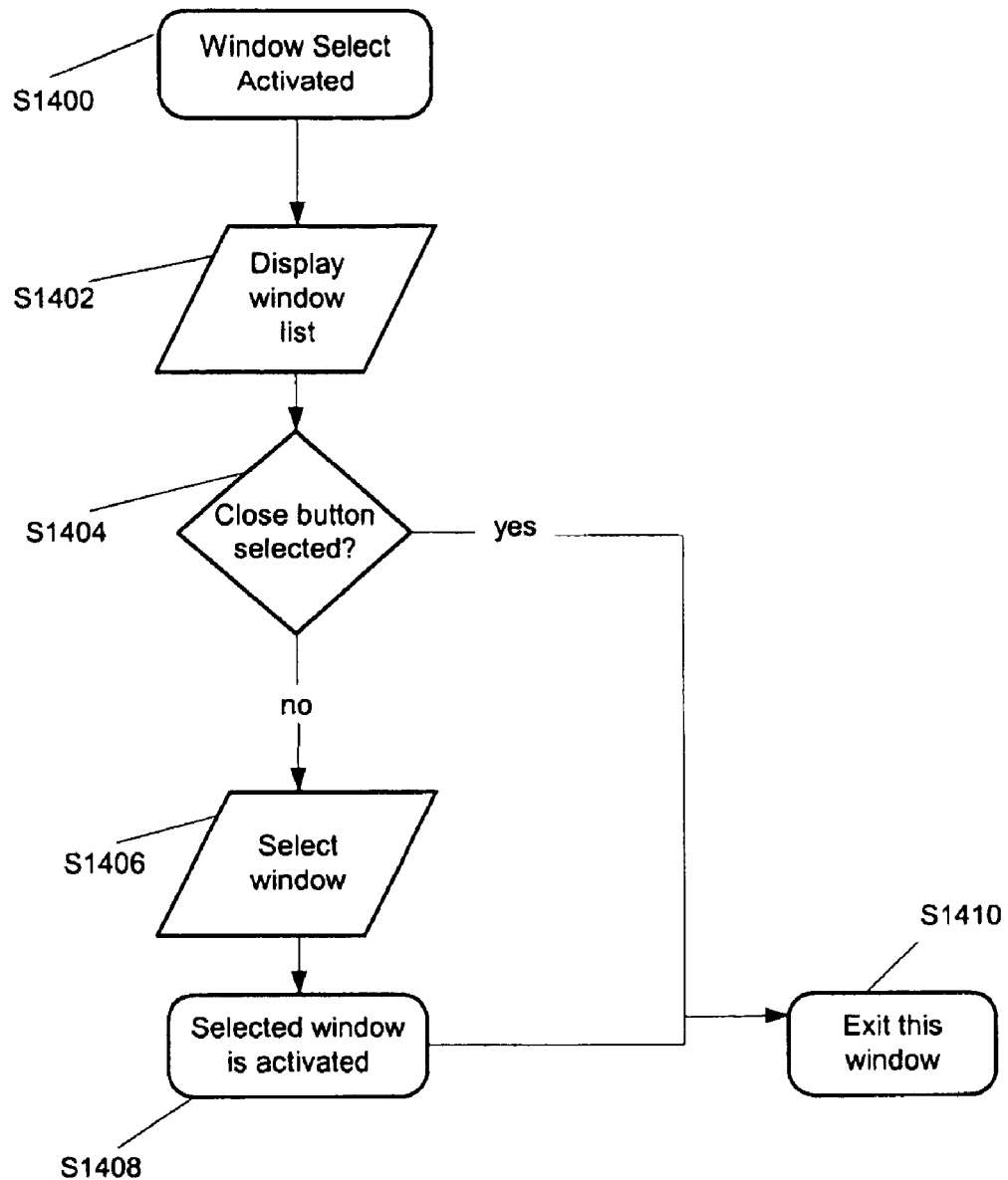
Figure 20:
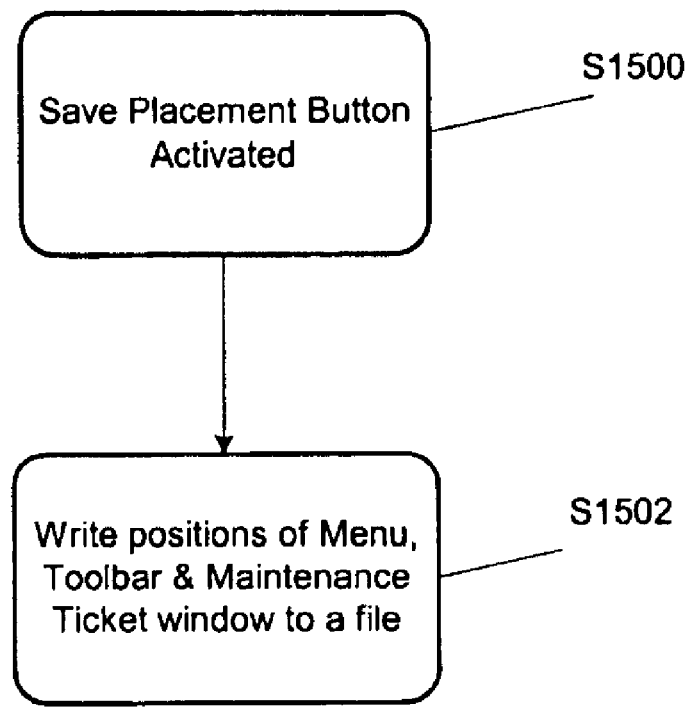

The flowchart for the Window Select activity option is illustrated in FIG. 19. This routine is executed to enable the user to activate the desired window (option). According to this routine, a list of available windows is displayed. If the user selects a desired window, the selected window is activated and the Window Select window closes (steps S4102 to S1410). On the other hand, if the user decides against selecting a desired window, and instead selects a "CLOSE" button (step S1404), the current window closes without selecting a new window to open, Save Placement The Save Placement window (routine), illustrated in FIG. 20, operates to write the positions of the menu, toolbar, and maintenance ticket window to a file that is read when the GRETA application is started. That is, this file contains default information for the particular user, such as, for example, whether the windows should be tiled or cascaded, positions of the menu and toolbar, etc.

GRETA About

Figure 21:
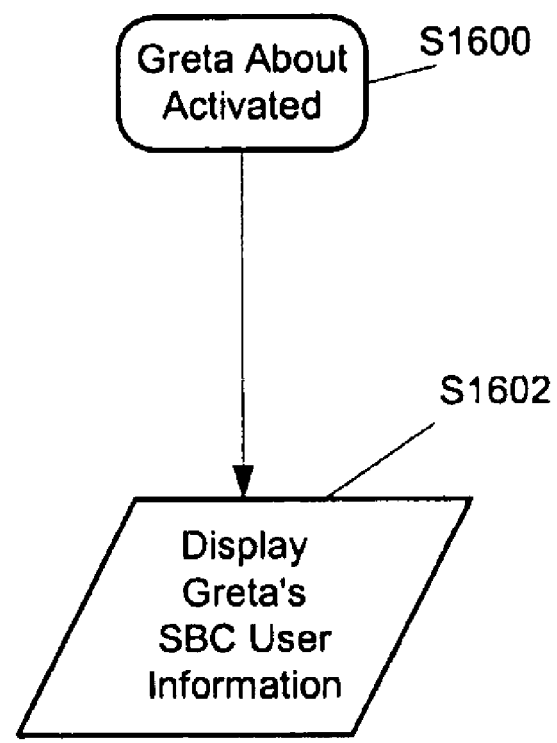

The Greta About Window routine is illustrated in FIG. 21. When this window is selected, information specific to Greta, such as, for example, the version number, program creation date and programmer's names are displayed.

Maintenance Ticket Window

Figure 23:
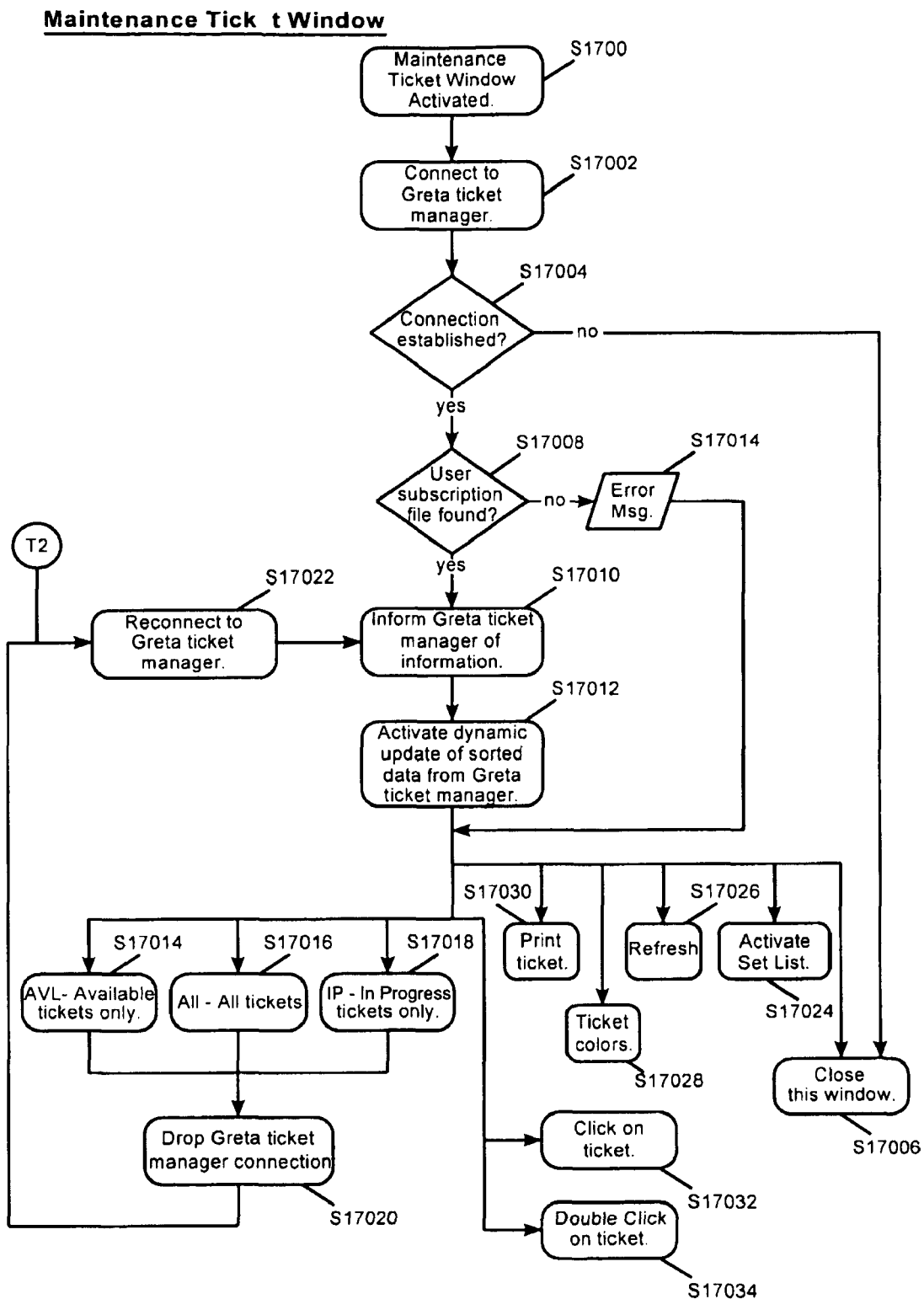

The flowchart for the Maintenance Ticket Window is illustrated in FIG. 23. When this activity window is selected, the system connects to the Greta ticket manager (step S17002), to be discussed below. If a connection can not be established, the maintenance ticket window closes (steps S17004 and S17006). On the other hand, if a connection is established, a determination is made as to whether a user subscription file exists. If the user subscription file exists, the information contained in the file is provided to the Greta ticket manager and the data sorted by the Greta ticket manager is dynamically updated (steps S17008 to S17012). On the other hand, if a user subscription file is not found, an error message is produced (steps S17008 and S17014), and steps S17010 and S17012 are skipped.

Thereafter, in the disclosed embodiment, the user is able to select from the following options:

Available Tickets Only
All Tickets
In Progress Tickets
Click On Ticket
Double Click On Ticket
Print Ticket
Ticket Colors
Refresh
Activate Set List
Close Maintenance Ticket Window Based upon the above, the user can select to update either all available tickets, all tickets or only those tickets that are in progress (steps S17014, S17016, or S17018). Thereafter, the Greta Ticket Manager connection is dropped (step S17020), the connection is re-established (step S17022), and processing loops back to step S17010.

Figure 24:
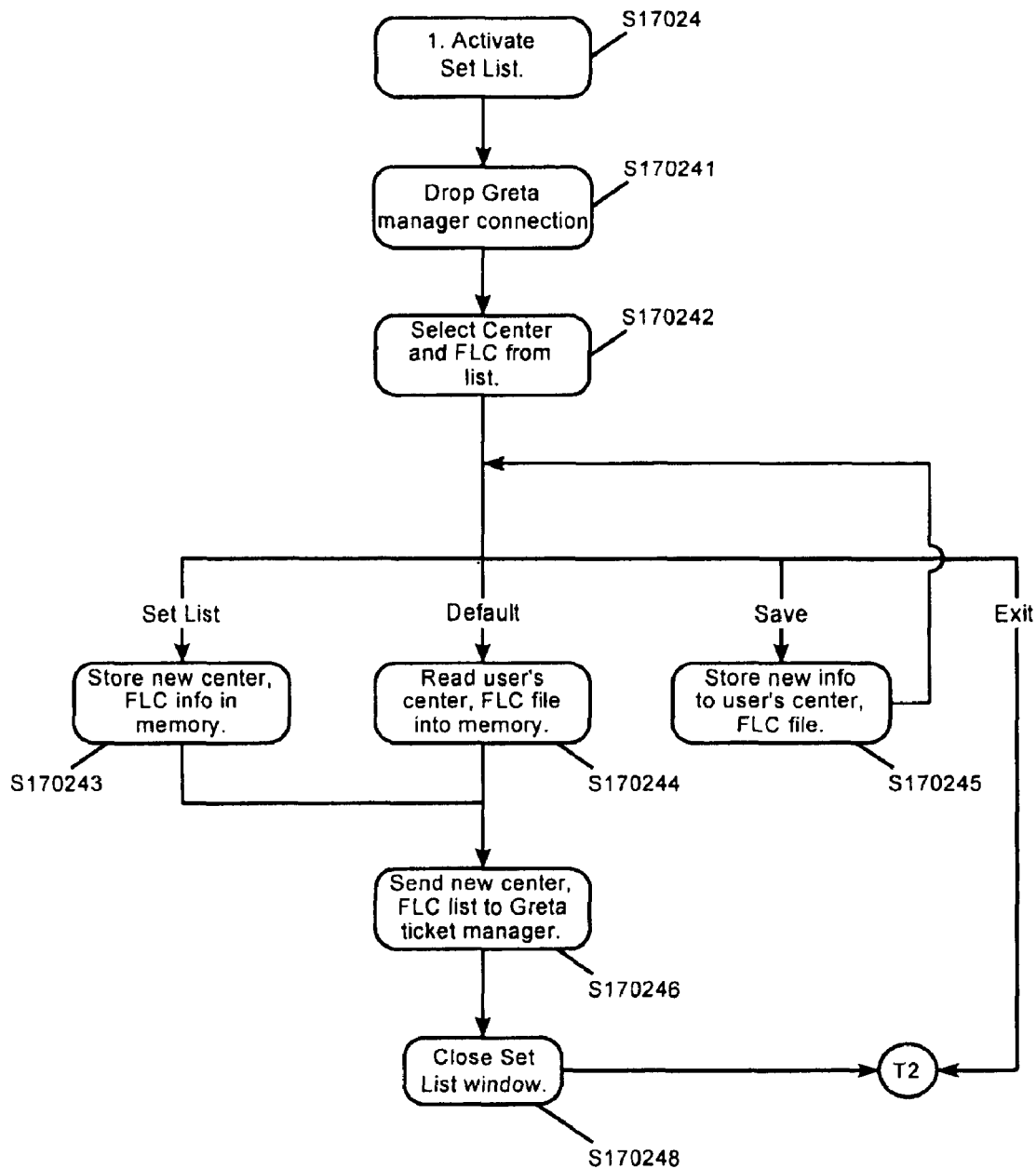

When the Activate Set List activity window is selected, the program illustrated in FIG. 24 is executed. First, the Greta manager connection is terminated (step S170241) and then, the center and specific work group (FLC) file is selected (step S170242). The user is then presented with the option of setting a list (step S170243), using a default list (step S170244), saving a list (step S170245), or exiting.

When the list set option is selected, the center and specific work group file selected at step S170242 is stored to the memory before processing proceeds to step S170246. When the default option is selected, the user's center and specific work group selected at step S170242 is read into the memory before proceeding to step S170246. If the save option is selected, the information selected at step S170242 is saved to the user's center and specific work group file before processing proceeds to step S170246. If the user elects to exit from this window, processing returns to step S17022 in FIG. 23.

At step S170246, the center and specific work group (FLC) list is provided to the Greta ticket manager, after which the Activate Set Limit Window is closed (step S170248, and processing returns to step S17022 in FIG. 23.

Figure 25:
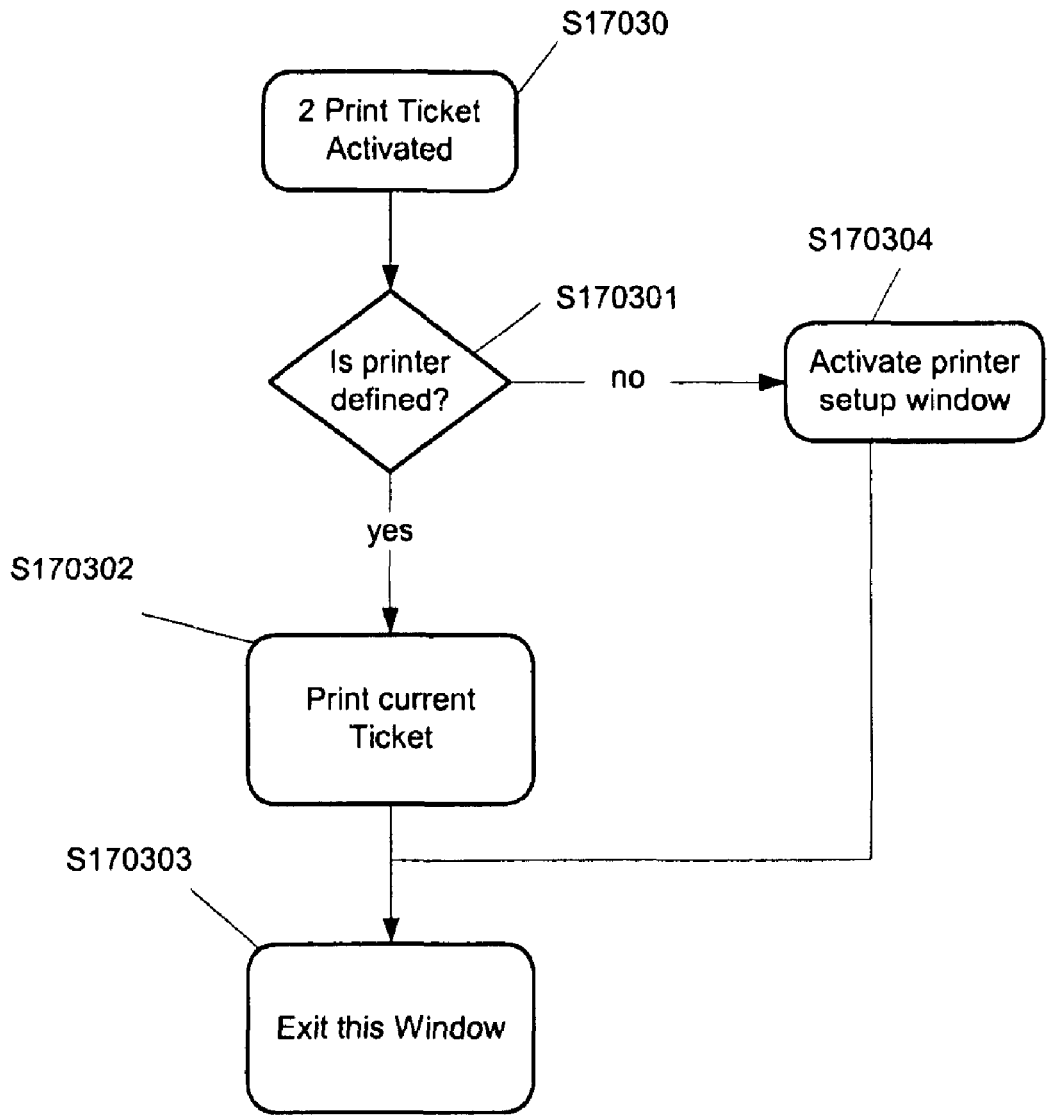

When the Print option is selected, the program illustrated in FIG. 25 is executed. An initial determination is made as to whether a printer is defined. If the printer is defined, the current ticket is printed, and the print window exits (steps S170301 to S170303). However, if it is determined at step S170301 that a printer has not been defined, another window pops up to allow the user to select a printer (step S170304).

Figure 26:
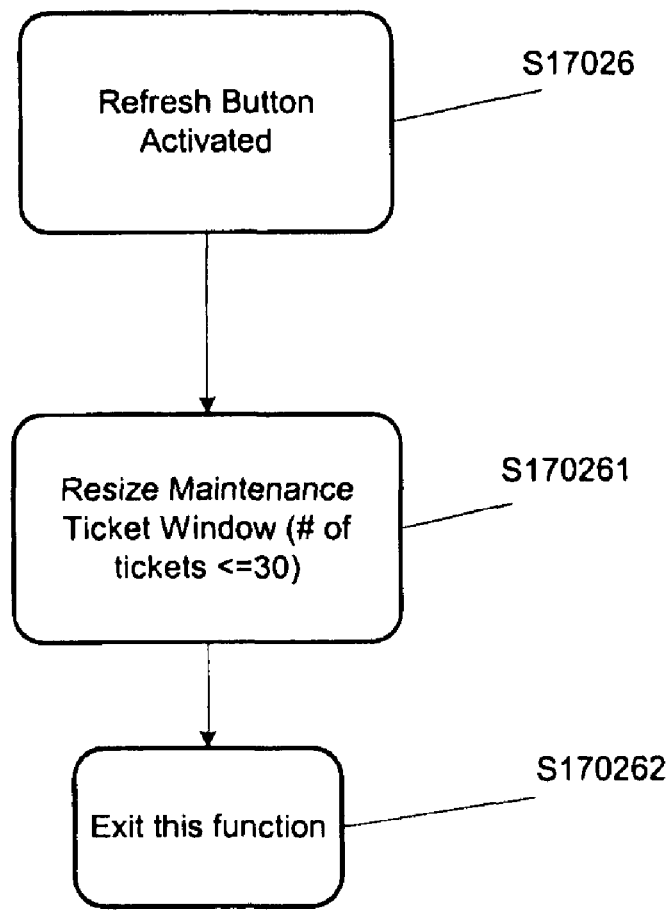

When the Refresh activity option is selected, the program illustrated in FIG. 26 is executed to resize the maintenance ticket window to show a maximum of 30 tickets (steps S170261 and S170262).

Figure 27:
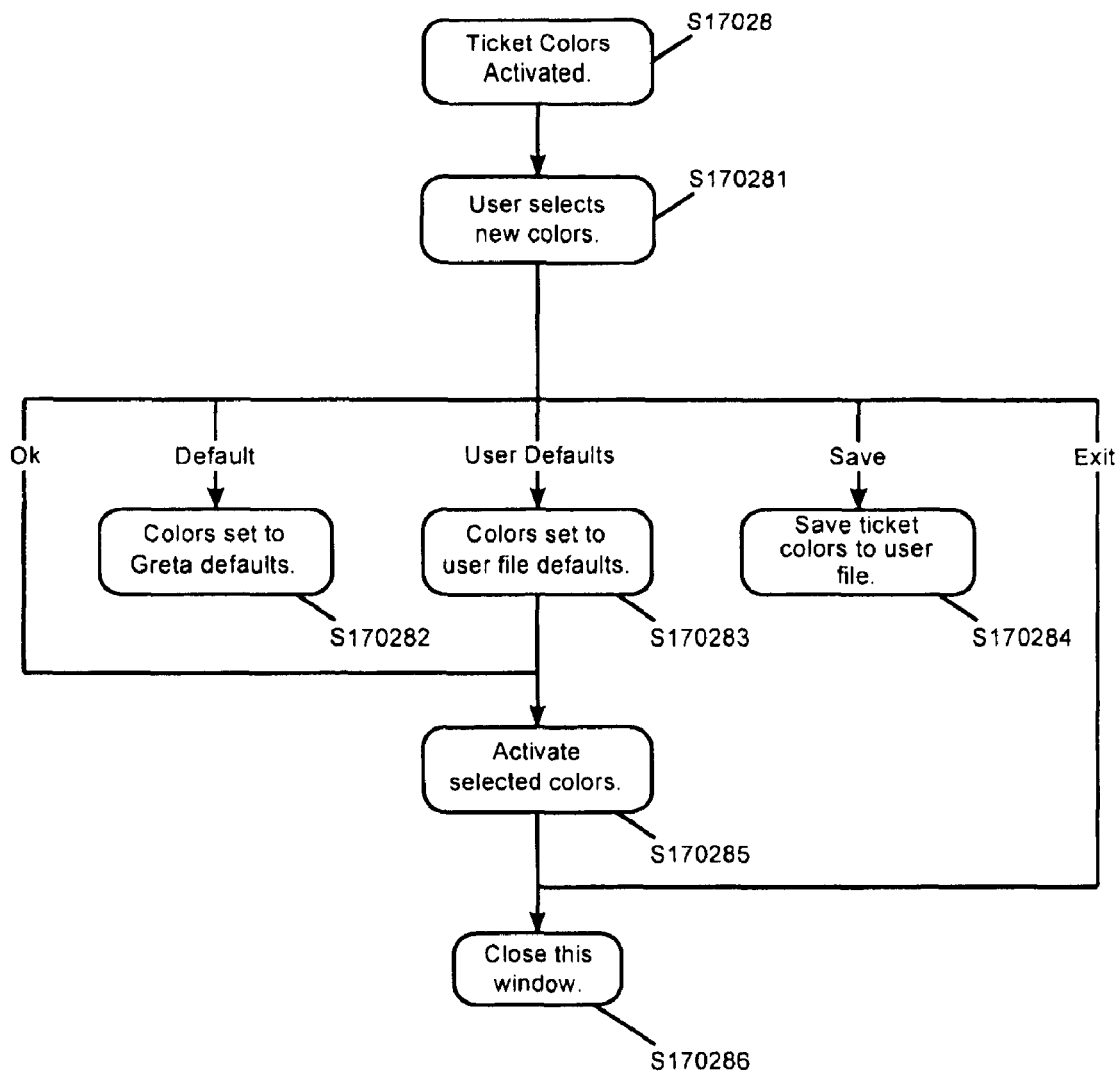

When the Ticket Colors activity option is selected, the program illustrated in FIG. 27 is executed. When this window appears, the user is presented with a choice of new colors. The user can either:

accept general default colors (step S170282), or select a user's default colors (step S170283).

The user is able to save the ticket colors to a file for future use (step S170284), and when the user clicks (selects) the "OK" button, the user's default colors (selected new colors) are activated (step 170285) and the window closes (step S170286). It is also noted that the user can also exit this window without selecting the ticket colors.

Figure 29:
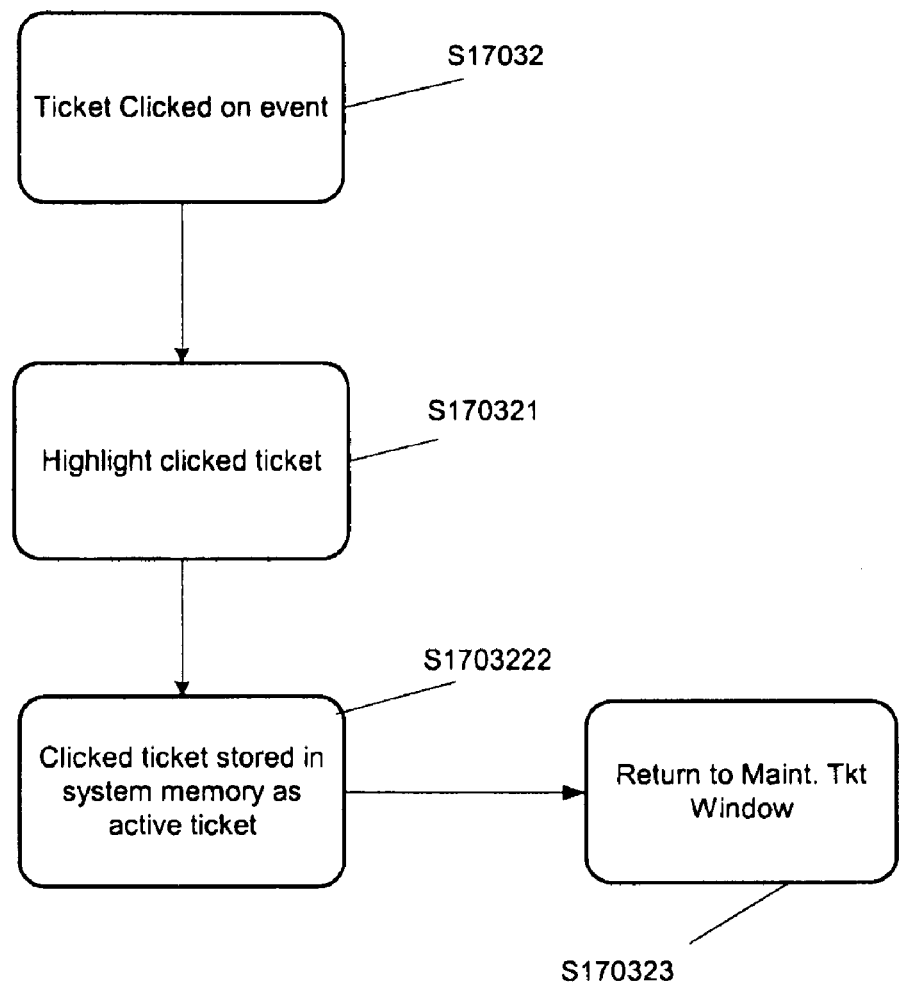

When the Click On Ticket option is selected, the flowchart illustrated in FIG. 29 is executed. In this routine, a ticket that is clicked upon (using a mouse) is highlighted and placed in the system memory as an active ticket. Thereafter, processing returns to the Maintenance Ticket Window of FIG. 23 (steps S170321 to S170323).

Figure 30:
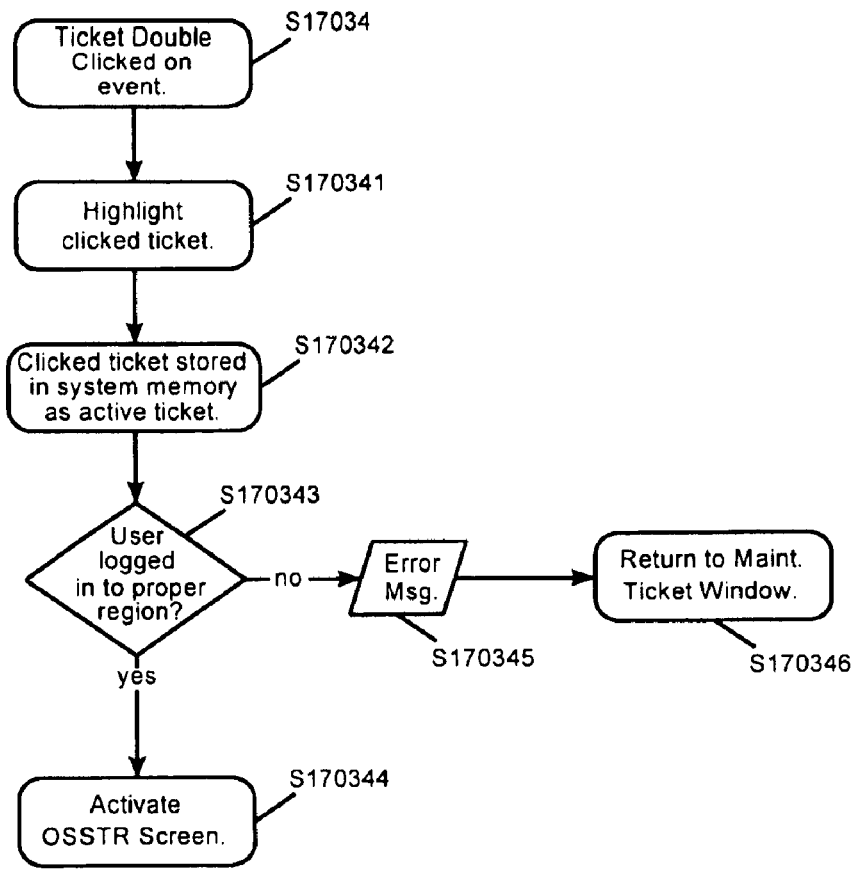

When the Double Click On Ticket option is selected, processing proceeds in accordance with the flowchart shown in FIG. 30. Specifically, a ticket that is clicked upon is highlighted and placed in the system memory as an active ticket. Thereafter, a determination is made as to whether the user is logged into the proper region. If the determination is affirmative, processing proceeds to activate the WFA/C trouble Report/Activity (OSSTR) screen, which will be described below (steps S170341 to S170344). However, if it is determined that the user is not logged into a proper region, an error message is produced and processing returns to the Maintenance Ticket Window of FIG. 23 (steps S170341 to S170343, S170345 and S170346).

Figure 28:
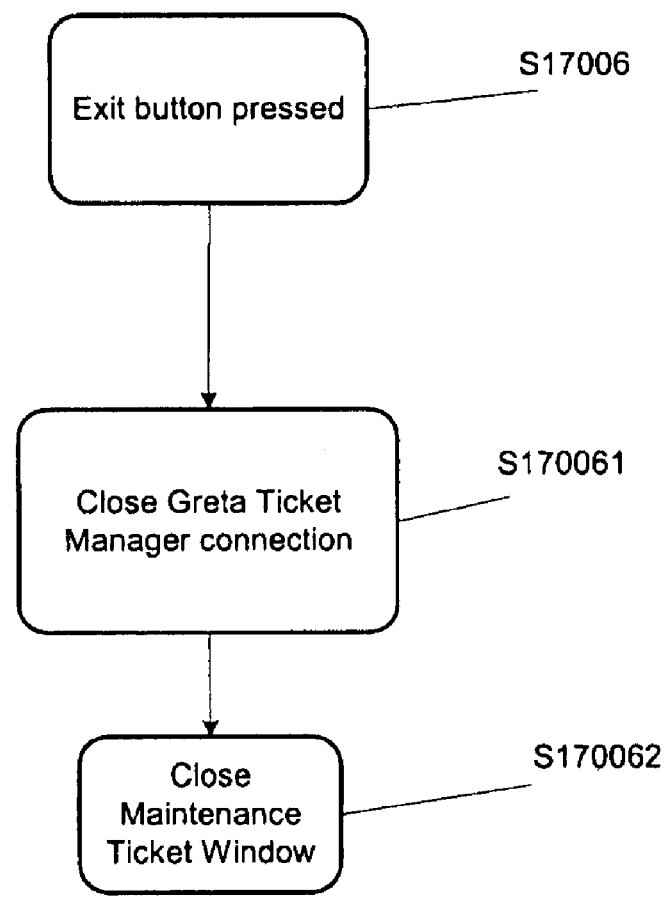

The user may also decide to close the Maintenance Ticket Window. When this option is selected, the flowchart shown in FIG. 28 is executed to close the Maintenance Ticket Window, after which the Greta Ticket Manager connection is terminated (steps S170061 and S170062).

Greta Ticket Manager

Figure 62:
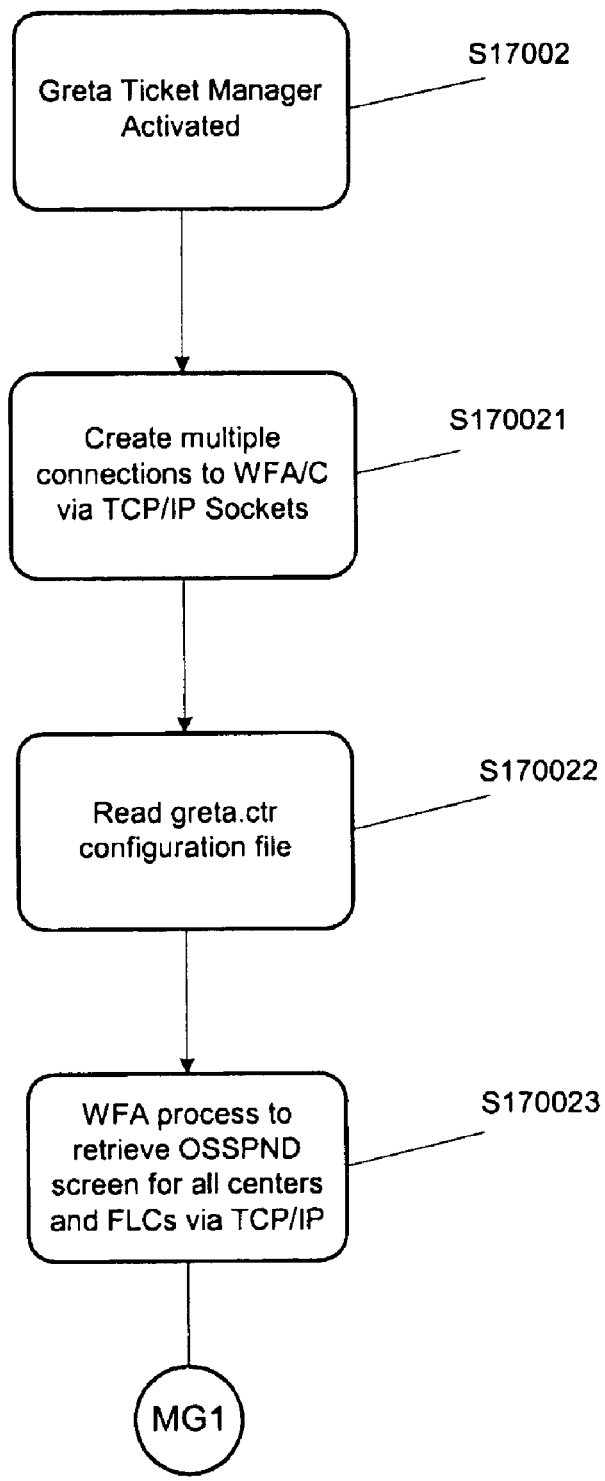

The Greta Ticket Manager (see FIGS. 62 and 63) is called by the Maintenance Ticket Window (at step S17002) of FIG. 23. In this routine, multiple connections are established to the WFA/C via TCP/IP sockets. a configuration file (e.g., greta.ctr) is read, and then, a WFA/C Pending Trouble List (OS-SPND) screen is brought up, via the TCP/IP sockets, for all centers and specific work groups (FLCs). Thereafter, the system waits for a predetermined period of time (e.g., 60 seconds) for requests from the Greta ticket window. After the time period elapses, a determination is made as to whether a center/specific work group (FLC) list was requested. If the determination is negative, it is determined whether a new Greta user is online. If this determination is negative, the OSSPND screens for all defined centers and specific work groups (FLCs) are retrieved (steps S170021 to S170027).

Next, another determination is made as to whether the Greta user is connected via the TCP/IP sockets. If the determination is positive, the,subscribers are updated (steps S170628 and S170029) and processing returns to step S170024. However, if the Greta user is not connected, step S170029 is skipped, and thus, processing returns to step S170024 without updating the subscribers.

It is noted that if a center/FLC list was requested at step S170024, step S170030 is executed to send the list of available centers and FLCs via the TCP/IP sockets, before executing step S170026.

Similarly, if it is a new Greta user,at step S170026, step S170031 is executed to send all data for the center/FLC requested via the TCP/IP sockets before executing step S170027.

a sample OSSPND screen is shown at page 6-195 of the aforementioned "Work and Force Administration/Control (WFA/C) User Manual".

Specify Ticket

Figure 31:
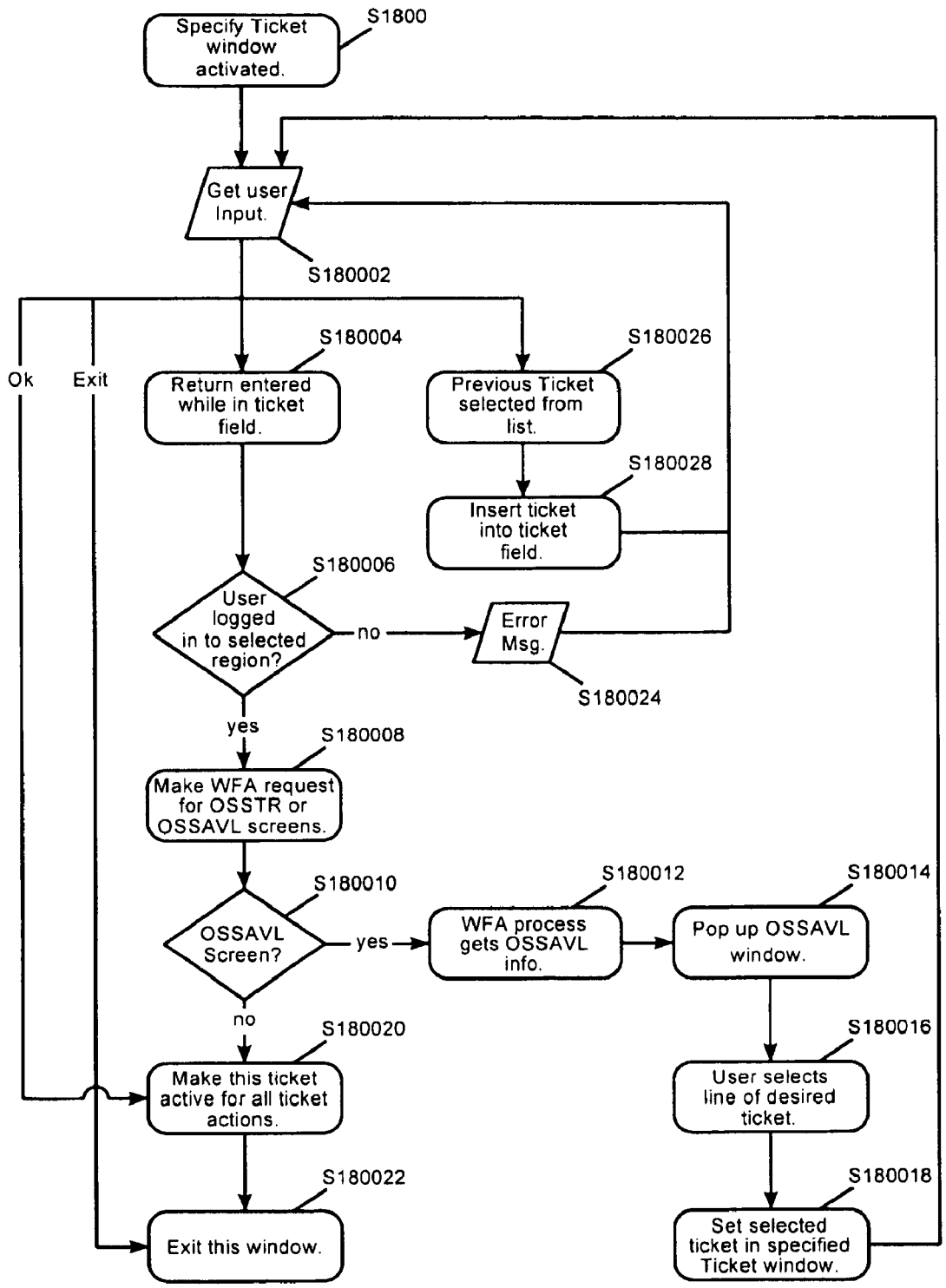

The specify ticket activity routine is illustrated in FIG. 31. When this activity routine is selected, a specify ticket window pops up that permits the user to select a ticket. In particular, the system obtains the user's input. The user has four options:

select the "OK" button, select the "EXIT" button,

Press the "Return" key, or

Select a Previous ticket.

If the "Return" (also referred to as "Enter") key was entered while in the ticket field, a determination is made as to whether the user is logged into the selected region. When this determination is affirmative, a request is made for either a WFA/C Maintenance Pool Worklist (OSSAVL) window or a WFA/C Trouble Report/Activity (OSSTR) window. If the OSSAVL window is brought up, the user selects the line containing the desired ticket. The selected ticket is then placed in the Specified Ticket window and processing returns to get additional user inputs (steps S180002 to S180018).

On the other hand, if the OSSTR window is brought up (i.e., no for step S180010) (or the "OK" button was selected by the user), the presently displayed ticket is made active for all ticket actions, and then the Specify ticket window closes (steps S180002 to S180010, S180020 and S180022.

It is noted that if the user decides to select the "Exit" button processing jumps to step S180022, to close this window.

Specify Circuit Window

Figure 32:
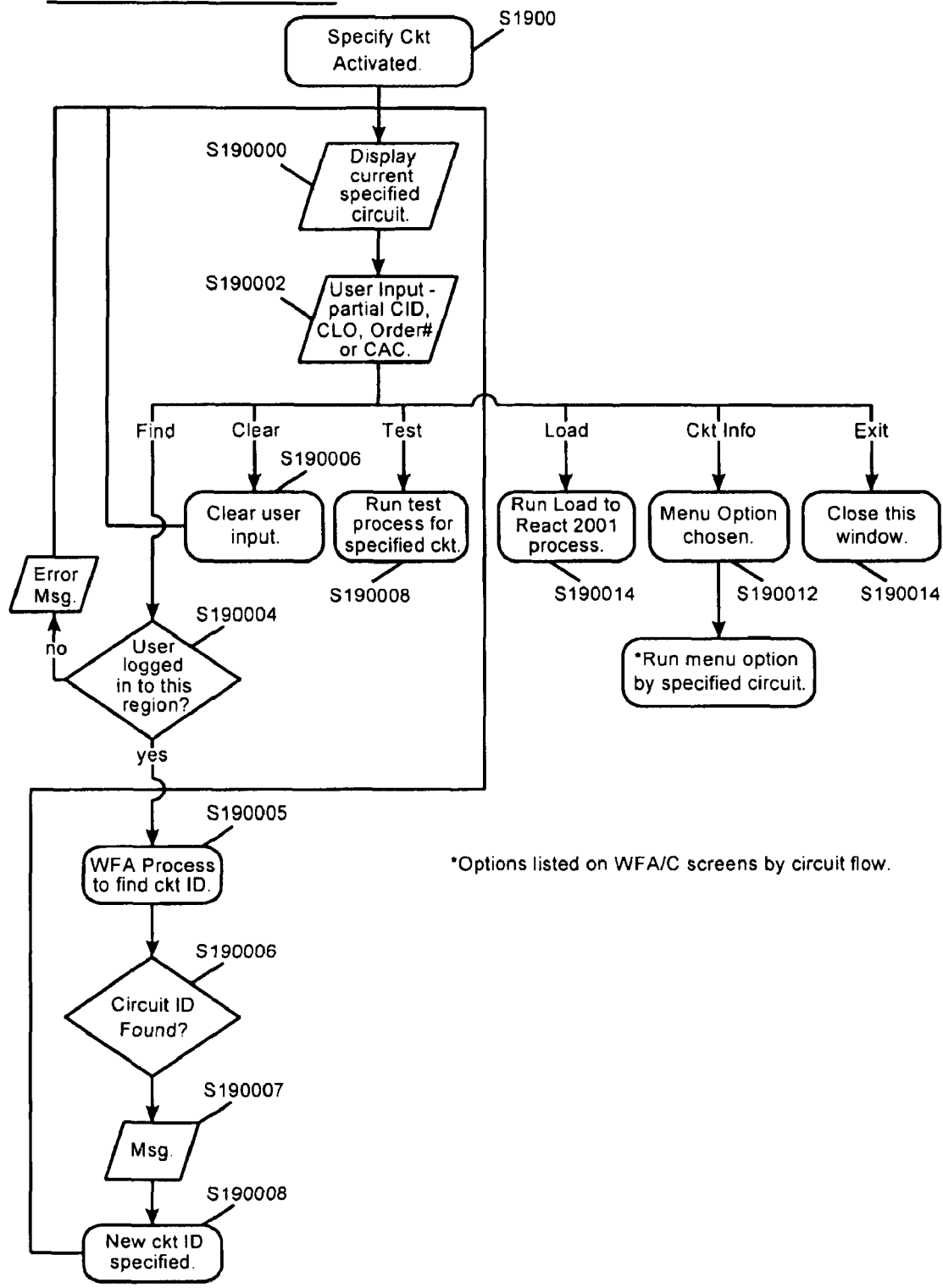

The Specify Circuit Window activity flowchart is illustrated in FIG. 32. In this window, the current specified circuit is displayed. The user can then input partial CID data, CLO data, Order Number, or CAC data. The user then has several options:

find a circuit id (step S190004), clear the user input (S190006), test the specified circuit (S190008), load REACT 2001 (S190010), get circuit information (S190012), or exit (S190014).

If the user elected to find a circuit id, and the user is logged into the region, a WFA process is initiated to find the circuit id. When the circuit id is found, an appropriate message is produced, and processing loops back to display the current specified circuit (steps S190004 to S190008).

Pickup Ticket

Figure 34:
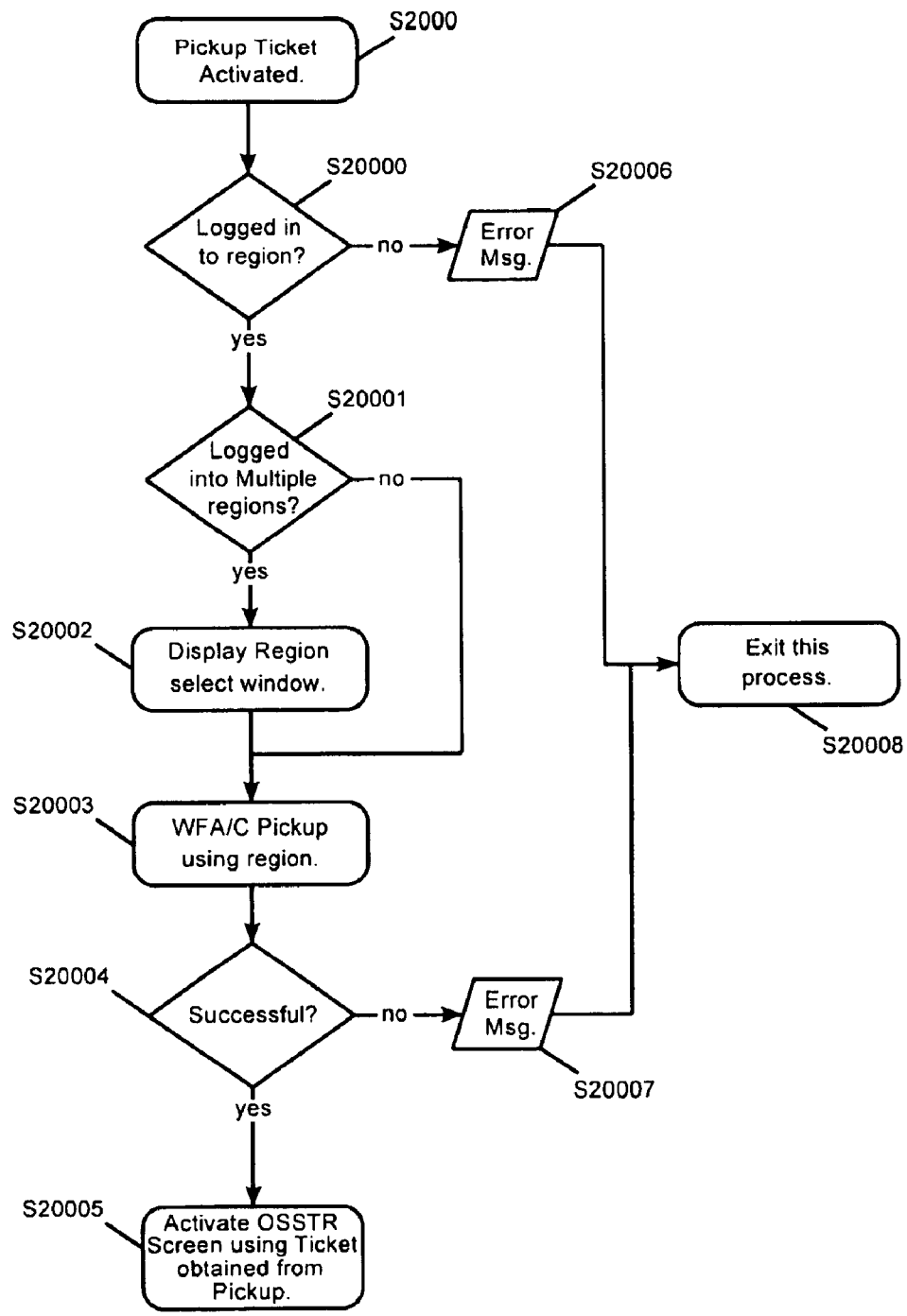

The flowchart for executing the pickup ticket is shown in FIG. 34. As shown in the drawing, when this activity routine is selected, the user selects a desired region, and the WFA/C Trouble Report/Activity (OSSTR) screen is activated using the obtained ticket (steps S20000 to S20005). However, if the user is not logged into the region (step S20006), or it was not possible to successfully execute the WFA/C Pickup using the selected region (step S20007), an appropriate error message is produced and this process ends (step S20008).

OSSTR Window

Figure 37:
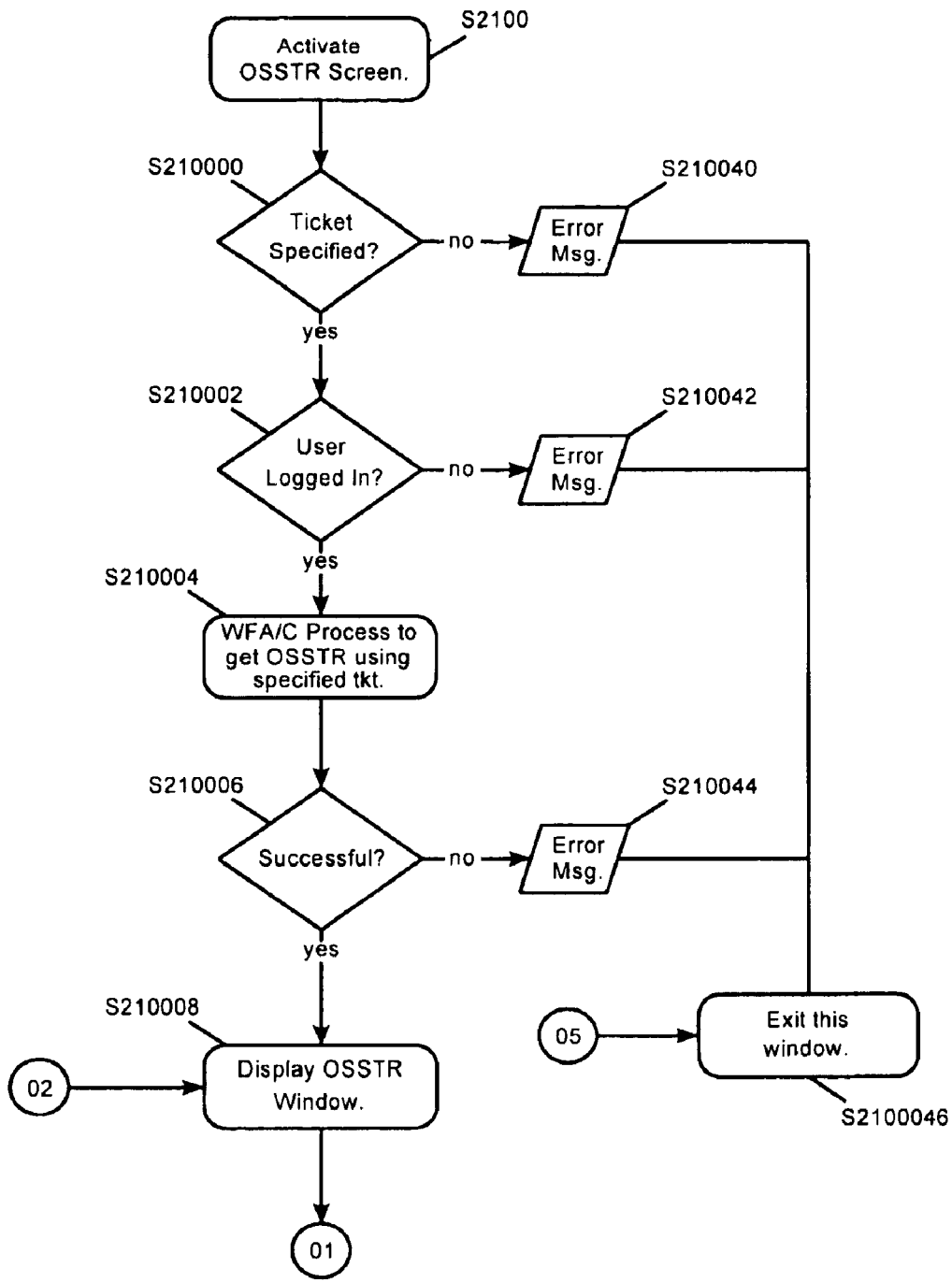
Figure 38:
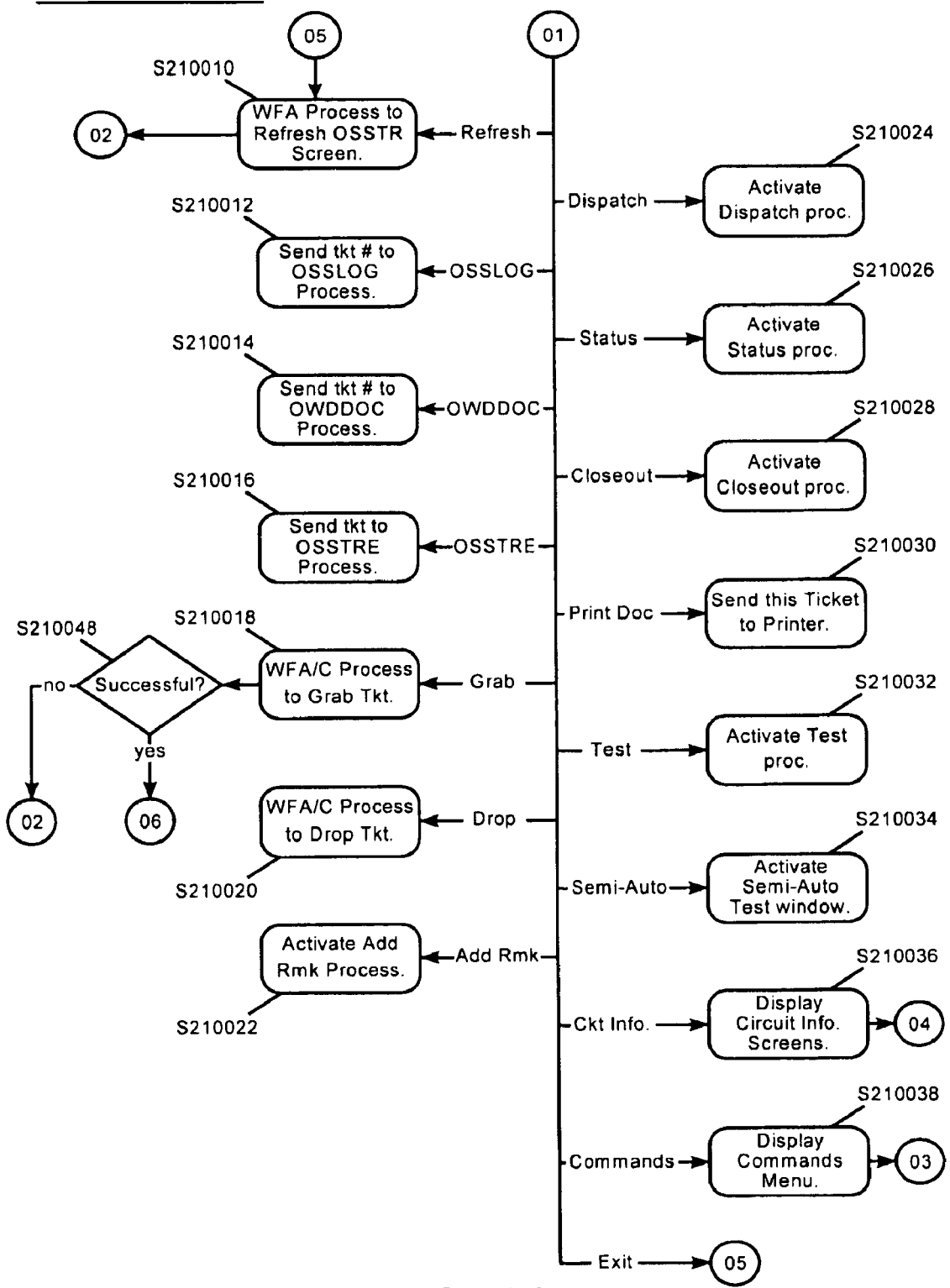
Figure 39:
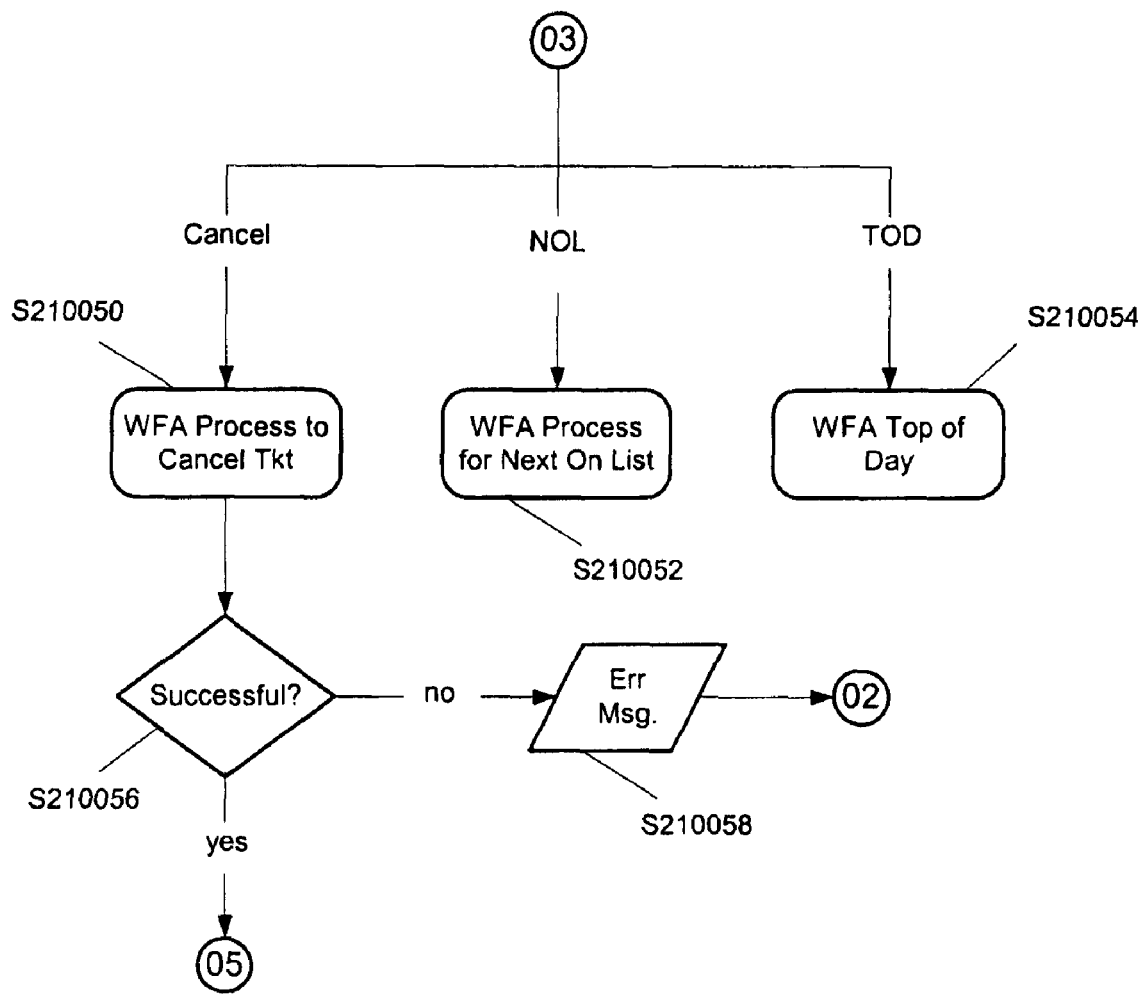

The program for performing the WFA/C Trouble Report/Activity (OSSTR) activity window is shown in FIGS. 37-39. a center technician (user) works on trouble reports from this window (screen). That is, this window allows the user to, for example, initiate handoffs, test requests, and make referrals to other centers.

In operation, when a ticket has been specified, the OSSTR activity window is initiated using the specified ticket, and the OSSTR window is displayed. From the OSSTR window, the user (technician) selects a process from among the following:
  refresh the OSSTR screen,
  send the ticket number to the OSSLOG process window,
  send the ticket to the OWDDOC process window,
  send the ticket to the OSSTRE process window,
  grab the ticket,
  drop the ticket,
  add a remark (see FIG. 43),
  dispatch the ticket (see FIG. 44),
  activate a status process (see FIG. 46),
  closeout the process (see FIG. 45),
  send the ticket to a printer,
  initiate a test process,
  activate a semi-automatic test process (see FIG. 42),
  display circuit information,
  display a command menu, or
  exit.

It is noted that if the user grabs the ticket (step S210018), the OSSTR screen is refreshed. Further, if the user (technician) selects the display commands option, the user is presented with three choices:
  cancel the ticket (step S210050),
  get the next ticket on the list (step S210052), or
  go to the top of the day ticket (e.g., first ticket of the day) (step S210054).

Figure 42:
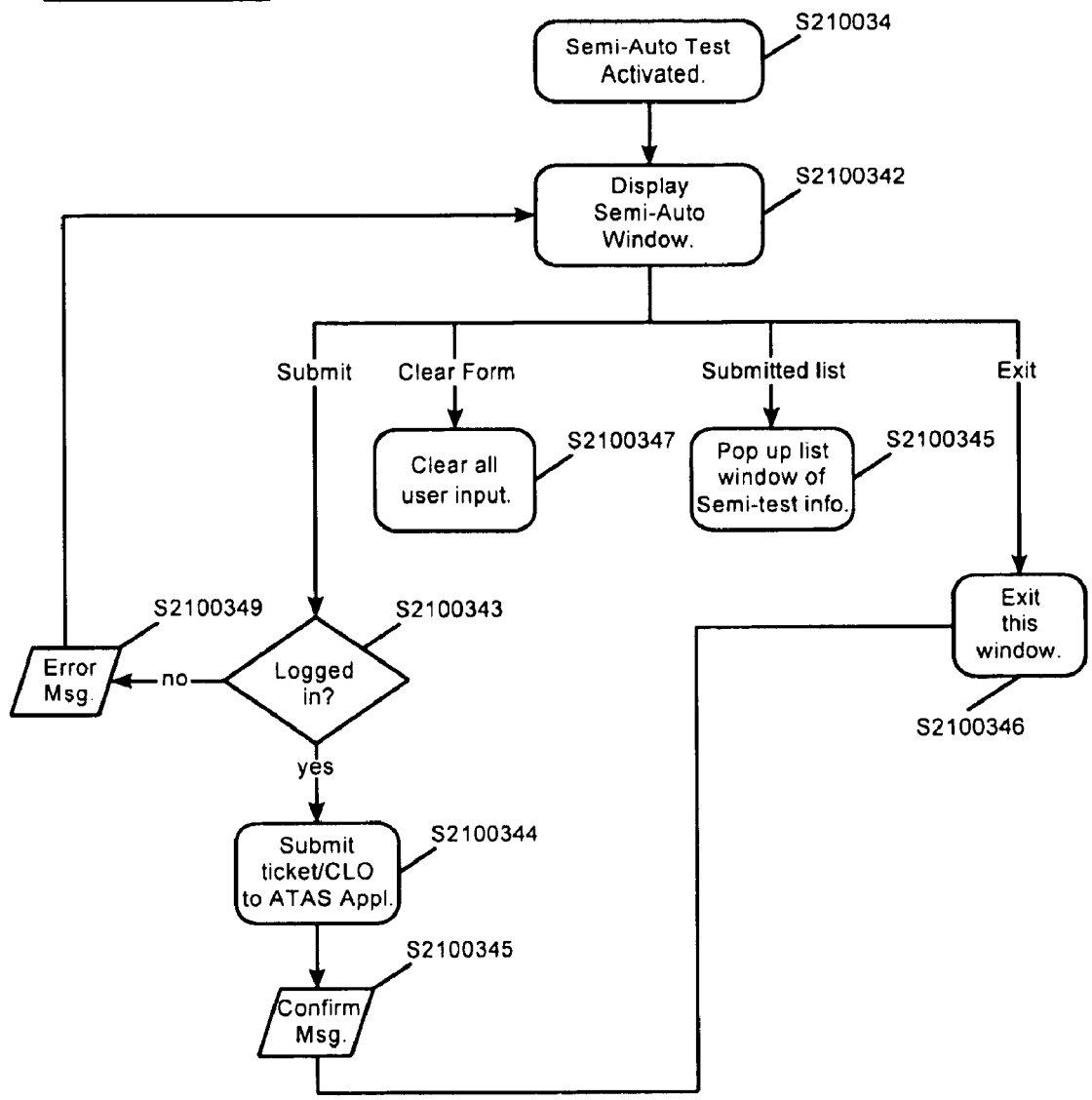

The Semi-Automatic Test activity routine (step S210032 in FIG. 38) is shown in FIG. 42. In this routine, the semi-automatic window is brought up, providing the user with several options, as follows:
  submit a ticket,
  clear the form,
  pop up a list window of semi-automatic information, or
  exit this window.

If the user submits a ticket and he/she is logged in, the ticket and CLO (circuit -layout order number) is submitted, a confirmation message is produced, and this window closes (steps S2100343 to S2100346)

Figure 43:
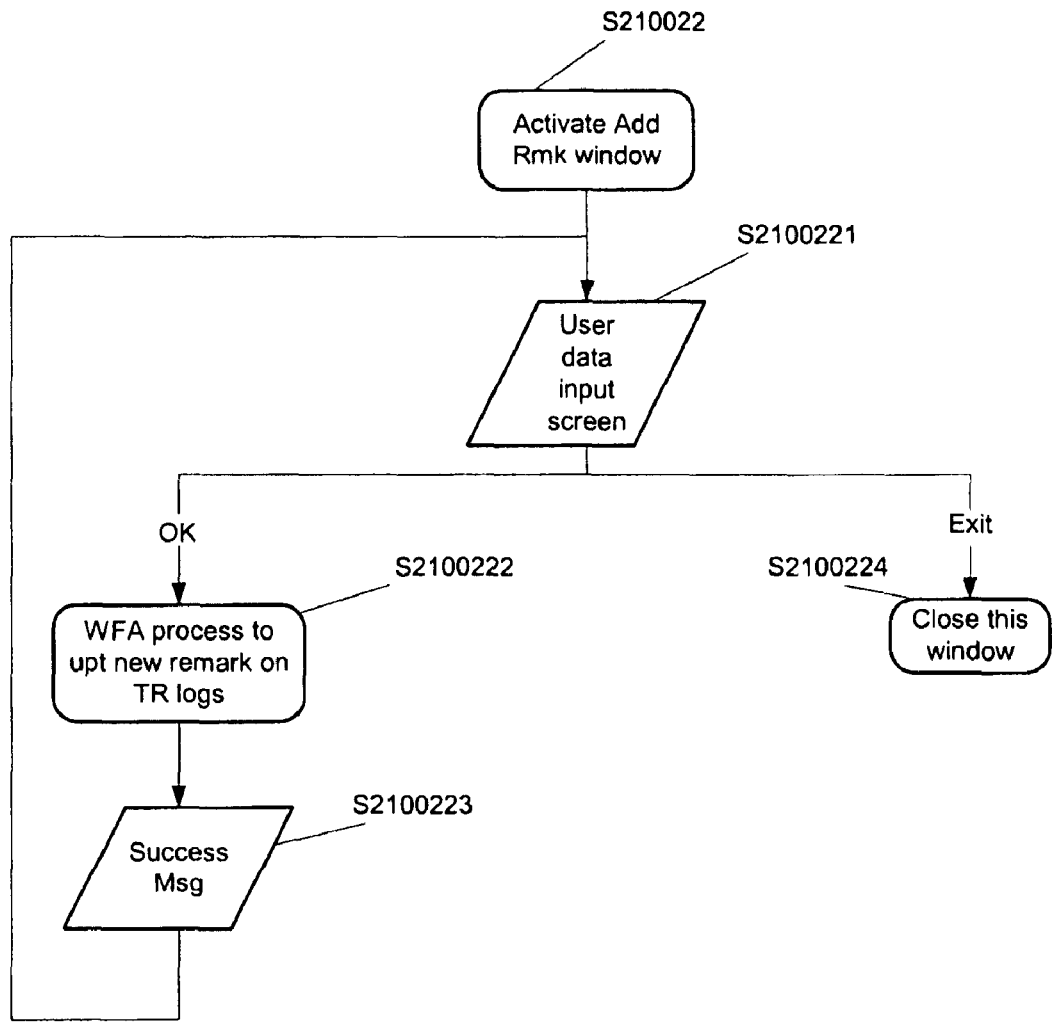
Figure 44:
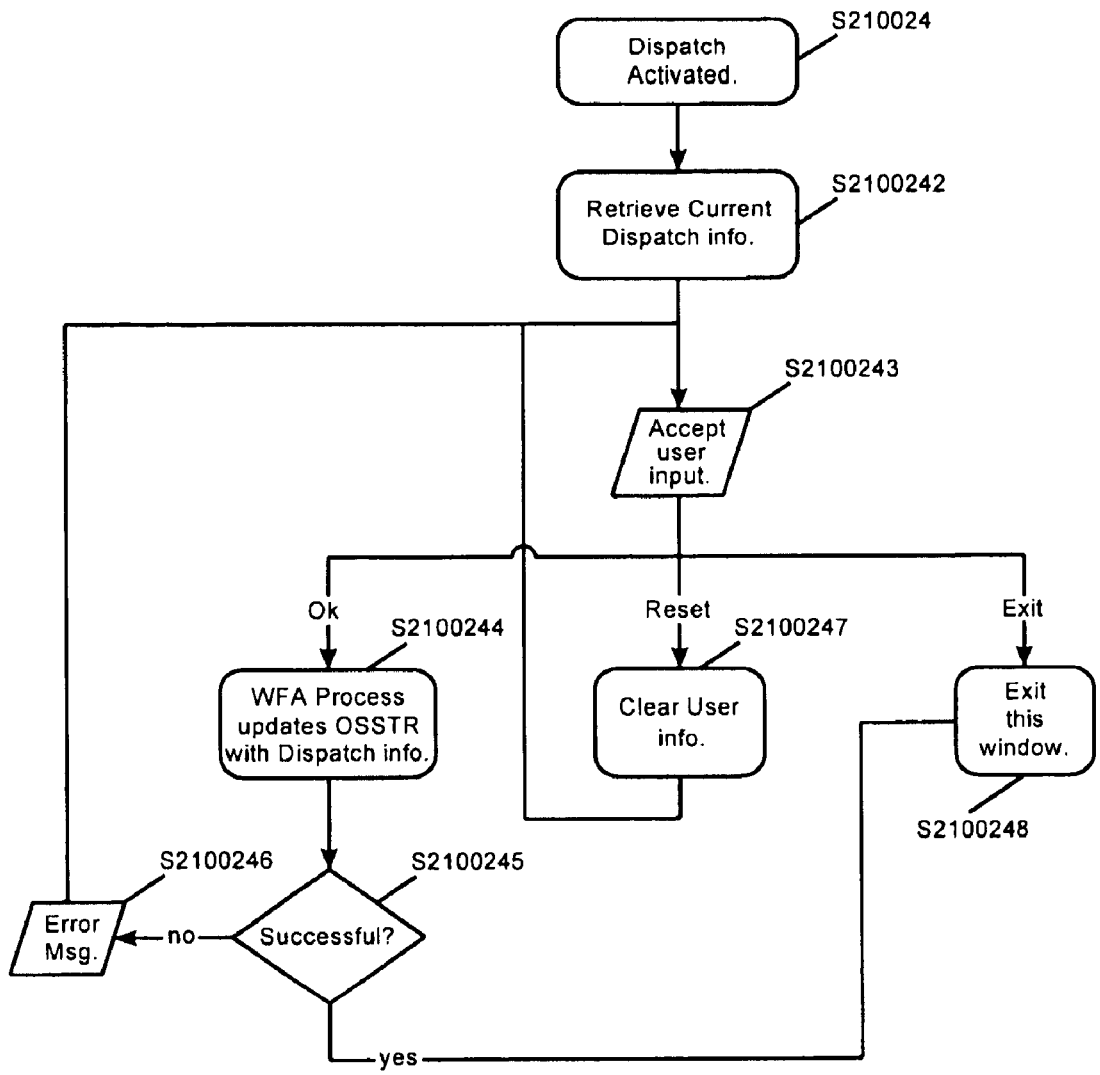

The add remark activity routine (step S210022 in FIG. 38), is shown in greater detail in FIG. 43. According to this routine, a window pops up that allows a user to append a remark to the log. Thereafter, this window is closed (steps S2100221 to S2100224.

The dispatch activity routine (step S210024 in FIG. 38) is selected when the user wishes to update the OSSTR with dispatch information. This routine is illustrated in greater detail in FIG. 44.

Figure 46:
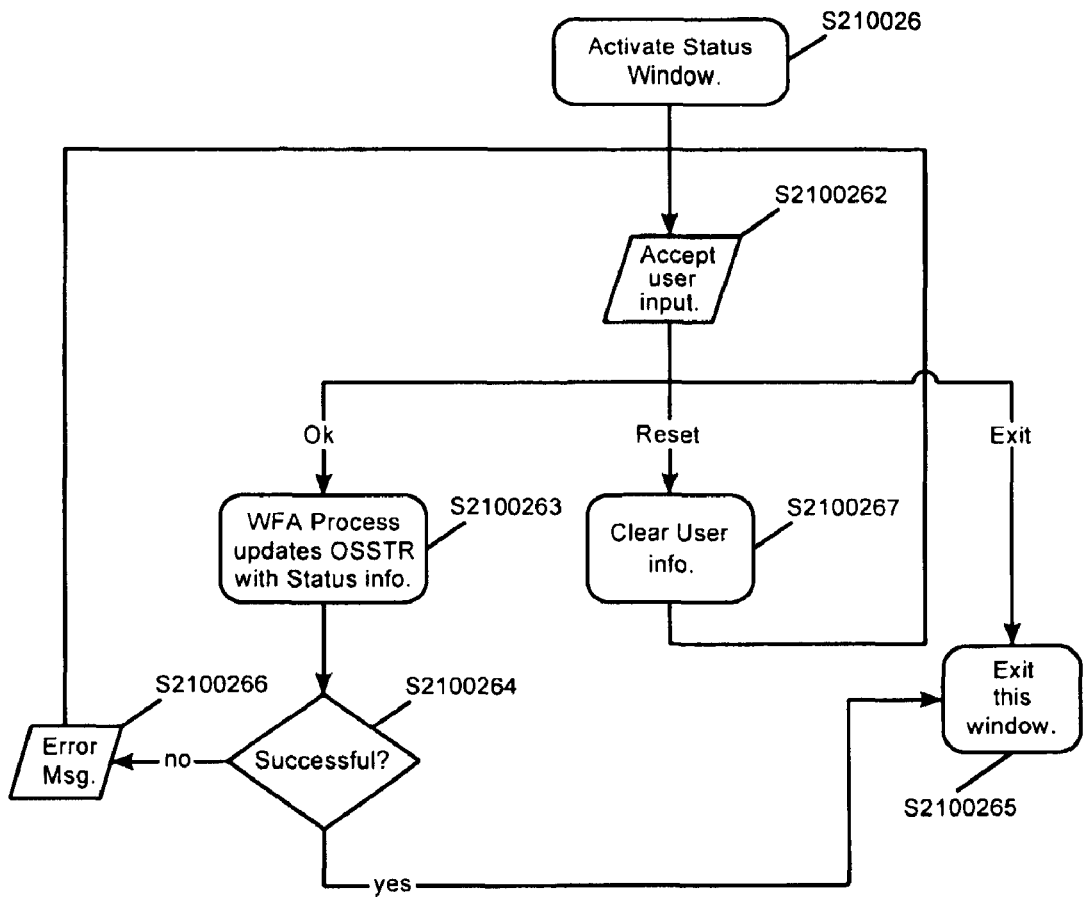

The status activity routine (step S210026 in FIG. 38) is shown in greater detail in FIG. 46. According to this routine, the user is able to call up the WFA/C Trouble Report/Activity (OSSTR) window and update it with status information.

Figure 45:
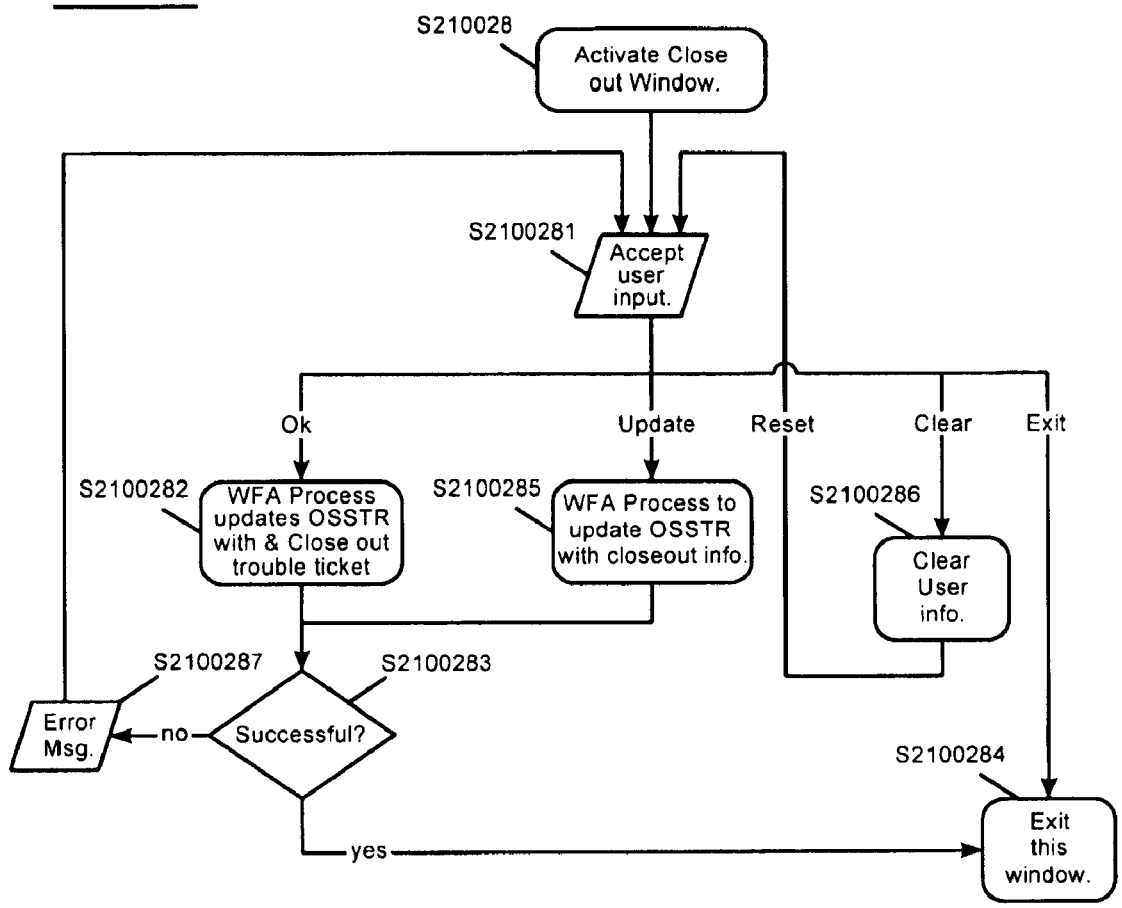

The close but activity routine (step S210028 in FIG. 38) is shown in greater detail in FIG. 45. This routine is executed to update the WFA/C Trouble Report/Activity (OSSTR) window with close out information before exiting this routine.

WFA/C Screens By Ticket

Figure 36:
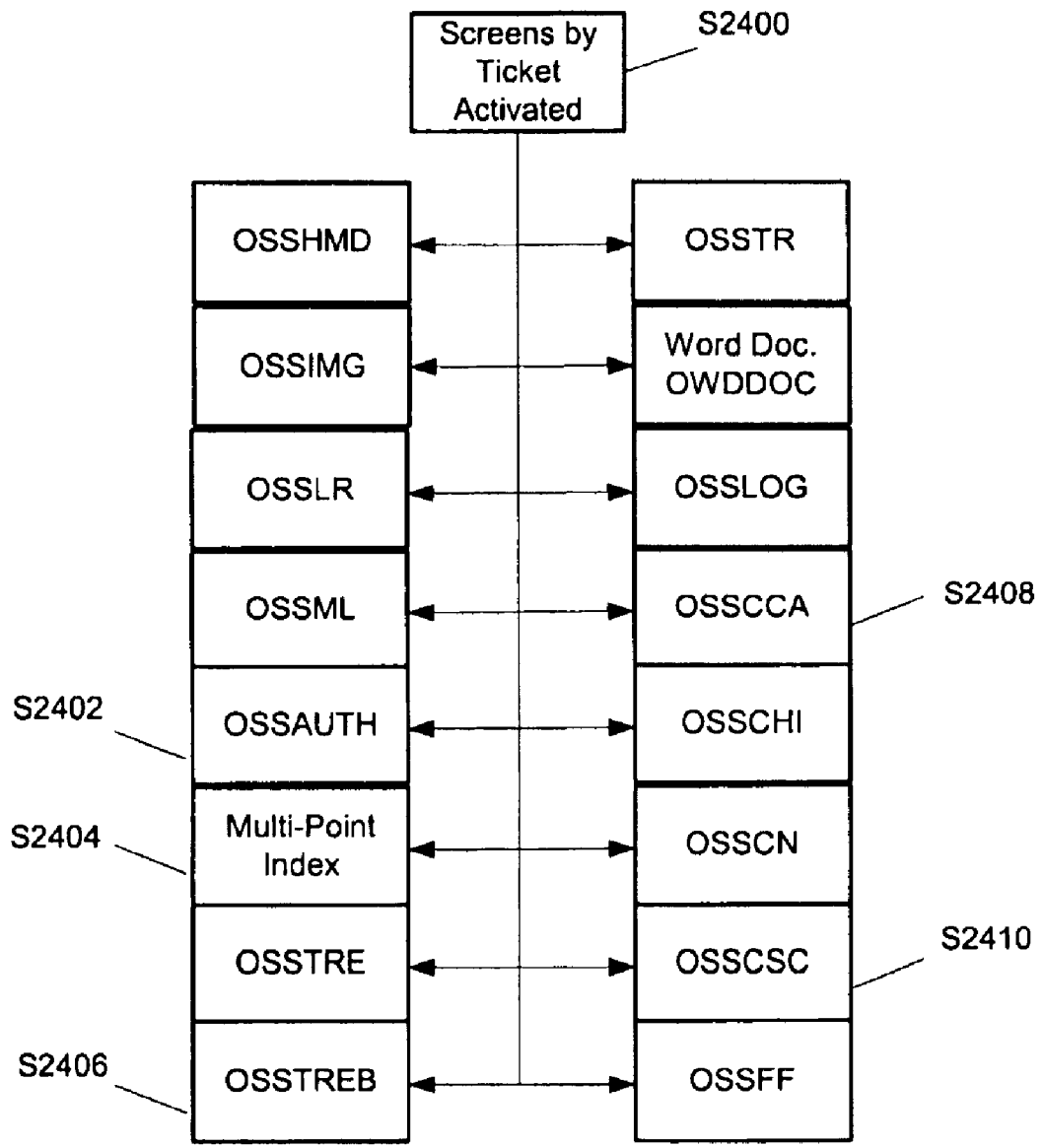

The WFA/C Screens By Ticket activity window is illustrated in FIG. 36. When this window is selected, the user can select from the following:
  History Measurement Data (OSSHMD),
  Service Order Image (OSSIMG),
  Line Record Display (OSSLR),
  WFA/C Multipoint Circuit List (OSSML),
  Multipoint Index (VJMPI),
  WFA/C Trouble Report Entry (OSSTRE),
  WFA/C Trouble Report Electronic Bonding (OSSTREB),
  WFA/C Trouble Report/Activity (OSSTR),
  WORD Access Screen (OWDDOC),
  WFA/C Work log (OSSLOG),
  Customer Credit Allowance (OSSCCA),
  Circuit History (OSSCHI),
  Circuit Notes (OSSCN),
  Customer Service Charge (OSSCSC); and
  Facility Find (OSSFF).

Several of these options were previously discussed with respect to the WFA/C Screens By Circuit window (see FIG. 35), and thus, only the options that were not previously discussed will be discussed below.

Figure 50:
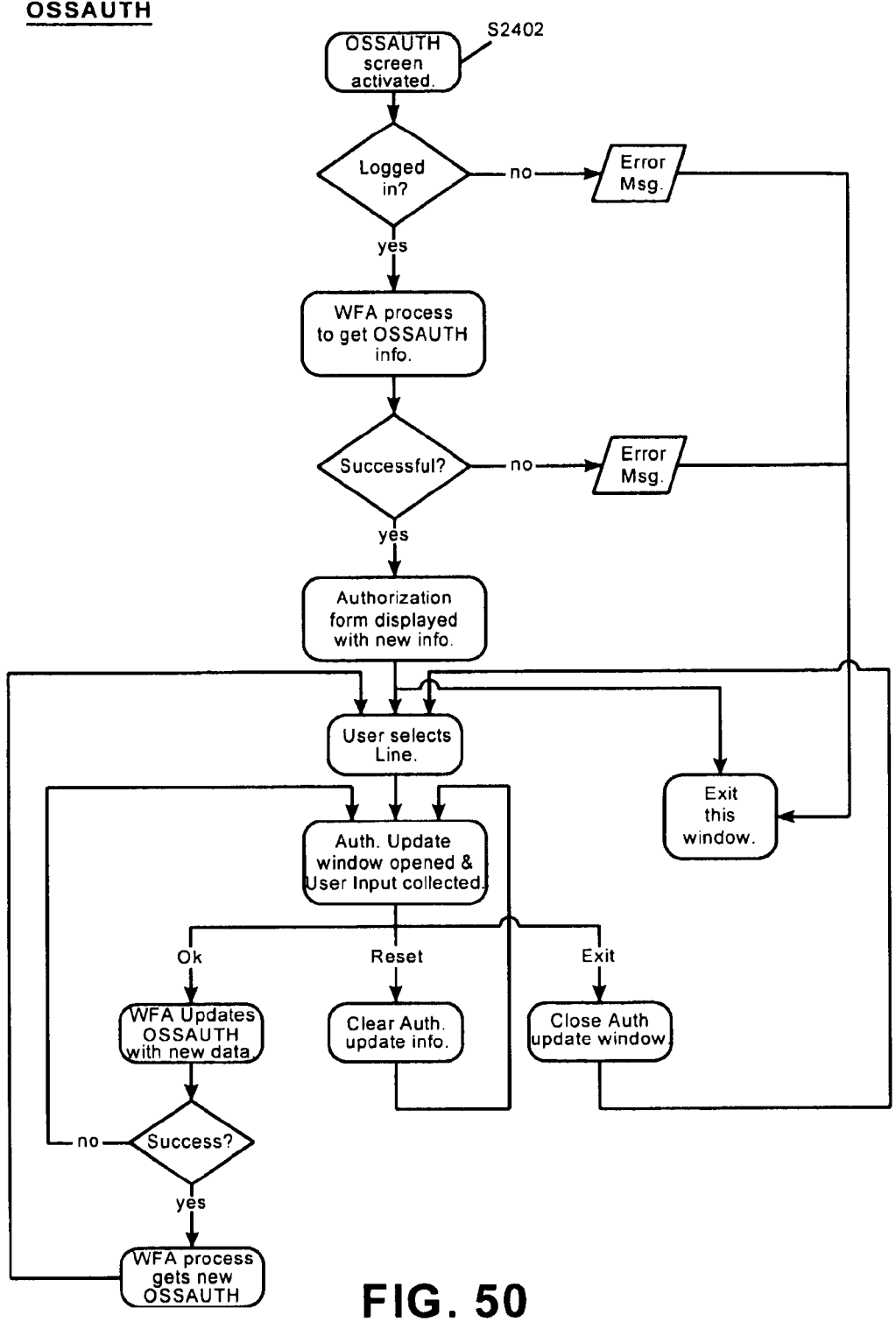

The WFAIC Authorization (OSSAUTH) window, step S2402, (the flowchart of which is illustrated in FIG. 50) allows the user to automatically collect and display data associated-with inter-exchange carrier (IEC) customer authorization requests. This window also collects and displays approval or denial of authorization requests for Electronic Bonding (EB) trouble reports. a sample OSSAUTH screen is shown at page 6-52 of the aforementioned "Work and Force Administration/Control (WFA/C) User Manual".

Figure 51:
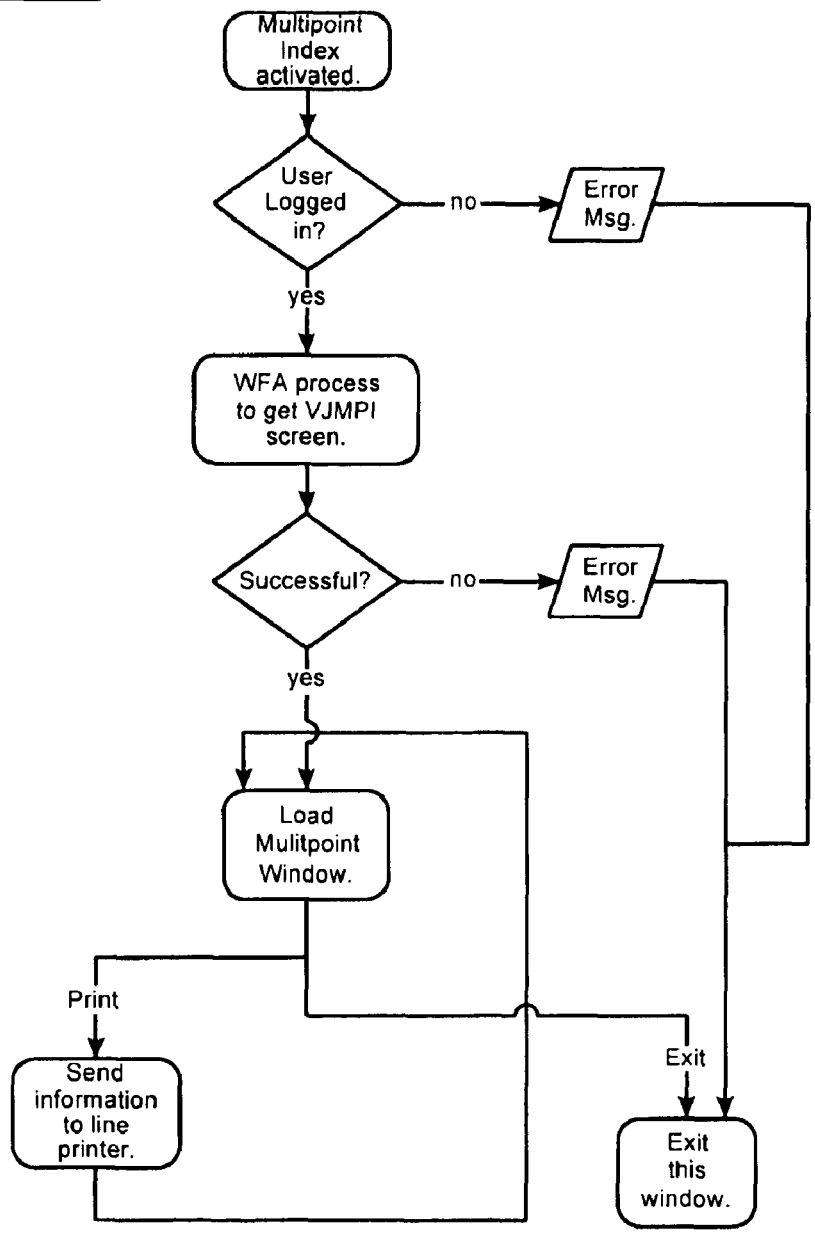

The NSDB Multipoint Circuit Index Format (VJMPI) activity routine (step S2404), illustrated in FIG. 51, is a view-only screen that displays (and prints) multipoint index circuit data (also referred to as an Index Page). This screen displays critical information about complex circuit arrangements. a sample screen (window) is shown at page 4-11 of the aforementioned "Work and Force Administration/Control (WFA/C) User Manual".

Figure 52:
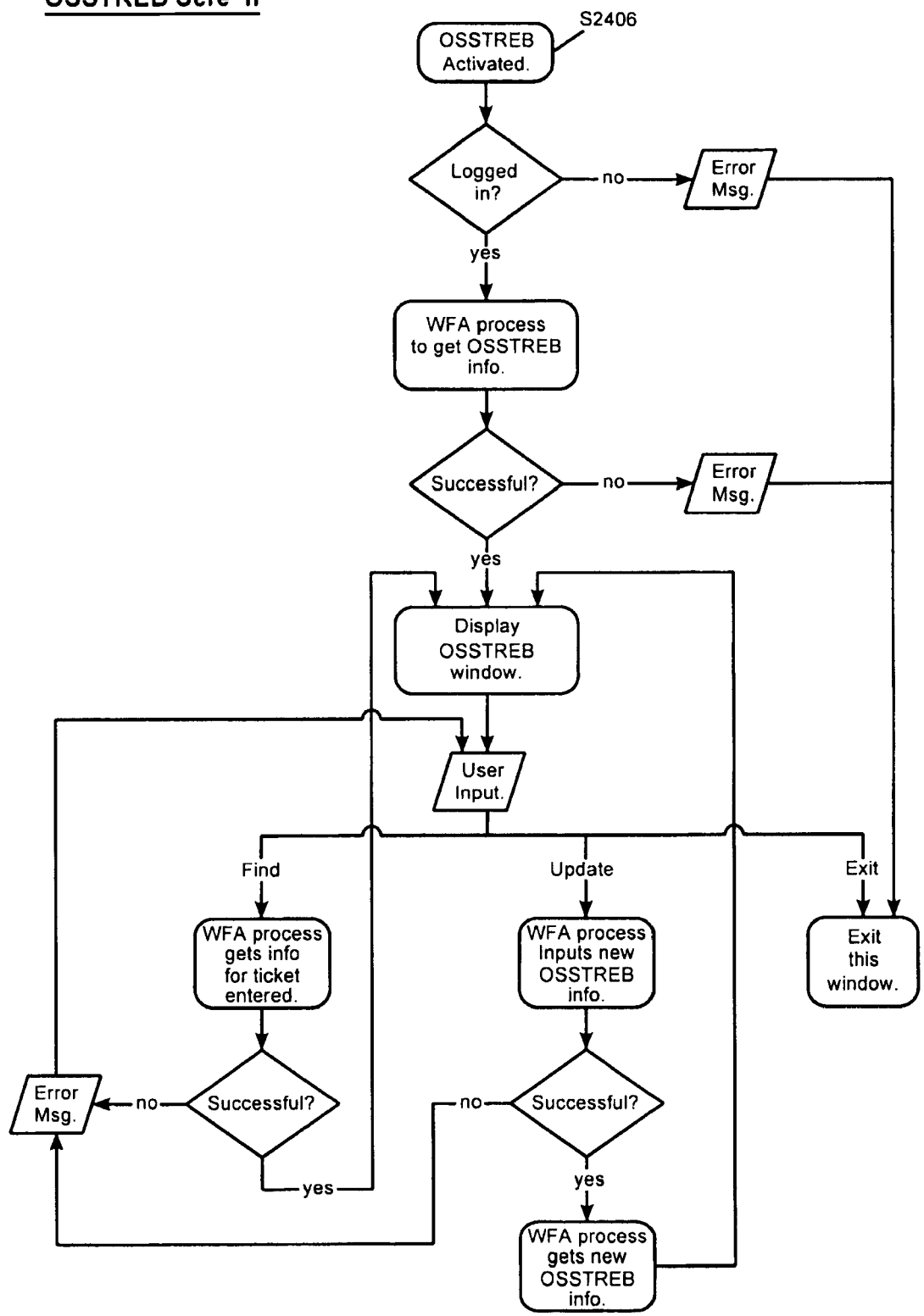

The WFA/C Trouble Report Electronic Bonding (OSSTREB) activity window, the flowchart of which is illustrated in FIG. 52, provides for the collection and storage of additional IEC-provided data, such as, for example, information transmitted to WFA/C via a gateway by an IEC or other customer. Electronic Bonding allows a user to take trouble reports from IECs directly via terminal emulation over an electronic gateway. An IEC technician can enter IEC trouble report information in an OSSTRE-type format. The TR information is passed from the IEC gateway to the BCC via a gateway, and from the BCC gateway to WFA/C. When the information (data) reaches the WFA/C system, the trouble report information is displayed in the OSSTRE and OSSTREB formats, and stored in the Trouble Databases.

Figure 48:
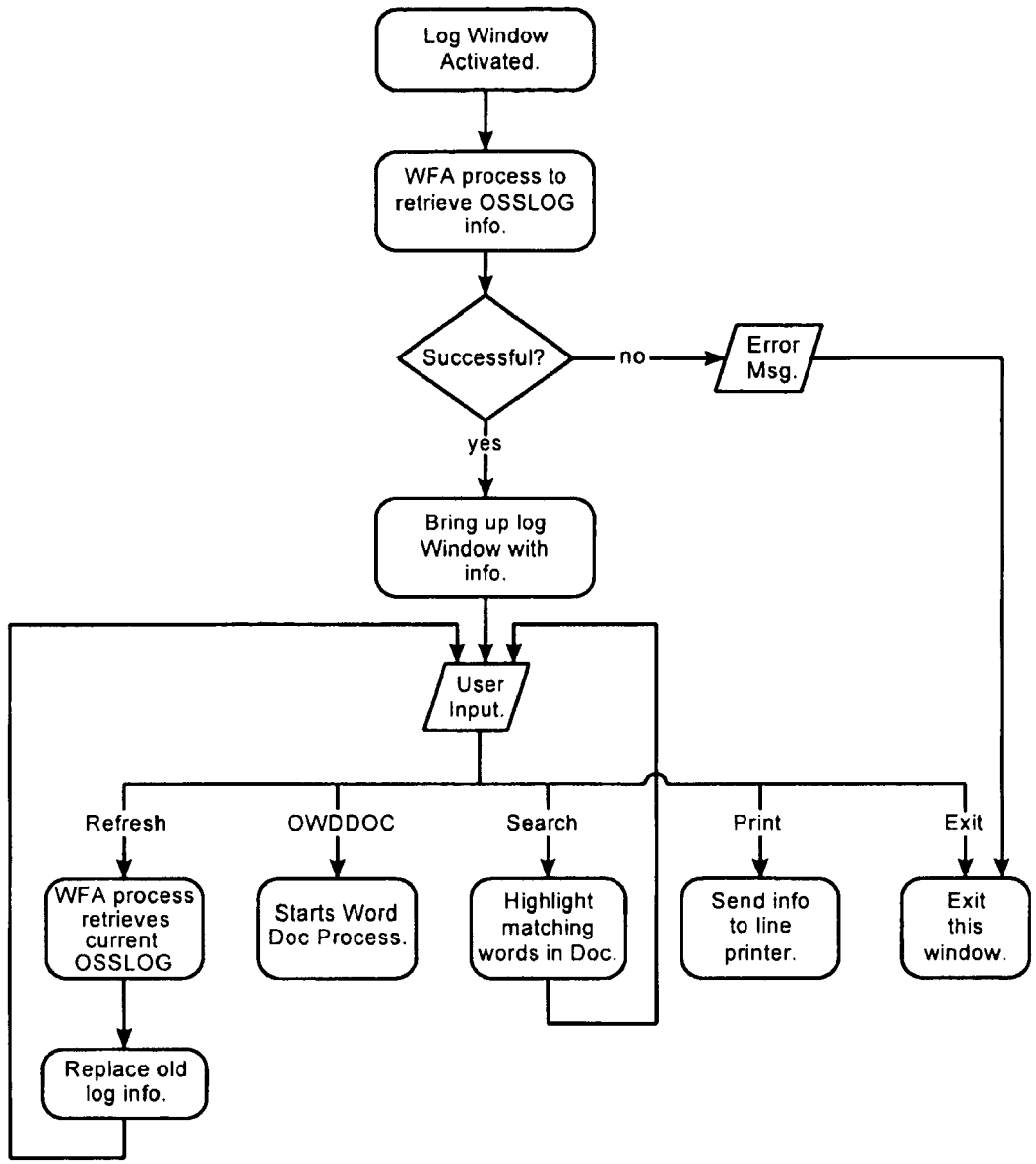

The flowchart of the WFA/C Work Log (OSSLOG) activity routine is illustrated in FIG. 48. This window (screen) is a display-only screen that shows a detailed account of activities on an order or trouble report. In the disclosed embodiment, this window shows activities in a date/time sequence, with the most recent activity being at the top of the display.

Figure 49:
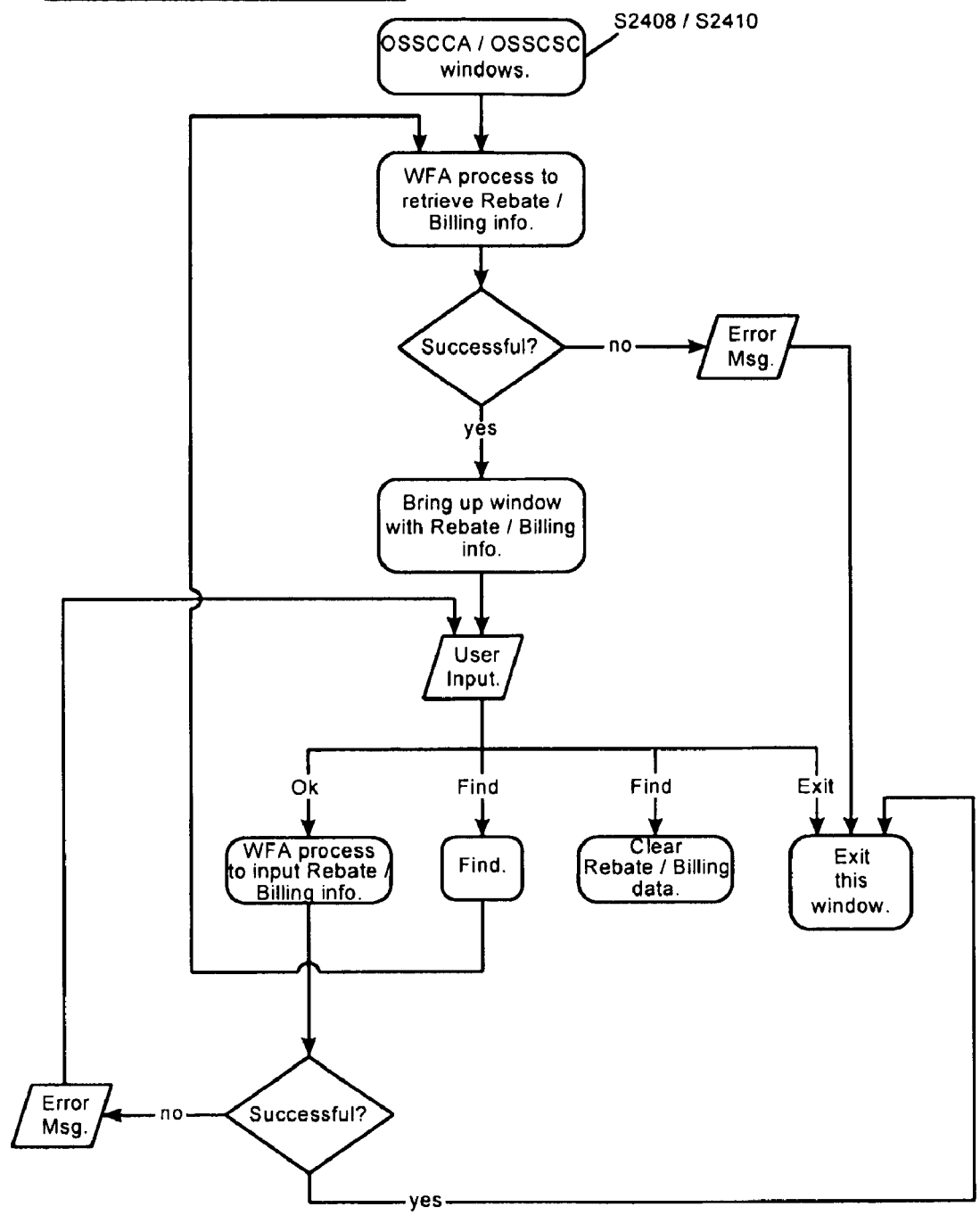

The flowchart for the Customer Credit Allowance (OSS-CCA) activity window and the Customer Service Charge (OSSCSC) activity window is shown in FIG. 49. The OSS-CCA window allows the user to initiate a customer rebate when a trouble duration is greater than a required rebate interval. The OSSCSC window allows the user to enter customer billing information and to describe work performed by technicians. This data is used by an Accounting Office for billing purposes.

Figure 63:
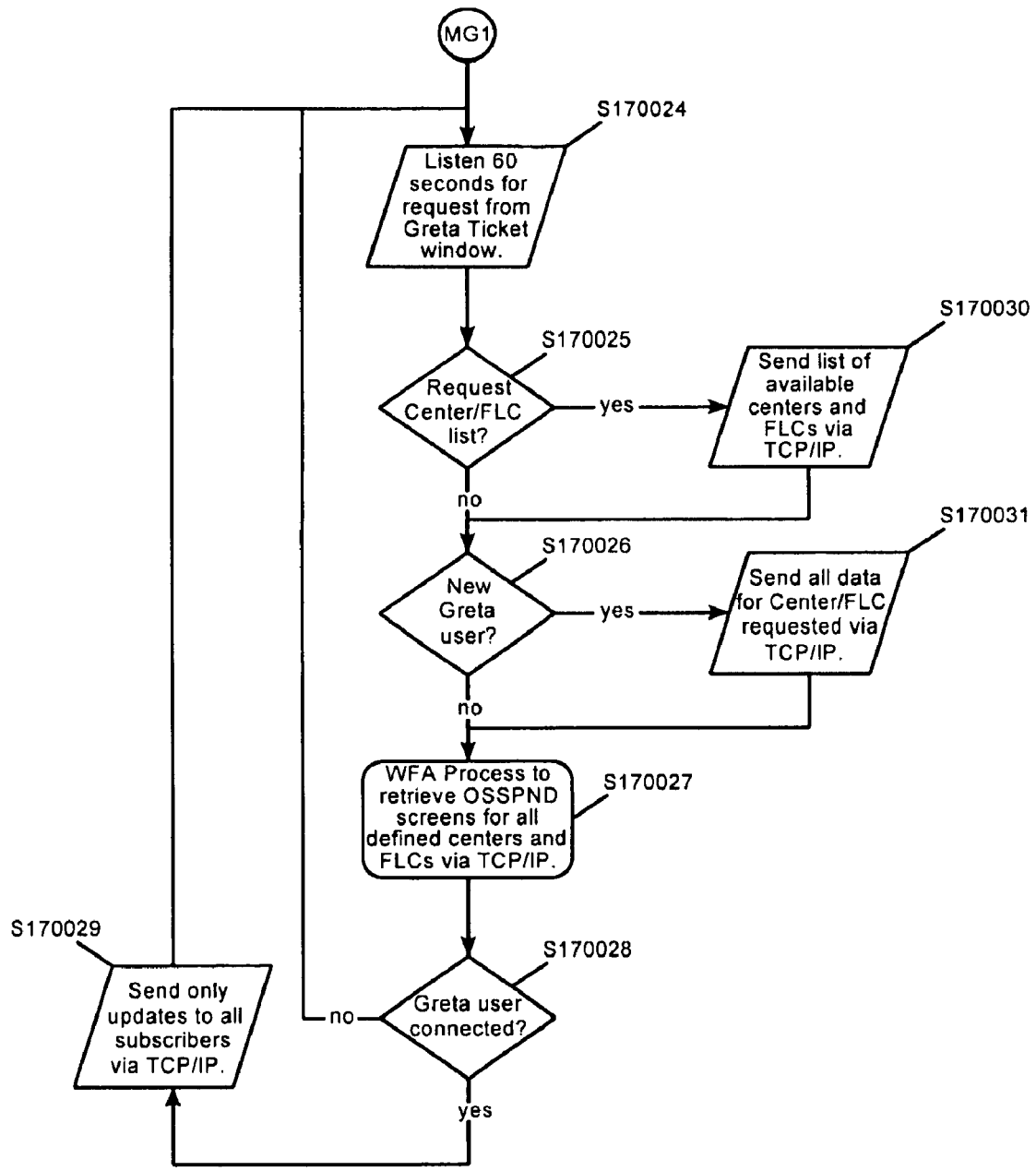
Figure 64:
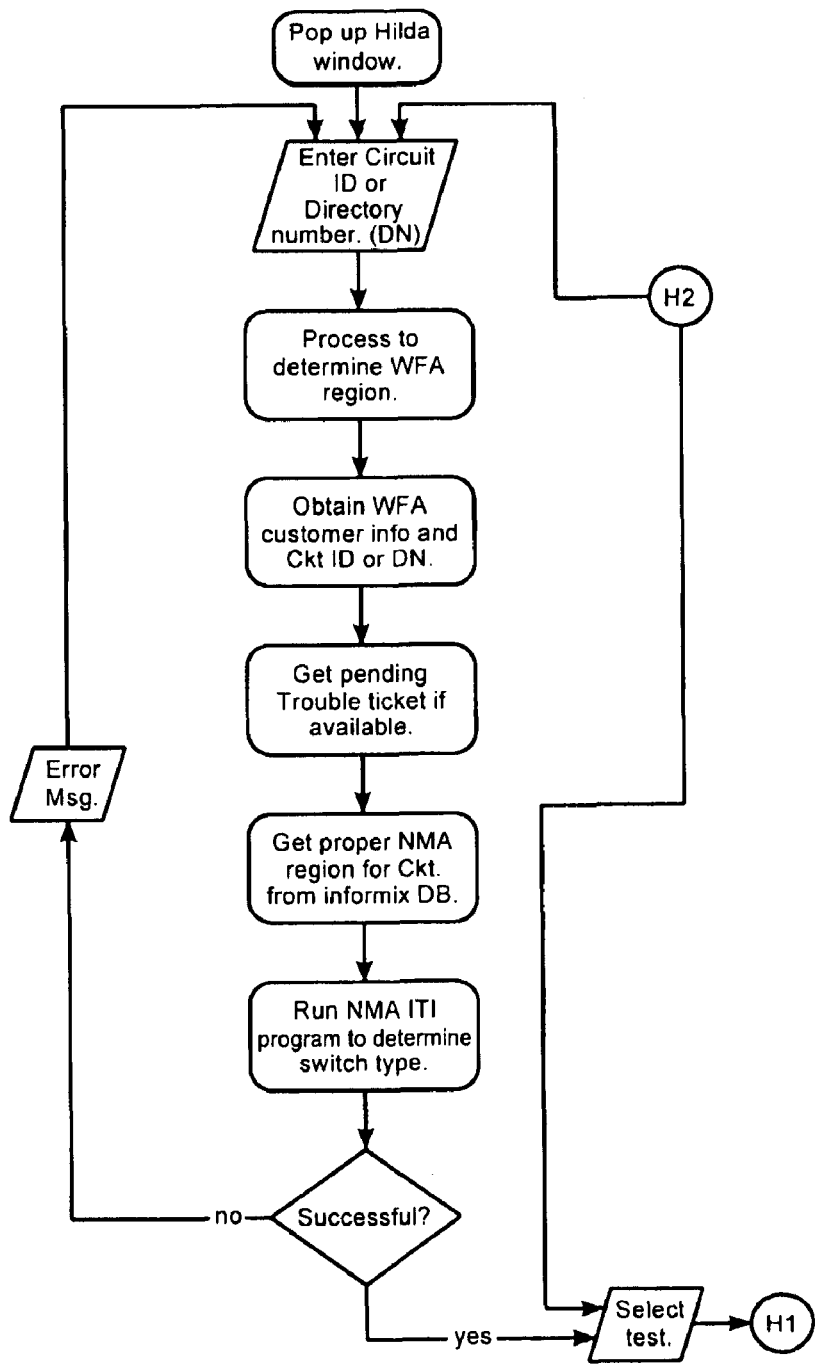
FIGS. 64-65 are flow charts of the HILDA application, as called by GRETA, or from a UNIX prompt.

Based upon the above discussion with respect to FIGS. 4-63, GRETA executes procedures on the WFA Host. The procedures are executed in accordance with known functionalities of the WFA Host. To execute a WFA procedure, GRETA provides an appropriate user interface to populate data to be formatted and transferred (if necessary) to the WFA Host to run the procedure. Once the WFA Host has completed the procedure, data returned to GRETA is formatted and displayed (if necessary) on the appropriate interface.

Figure 65:
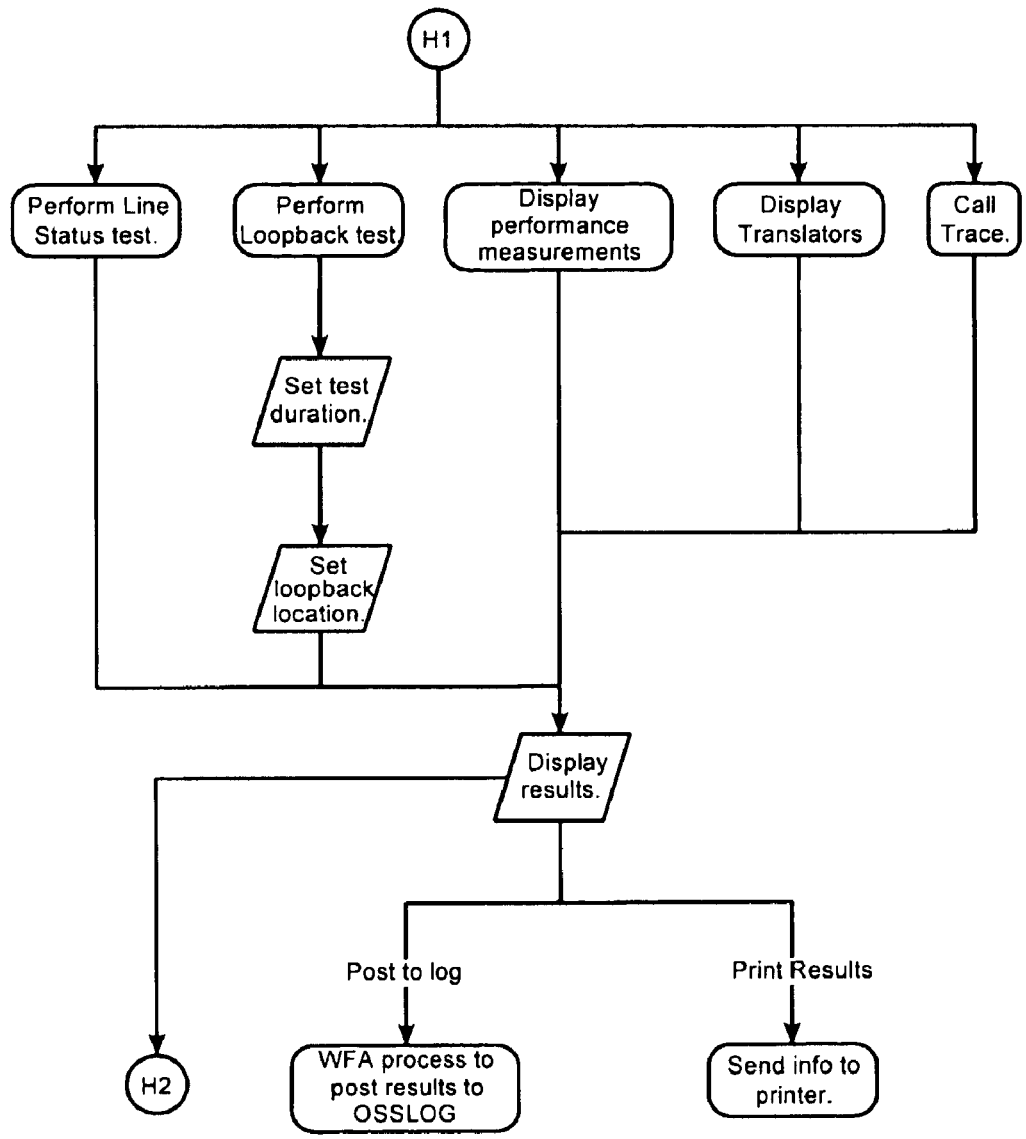

When GRETA calls HILDA to perform tests on ISDN switches, HILDA interfaces with Network Monitoring and Analysis System (NMA). NMA is a product of Bellcore, Murray Hill, N.J. The ISDN switch testing procedures (shown in FIG. 65) are executed in accordance with known scripts executed on the NMA Host. HILDA provides a system wherein multiple tests may be performed on the NMA Host simultaneously. To execute a NMA testing procedure, GRETA, via HILDA, provides an appropriate user interface to populate data to be formatted and transferred (if necessary) to the N Host to run the testing procedure. Once the NMA Host has completed the testing procedure, data returned to GRETA, via HILDA, is formatted and displayed (if necessary) on the appropriate interface.

When GRETA calls the REACT 2001 Host to perform remote testing of digital and analog services (e.g., private lines), GRETA provides an appropriate user interface to populate data to be formatted and transferred (if necessary) to the REACT 2001 Host to run the remote testing procedure. Once the REACT 2001 Host has completed the remote testing procedure, data returned to GRETA is formatted and displayed (if necessary) on the appropriate interface.

Other procedures shown in FIGS. 4-63 execute functions and routines (e.g., dynamically linked library functions) provided by an AIX (or equivalent) operating system and software running on the RS6000 platform. For example, windowing software, such as X-Windowing software (e.g., X-Motif), may be provided to create the GRETA and HILDA user interfaces. Accordingly, procedures to resize, reposition, and change window colors may be provided by such windowing software. Further, procedures to access attached devices (e.g., printers) may be provided by the AIX operating system. Still further, client software such as wordprocessors and browsers, etc. may be implemented by known client software programs (e.g, MICROSOFT WORD and MOSAIC or other HTML compatible browsers). Other features and processes may be provided by applications bundled with the operating system (e.g., UNIX mail, UNIX Telnet, UNIX FTP, and UNIX man pages). Also, other high level programming languages, such as HLLAPI, which are compatible with UNIX based operating systems may be used. Additionally, security and access to the system may be limited in accordance with UNIX security and access features (e.g., UNIX rlogin, and UNIX yppasswrd).

While the invention has been described with reference to a preferred embodiment, it is understood that the words which have been used herein are words of description and illustration, rather than words of limitations. Changes may be made, without departing from the scope and spirit of the invention in its aspects. Although the invention has been described herein with reference to particular hardware, software, means, materials and embodiments, the invention is not intended to be limited to the particulars disclosed herein; rather, the invention extends to all functionally equivalent structures, methods and uses.

For example, hardware platforms other than the IBM RS6000 and 3270 may be used. In addition, other software applications may be used to implement the user interface of the present invention than the exemplary applications provided above. Further, other communications protocols may be utilized to transport data from one system to another. In addition, the present invention is not limited to interfacing with HILDA, WFA and REACT 2001 Hosts, as the present invention may communication with other Hosts utilizing the interface techniques of the present invention to format and transfer data. Still further, the system of the present invention may notify administrative personnel of errors via other processes than paging, for example, the system may notify administrative personnel via E-mail and voicemail.

We claim:

1. An apparatus for integrating a plurality of maintenance and testing systems that communicate with a plurality of disparate telecommunication systems, comprising:

a platform that supports a control interface and a different user interface formatted uniquely for each of the plurality of disparate telecommunication systems, said platform enabling formatting and transfer of appropriate data unique to each of said plurality of disparate telecommunication systems from the control interface by identifying each of the plurality of disparate telecommunication systems and the different user interface corresponding to each of the plurality of disparate telecommunication systems, and enabling monitoring of a user of the control interface, wherein said control interface enables testing, trouble-shooting and billing of the plurality of disparate telecommunication systems;

a network analysis component coupled to the control interface, the network analysis component performing testing of the plurality of disparate telecommunication systems wherein appropriate data is uniquely formatted and transferred between the network analysis component and the different user interface corresponding to each of the plurality of disparate telecommunication systems; and an application component provided by the control interface enabling the monitored user of the control interface to search for a circuit, edit information associated with the circuit, test the circuit and manage maintenance tickets associated with the circuit.

2. The apparatus of claim 1, said control interface enabling the user to selectively access each of the different user interfaces.

3. The apparatus of claim 1, said disparate systems comprising a testing system that performs at least one of remote testing of analog services and testing of ISDN switches.

4. The apparatus of claim 2, said platform further comprising a user login system that logs the user onto said control interface.

5. The apparatus of claim 1, said platform enabling the user to select at least one of a printer setup routine, an employee activity input routine, a timesheet routine, a control interface parameter selection routine, an alarm routine, a default email setting routine, an exit routine, an activity information backup routine, a work and force administration/control routine that enables the user to further select one of a plurality of activities, a security routine, a windows cascade routine, a help routine, a windows select routine that enables the user to further select one of a plurality of available windows, a save placement routine that enables the user to save a configuration of the platform, a platform information routine, a ticket maintenance routine, a specify ticket routine that enables the user to select a ticket, a specify circuit routine that enables the user to specify the circuit, a trouble report processing routine, a work and force administration and control routine that enables the user to select an information screen associated with a ticket, and a close application routine.

6. The apparatus of claim 1, said platform enabling the user to select one of the different user interfaces and at least one of review and update information associated with a customer authorization request.

7. The apparatus of claim 1, said different user interfaces each enabling the user to at least one of retrieve and update information associated with one of the plurality of disparate systems.

8. An apparatus for integrating a plurality of maintenance and testing systems that communicate with a plurality of disparate telecommunications systems, comprising:

a platform that supports a control interface and a different user interface formatted uniquely for each of the plurality of disparate telecommunications systems, said platform permitting parallel asynchronous testing of at least two of said disparate telecommunications systems that are connected to the platform, enabling formatting and transfer of appropriate data unique to each of said plurality of disparate telecommunication systems from the control interface by identifying each of the plurality of disparate telecommunication systems and the different user interface corresponding to each of the plurality of disparate telecommunication systems, and enabling monitoring of a user of the control interface, wherein said control interface enables testing, trouble-shooting and billing of the plurality of disparate telecommunication systems;

a network analysis component coupled to the control interface, the network analysis component performing testing of the plurality of disparate telecommunication systems wherein appropriate data is uniquely formatted and transferred between the network analysis component and the different user interface corresponding to each of the plurality of disparate telecommunication systems; and an application component provided by the control interface enabling the monitored user of the control interface to search for a circuit, edit information associated with the circuit, test the circuit and manage maintenance tickets associated with the circuit.

9. The apparatus of claim 8, said platform performing at least one of remote testing of analog services and testing of ISDN switches in accordance with vendor-specific criteria.

10. The apparatus of claim 8, each of said different user interfaces comprising a graphical user interface (GUI) that facilitates at least one of retrieving data and entering data.

11. The apparatus of claim 8, said platform sending and receiving data between said platform and said disparate telecommunications systems.

12. The apparatus of claim 8, said control interface enabling the user to access each of the different user interfaces.

13. The apparatus of claim 8, said different user interfaces each enabling the user to at least one of retrieve and update information associated with one of the plurality of disparate telecommunications systems.

14. A computer readable medium for storing a program that integrates a plurality of maintenance and testing systems that communicate with a plurality of disparate telecommunications systems, comprising:

a plurality of different user interfaces each communicating with and formatted uniquely for one of the plurality of disparate telecommunications systems, said plurality of different user interfaces interoperating with the plurality of disparate telecommunications systems from the control interface and enabling monitoring of a user of the control interface; and a control interface, said control interface enabling formatting and transfer of appropriate data unique to each of said plurality of disparate systems from the control interface by identifying each of the plurality of disparate telecommunication systems and the plurality of different user interfaces corresponding to each of the plurality of disparate telecommunication systems, said control interface enabling the user to access each of the different user interfaces, and wherein said control interface enables testing, trouble-shooting and billing of the plurality of disparate telecommunication systems;

a network analysis logic enabling testing of the plurality of disparate telecommunication systems wherein appropriate data is uniquely formatted and transferred to the different user interface corresponding to each of the plurality of disparate telecommunication systems; and an application logic enabling the monitored user of the control interface to search for a circuit, edit information associated with the circuit, test the circuit and manage maintenance tickets associated with the circuit.

15. The computer readable medium of claim 14, said disparate systems including a testing system that performs at least one of remote testing of analog services and testing of ISDN switches.

16. The computer readable medium of claim 14, further comprising a user login that logs the user onto said control interface.

17. The computer readable medium of claim 14, said control interface enabling the user to select at least one of a printer setup routine, an employee activity input routine, a timesheet routine, a common user interface parameter selection routine, an alarm routine, a default email setting routine, an exit routine, an activity information backup routine, a work and force administration/control routine that enables the user to further select one of a plurality of activities, a security routine, a windows cascade routine, a help routine, a windows select routine that enables the user to further select one of a plurality of available windows, a save placement routine that enables the user to save a configuration of the platform, a platform information routine, a ticket maintenance routine, a specify ticket routine that enables the user to select a ticket, a specify circuit routine that enables the user to specify the circuit, a trouble report processing routine, a work and force administration and control routine that enables the user to select an information screen associated with a ticket, and a close application routine.

18. The computer readable medium of claim 14, said control interface enabling the user to select one of the different user interfaces and at least one of review and update information associated with a customer authorization request.

19. The computer readable medium of claim 14, said different user interfaces each enabling the user to at least one of retrieve and update information associated with one of the plurality of disparate systems.

* * * * *